(12) United States Patent
Huffman

(10) Patent No.: US 9,870,337 B2
(45) Date of Patent: Jan. 16, 2018

(54) METHOD AND APPARATUS FOR THE PROCESSOR INDEPENDENT EMBEDDED PLATFORM

(71) Applicant: E3 EMBEDDED SYSTEMS, LLC, Augusta, GA (US)

(72) Inventor: Russell Kevin Huffman, Augusta, GA (US)

(73) Assignee: E3 EMBEDDED SYSTEMS, LLC, Augusta, GA (US)

(*) Notice: Subject to any disclaimer, the term of this patent is extended or adjusted under 35 U.S.C. 154(b) by 275 days.

(21) Appl. No.: 14/765,466

(22) PCT Filed: Feb. 28, 2014

(86) PCT No.: PCT/US2014/019462
§ 371 (c)(1),
(2) Date: Aug. 3, 2015

(87) PCT Pub. No.: WO2014/134471
PCT Pub. Date: Sep. 4, 2014

(65) Prior Publication Data
US 2015/0378960 A1 Dec. 31, 2015

Related U.S. Application Data

(60) Provisional application No. 61/770,339, filed on Feb. 28, 2013.

(51) Int. Cl.
*G06F 13/42* (2006.01)
*G06F 1/14* (2006.01)
(Continued)

(52) U.S. Cl.
CPC ............ *G06F 13/4291* (2013.01); *G06F 1/14* (2013.01); *G06F 9/50* (2013.01); *G06F 13/4045* (2013.01); *G06F 13/4072* (2013.01)

(58) Field of Classification Search
CPC ............ G06F 13/42; G06F 13/40; G06F 1/14; H03K 19/173
See application file for complete search history.

(56) References Cited

U.S. PATENT DOCUMENTS 6,189,052 B1 * 2/2001 Nilsson ................. G06F 13/126
710/11
6,961,790 B2 * 11/2005 Swope ................. G06F 13/4072
710/10
(Continued)

*Primary Examiner* — Henry Tsai
*Assistant Examiner* — Christopher A Daley
(74) *Attorney, Agent, or Firm* — Baker, Donelson, Bearman, Caldwell & Berkowitz, PC

(57) ABSTRACT

A method comprises identifying resource needs of a plurality of peripherals and resource requirements of a plurality microcontrollers. The method includes comparing the resource needs of the plurality of peripherals with the resource requirements of the plurality of microcontrollers to identify generic resources common to the plurality of microcontrollers, wherein a first microcontroller and a second microcontroller of the plurality of microcontrollers provide the generic resources to processor pin locations according to differing architectures. The method includes assigning each resource of the generic resources to a fixed motherboard location, the assigning including assigning the fixed location to an interface pin. The method includes identifying for each resource of the generic resources a processor pin location of the first microcontroller providing the resource, routing the processor pin location providing the resource to the assigned interface pin, wherein the interface pin provides the resource to the fixed motherboard location.

33 Claims, 29 Drawing Sheets

(51) Int. Cl.
    *G06F 13/40*     (2006.01)
    *G06F 9/50*     (2006.01)
    *H03K 19/173*     (2006.01)

(56) References Cited

U.S. PATENT DOCUMENTS

| | | | | |
|---|---|---|---|---|
| 7,412,544 | B2 * | 8/2008 | Gibson | G06F 13/385 709/220 |
| 7,762,818 | B2 * | 7/2010 | Hoang | H05K 1/117 439/62 |
| 8,195,852 | B2 * | 6/2012 | Tantos | G06F 13/385 710/62 |
| 8,196,075 | B1 * | 6/2012 | Garrault | G06F 17/5036 716/104 |
| 8,269,524 | B2 * | 9/2012 | Jouin | H03K 19/1732 326/38 |
| 8,504,823 | B2 * | 8/2013 | Carpenter | G06F 13/385 710/11 |
| 8,719,112 | B2 * | 5/2014 | Carpenter | G06Q 30/06 705/26.63 |
| 8,775,713 | B2 * | 7/2014 | Chandra | G06F 13/4022 710/304 |
| 2003/0065863 | A1 * | 4/2003 | Wyland | G06F 13/385 710/305 |
| 2004/0181601 | A1 * | 9/2004 | Sakthikumar | G06F 3/0607 709/229 |
| 2009/0315586 | A1 * | 12/2009 | Swoboda | H03K 19/1732 326/38 |

* cited by examiner

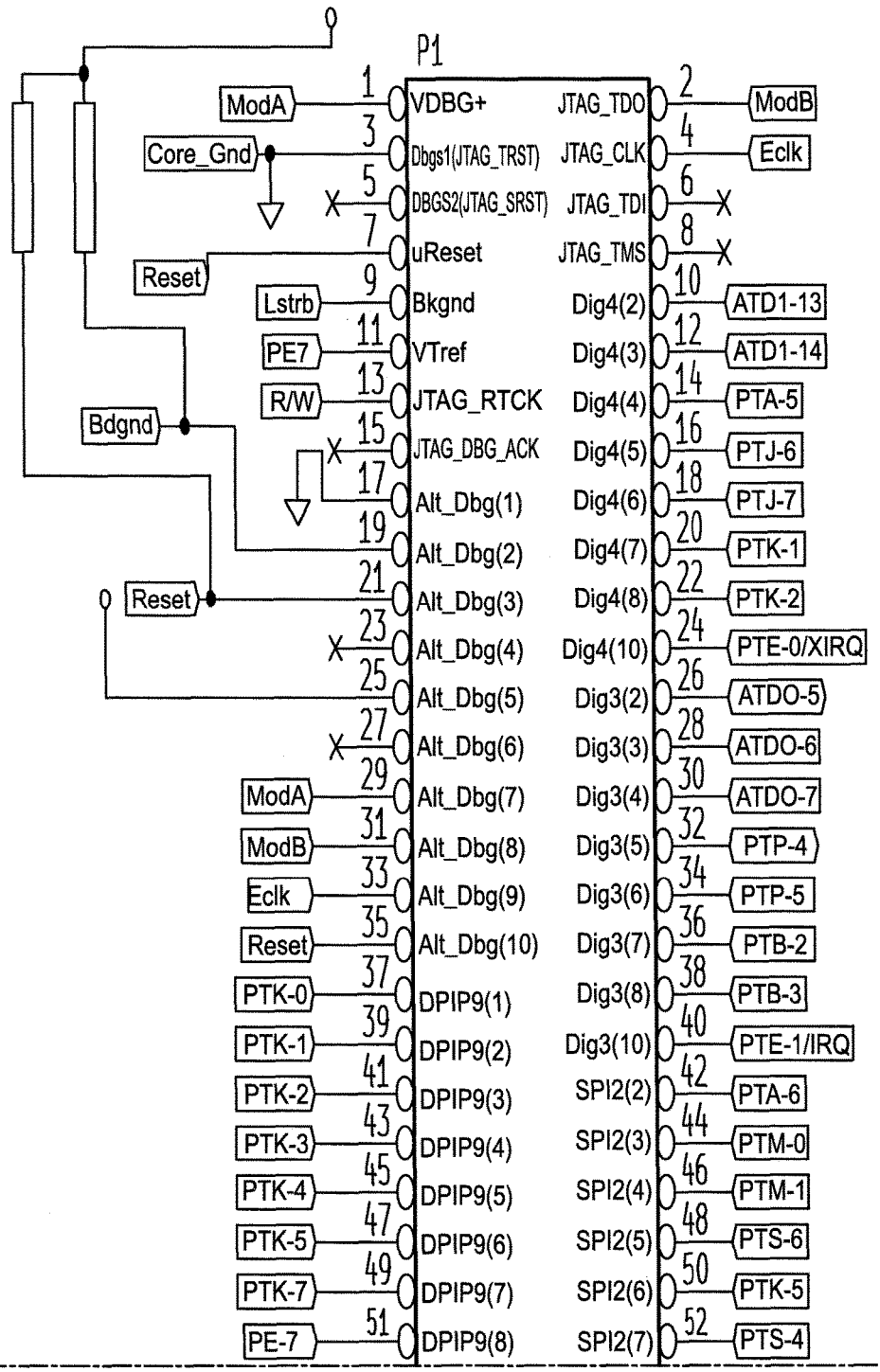
FIG. 16A MATCH LINE TO FIG. 16B

MATCH LINE TO FIG. 16A

| Left | Pin | DPIP | Signal | Pin | Right |
|---|---|---|---|---|---|
| PTB-0 | 53 | DPIP8(1) | SPI2(8) | 54 | PTS-5 |
| PTB-1 | 55 | DPIP8(2) | SPI2(10) | 56 | PTJ-0 |
| PTB-2 | 57 | DPIP8(3) | SCI(2) | 58 | ATD1-12 |
| PTB-3 | 59 | DPIP8(4) | SCI(3) | 60 | PTA-0 |
| PTB-4 | 61 | DPIP8(5) | SCI(4) | 62 | PTA-1 |
| PB-5 | 63 | DPIP8(6) | SCI(5) | 64 | PTA-2 |
| PB-6 | 65 | DPIP8(7) | SCI(6) | 66 | PTA-3 |
| PB-7 | 67 | DPIP8(8) | SCI(7) | 68 | PTS-0 |
| ATD1-8 | 69 | DPIP7(1) | SCI(8) | 70 | PTS-1 |
| ATD1-9 | 71 | DPIP7(2) | SCI(10) | 72 | PTH2 |
| ATD1-10 | 73 | DPIP7(3) | Dig5(2) | 74 | PTK-3 |
| ATD1-11 | 75 | DPIP7(4) | Dig5(3) | 76 | PTM-6 |
| ATD1-12 | 77 | DPIP7(5) | PTAD(1) | 78 | PTM-7 |
| ATD1-13 | 79 | DPIP7(6) | Dig5(5) | 80 | PTH-6 |
| ATD1-14 | 81 | DPIP7(7) | Dig5(6) | 82 | PTH-7 |
| ATD1-15 | 83 | DPIP7(8) | Dig5(7) | 84 | PTH-4 |
| PTH-0 | 85 | DPIP6(1) | Dig5(8) | 86 | PTH-5 |
| PTH1 | 87 | DPIP6(2) | Dig5(10) | 88 | PTH-0 |
| PTH2 | 89 | DPIP6(3) | Dig2(2) | 90 | ATDO-2 |
| PTH3 | 91 | DPIP6(4) | Dig2(3) | 92 | ATDO-3 |
| PTH-4 | 93 | DPIP6(5) | Dig2(4) | 94 | ATDO-4 |
| PTH-5 | 95 | DPIP6(6) | Dig2(5) | 96 | PTP-2 |
| PTH-6 | 97 | DPIP6(7) | Dig2(6) | 98 | PTP-3 |
| PTH-7 | 99 | DPIP6(8) | Dig2(7) | 100 | PTT-3 |
| PTJ-0 | 101 | DPIP5(1) | Dig2(8) | 102 | PTT-4 |
| PTJ-1 | 103 | DPIP5(2) | Dig2(10) | 104 | PTT-5 |
| PTJ-6 | 105 | DPIP5(3) | I2C2(2) | 106 | PTA-7 |

1610

FIG. 16B   MATCH LINE TO FIG. 16C

MATCH LINE TO FIG. 16B

| Left | # | Mid-L | Mid-R | # | Right |
|---|---|---|---|---|---|
| PTJ-7 | 107 | DPIP5(4) | I2C2(3) | 108 | PTM-2 |
| PTE-0/XIRQ | 109 | DPIP5(5) | I2C2(4) | 110 | PTM-3 |
| PTE-1/IRQ | 111 | DPIP5(6) | I2C2(5) | 112 | PTJ-6 |
| Lstrb | 113 | DPIP5(7) | I2C2(6) | 114 | PTJ-7 |
| PE4/Eclk | 115 | DPIP5(8) | I2C2(7) | 116 | PTT-6 |
| PTM-0 | 117 | DPIP4(1) | I2C2(8) | 118 | PTT-7 |
| PTM-1 | 119 | DPIP4(2) | I2C2(10) | 120 | PTH1 |
| PTM-2 | 121 | DPIP4(3) | I2C(2) | 122 | ATD1-10 | ← 1620
| PTM-3 | 123 | DPIP4(4) | I2C(3) | 124 | PTH3 |
| PTM-4 | 125 | DPIP4(5) | I2C(4) | 126 | PB-5 |
| PTM-5 | 127 | DPIP4(6) | I2C(5) | 128 | PTJ-6 |
| PTM-6 | 129 | DPIP4(7) | I2C(6) | 130 | PTJ-7 |
| PTM-7 | 131 | DPIP4(8) | I2C(7) | 132 | PB-6 |
| PTS-0 | 133 | DPIP3(1) | I2C(8) | 134 | PB-7 |
| PTS-1 | 135 | DPIP3(2) | I2C(10) | 136 | PTH1 |
| PTS-2 | 137 | DPIP3(3) | Dig6(2) | 138 | ATD1-9 |
| PTS-3 | 139 | DPIP3(4) | Dig6(3) | 140 | ATD1-11 |
| PTS-4 | 141 | DPIP3(5) | Dig6(4) | 142 | ATD1-15 |
| PTS-5 | 143 | DPIP3(6) | Dig6(5) | 144 | PTJ-6 |
| PTS-6 | 145 | DPIP3(7) | Dig6(6) | 146 | PTJ-7 |
| PTS-7 | 147 | DPIP3(8) | Dig6(7) | 148 | PTK-0 |
| PTP-0 | 149 | DPIP2(1) | Dig6(8) | 150 | PTA-4 |
| PTP-1 | 151 | DPIP2(2) | Dig6(10) | 152 | PTJ-1 |
| PTP-2 | 153 | DPIP2(3) | Dig1(2) | 154 | ATD0-0 | ← 1630
| PTP-3 | 155 | DPIP2(4) | Dig1(3) | 156 | ATD-1 |
| PTP-4 | 157 | DPIP2(5) | Dig1(4) | 158 | PTB-0 |
| PTP-5 | 159 | DPIP2(6) | Dig1(5) | 160 | PTP-0 |

MATCH LINE TO FIG. 16D

FIG. 16C

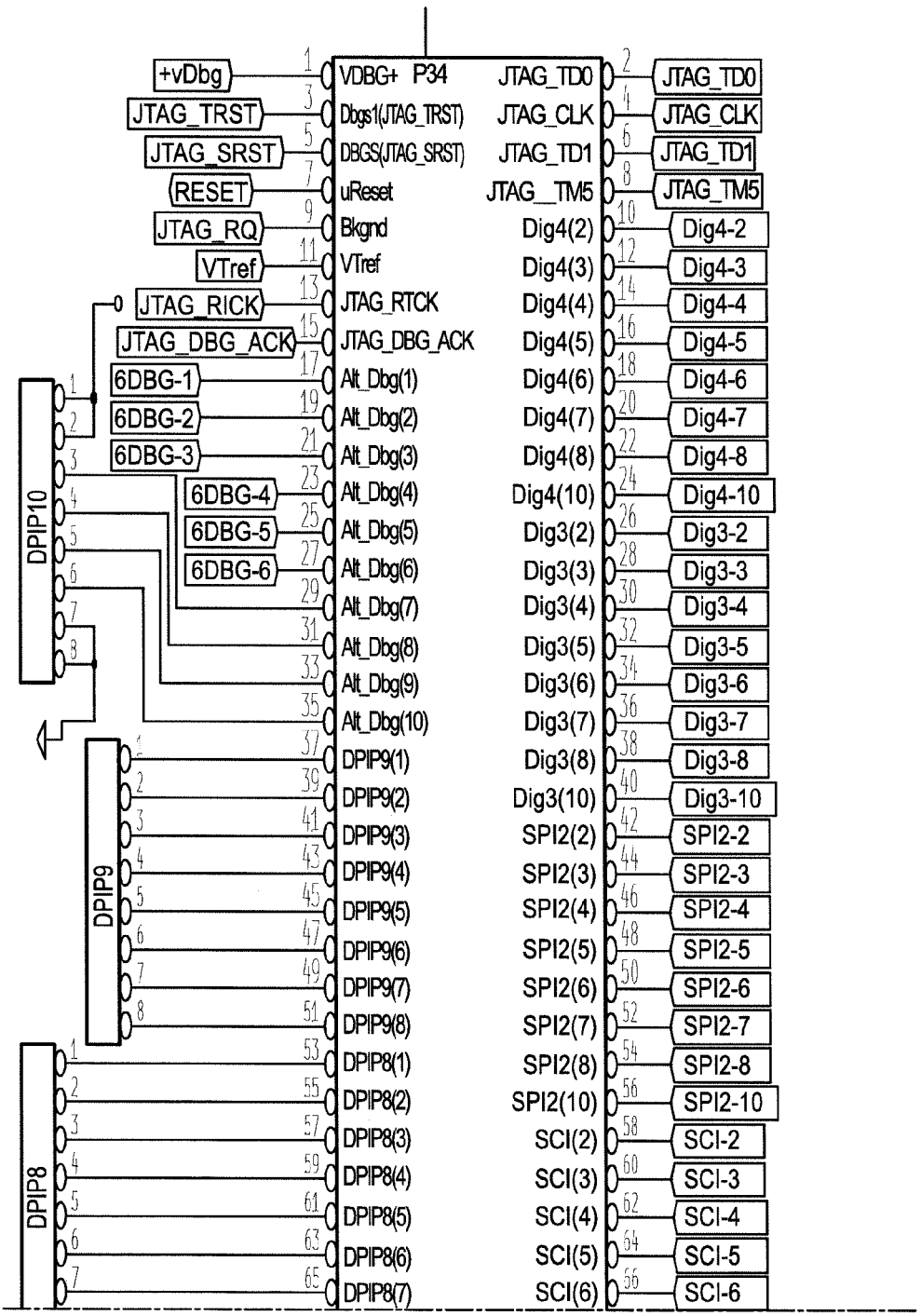
FIG. 17A   MATCH LINE TO FIG. 17B

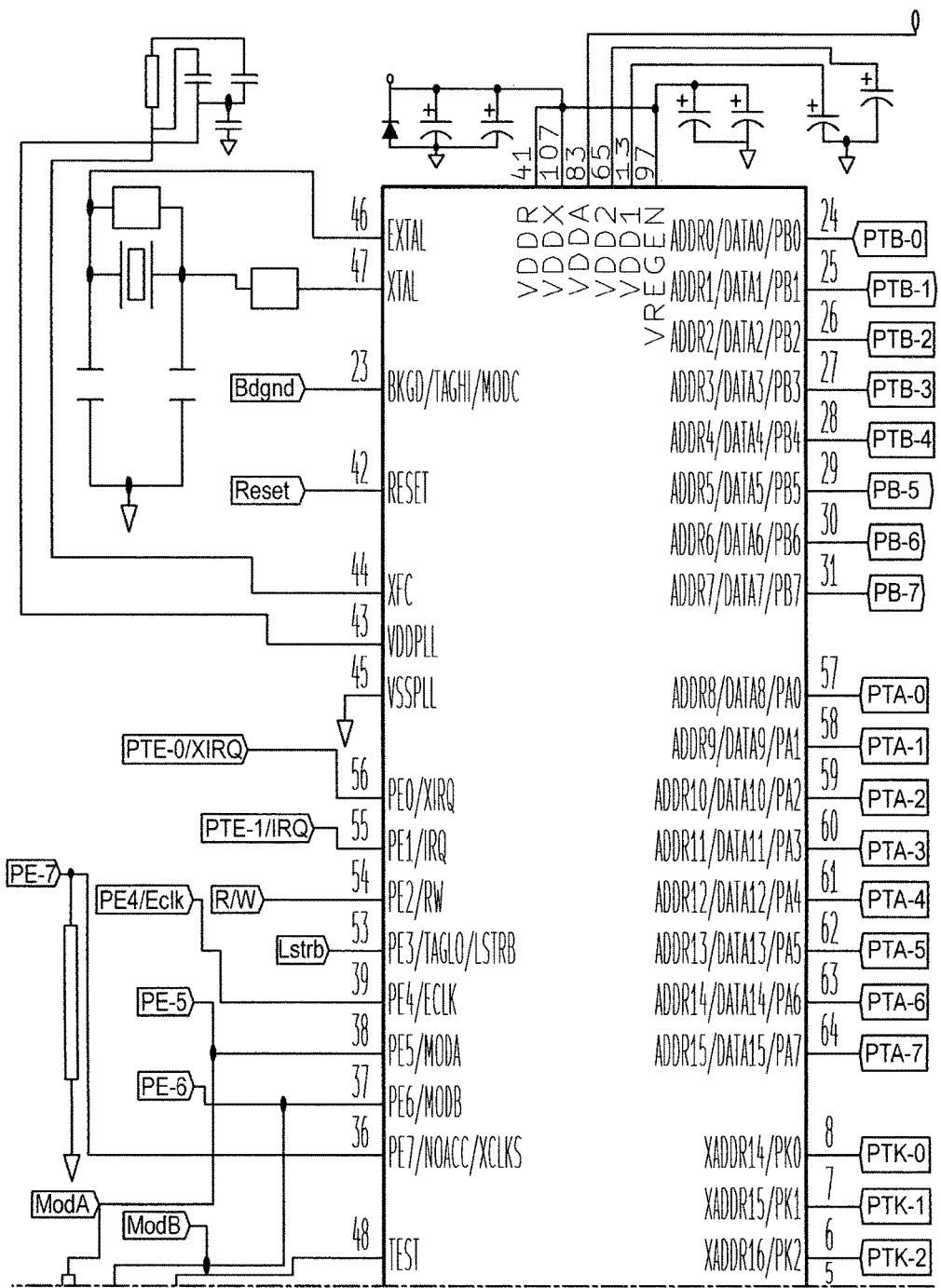
FIG. 19A  MATCH LINE TO FIG. 19B

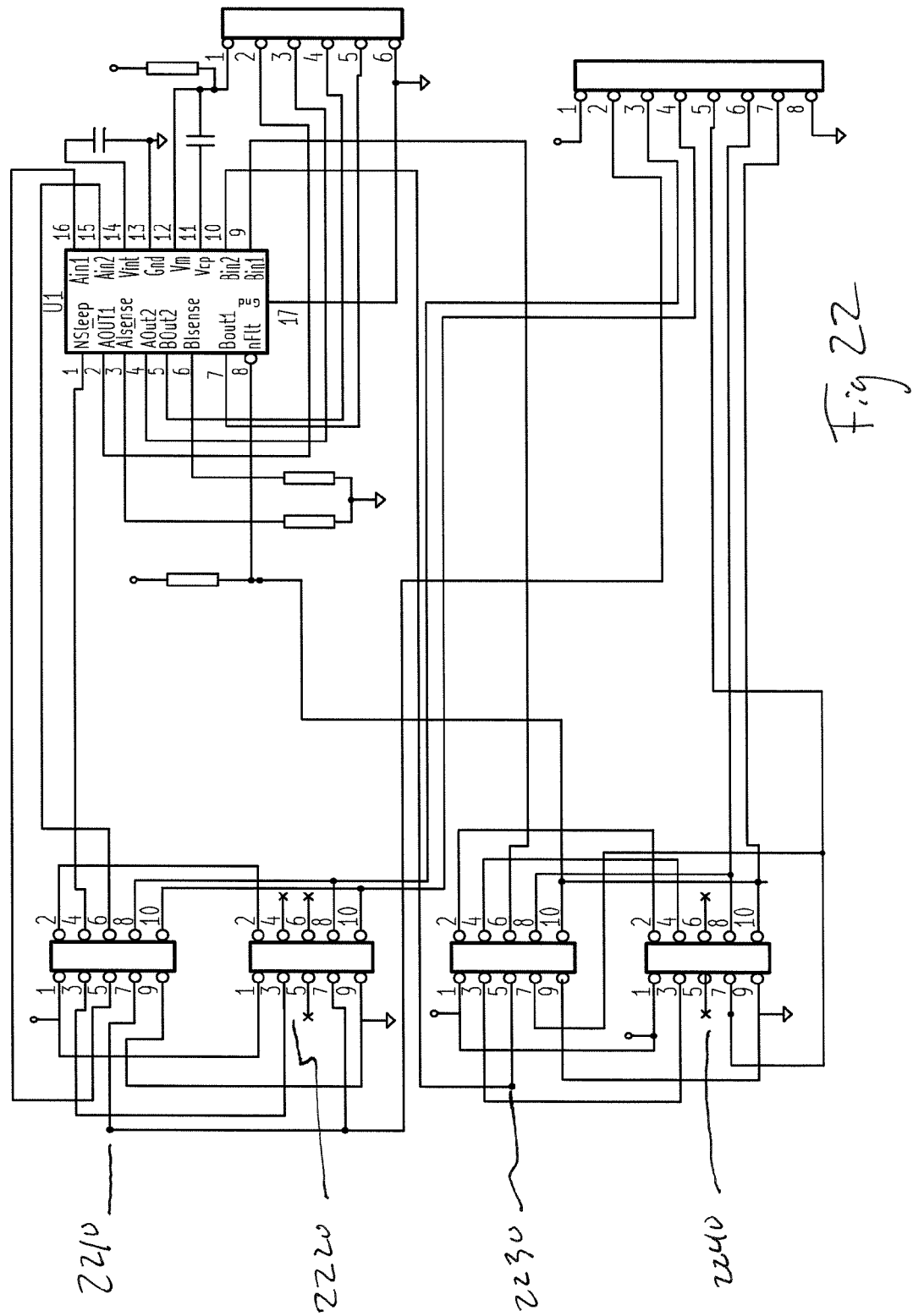

METHOD AND APPARATUS FOR THE PROCESSOR INDEPENDENT EMBEDDED PLATFORM

CROSS REFERENCE TO RELATED APPLICATIONS

This application claims the benefit of U.S. Application No. 61/770,339, dated Feb. 28, 2013.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BRIEF DESCRIPTION OF THE DRAWINGS

So that the manner in which the present application can be better understood, certain illustrations and figures are appended hereto. It is to be noted, however, that the drawings illustrate only selected embodiments and elements of a method, apparatus, and platform for the processor independent embedded platform and are therefore not to be considered limiting in scope for the method, platform and apparatus as described herein may admit to other equally effective embodiments and applications.

FIGS. 16A-16D include a 200 pin processor interface header contained within a processor circuit board module, under an embodiment.

FIGS. 17A-17C includes a schematic of a 200 pin processor interface header, contained within a motherboard module, under an embodiment.

FIG. 19A-C is a schematic of the MCS912 processor, under an embodiment.

FIG. 22 is a schematic of an H-Bridge peripheral, under an embodiment.

DETAILED DESCRIPTION

Figure 1:
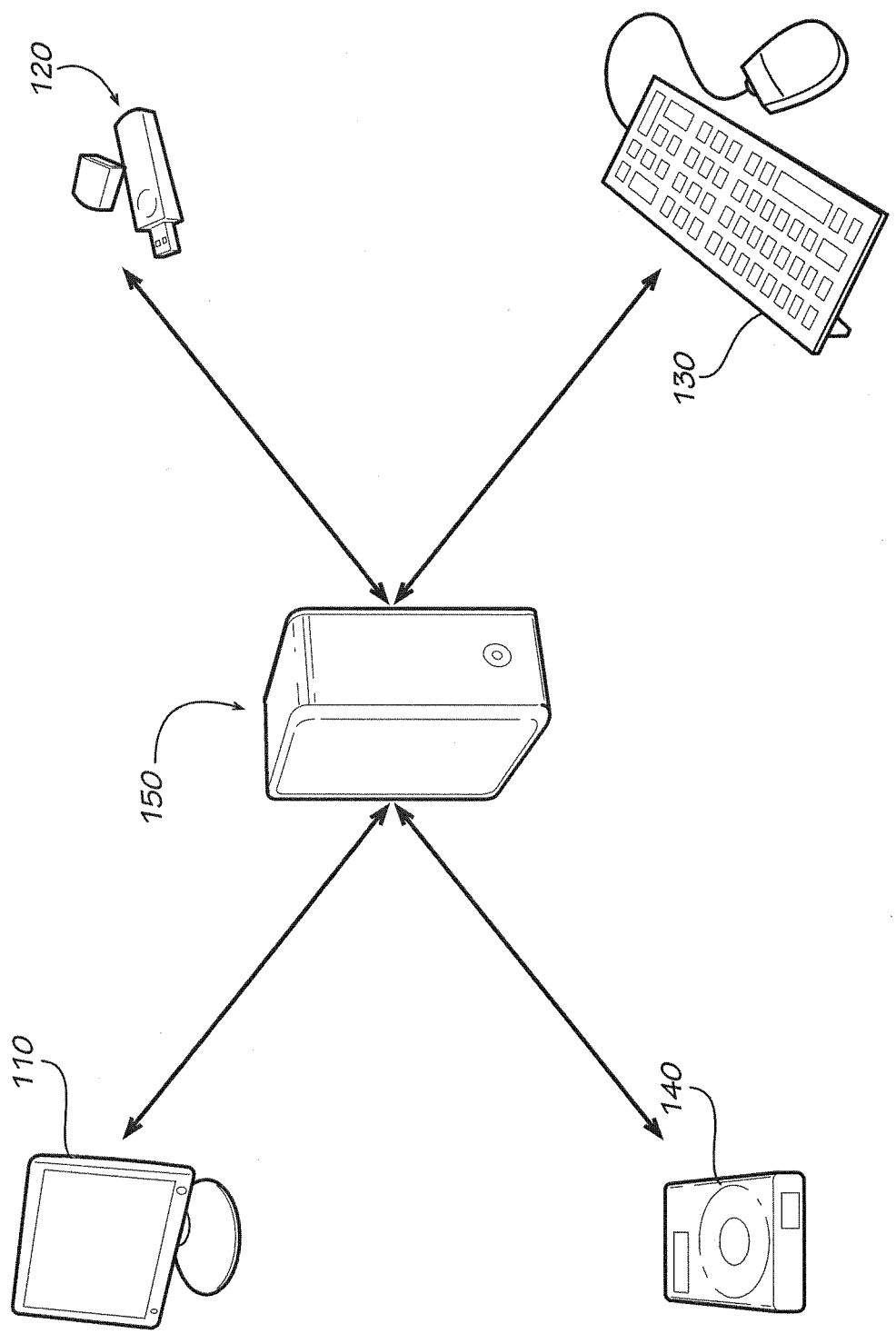
FIG. 1 shows a microcomputer transferring data to and receiving data from external devices, under an embodiment.

The Processor Independent Embedded Platform (PIEP) is under one embodiment a method and apparatus that permits a plurality of microcontroller types (processor types and architectures) to singularly interface with a plurality of peripheral devices. The PIEP was conceived with two primary objectives. The first objective was to design a system that could utilize multiple processors. This goal was established to enable the system design to maintain relevance as new microcontrollers were introduced and older processors entered into obsolescence. Secondly, a design goal was established to permit peripherals the ability to work with a multitude of processors. This second goal was established to enable a single peripheral board the broadest possible application across a wide array of processors. From a marketing strategy, both goals are enablers of the overall marketing strategy. By allowing processors and peripherals to span the greatest market segment possible, the total sales revenue increases while per unit production costs decrease. The ability to adapt processors and peripherals to an array of motherboards of varying size and capability also contribute to the established goals. In order to explore the merits of the design, it is first necessary to fully differentiate microcontrollers from the larger class of microcomputers.

Although microcontrollers are actually a sub-class of microcomputers, the two terms are most often associated with two different types of computing devices. Microcomputers generally refer to a class of computing devices most often found in desktop computers, workstations, and servers. These computing devices are designed to process large and complex data sets (graphics data inclusive) as well as efficiently transfer data between the microcomputer and connected devices (printer, keyboard, monitor, mouse and more). In order to facilitate expected data processing needs, most microcomputers contain wide, parallel, data paths to localized memory and cache storage.

The microcomputer generally includes the following features, characteristics and/or capabilities:

Internal/External Peripheral interface via high speed serial buses (USB, Ethernet, SC Card reader, etc.);
Internal peripheral interface via high speed parallel data buses (graphics card, RAM, PIC peripheral card;
Integral floating point math capability;
Multi-level cache;
Wide address and data buses (64 bit, 128 bit or higher);
Limited, or no, special purpose control/sensor signals;

Operating System required: Microsoft Windows, Linux, MAC;

Microcomputers are useful as file servers, personal computers, and work stations. Microcomputers may provide limited industrial control applications via internal peripheral cards or external devices. In contrast to the Microcomputer, a microcontroller generally includes the following features, characteristics and/or capabilities:

Peripheral interface via low speed specialized serial buses including CAN (automotive), SPI, I2C (local peripheral devices), I2S (audio), and USB (limited support, typically as a USB-B device).

Peripheral interface via specialized signal lines including PWM (proportional control for motors, heaters, etc.), ICOC (edge triggered sensor input), Timer (frequency detection, event measurement), Analog to Digital (voltage measurements), and Digital to Analog (output of analog voltage);

Limited integrated math capabilities;

No dedicated cache and limited RAM memory (programs typically stored in integral FLASH memory);

Narrow address/data buses (8, 16, 32 bit);

Operating system optional (many microcontroller implementations execute a single dedicated program).

Microcontrollers enable components of consumer electronics, robotics, industrial control systems, and automotive applications.

Microcomputers typically contain specialized capabilities, such as a floating point math processing module, to aid in data throughput. Beyond data processing, a microcomputer interfaces with its surroundings through serialized or parallel data transfer. To facilitate data transfers, a limited number of common interfaced standards have been designed (USB, SATA, Fire Wire, etc). These transfer interfaces permit a wide array of devices (printers, keyboards, mice, flash memory) to interact with the microcomputer via high speed serialized communication.

Although the microcomputer can interact with a wide array of devices, this interaction is almost exclusively in the form of data transfer. Physical manipulation of an external device is executed by specific hardware (a microcontroller) that is implemented on (or within) the connected device. For instance, a key press on a keyboard is interpreted by hardware in the keyboard. This key press is then converted to a serialized data stream that is subsequently transmitted to the host microcomputer.

FIG. 1 shows one or more of a monitor 110, flash memory 120, keyboard/mouse 130, and internal hard drive 140 coupled to a microcomputer 150. The monitor may communicate with the Microcomputer through VGA, DVI, and HDMI data transfers. The flash memory and keyboard/mouse may communicate with the Microcontroller through Serial Data Transfer via USB. The internal hard drive communicates with the Microcomputer using SATA, IDE, or SCSII serial data transfers under an embodiment. The microcomputer itself implements internal parallel and data transfers to/from RAM or graphics card.

Although most microcomputers support the installation of a limited amount of peripheral hardware, these interfaces still utilize serial or parallel data transfer as the interface mode. A very common interface example is the installation of an Ethernet (network) card in a desktop computer. This card will most likely connect to the microcomputer via a PCI slot on the computer's motherboard. The hardware needed to execute the Ethernet function is wholly contained on the peripheral card. Data processed via the Ethernet card is then transferred to the host microcomputer via the parallel data transfer on the PCI interface bus.

Unlike microcomputers, microcontrollers (by comparison) have limited data transfer and processing capabilities. However, microcontrollers do have specialized interface signals specifically designed for interaction with external devices. Direct connection to sensors, motor control circuits, and other hardware is possible with these specialized signals. Unlike microcomputers, these interfaces are typically not high speed serial or parallel data channels. For instance, a sensor that outputs a voltage, corresponding to a measured parameter, can be directly interfaced with a microcontroller input pin that is designed to receive analog voltages. Unlike microcomputers, microcontrollers have a much more active role in executing a peripheral function. While microcomputer peripherals contain all of the functionality needed to execute a task, microcontrollers often share hardware requirements with the peripheral device. In the cited example, the sensor is required to process an external measurement and convert the measurement into a voltage. The embedded controller is required to accurately measure this voltage. If this function were implemented on a microcomputer, the peripheral would typically convert the voltage to a serial data stream for transfer via a standardized communication protocol (such as USB). While microcontrollers do support a number of serial data transfer standards, most have been specifically designed to support microcontroller centric needs such as I2C (localized serial transfer) and CAN (communication bus for use in automobiles).

Figure 2:
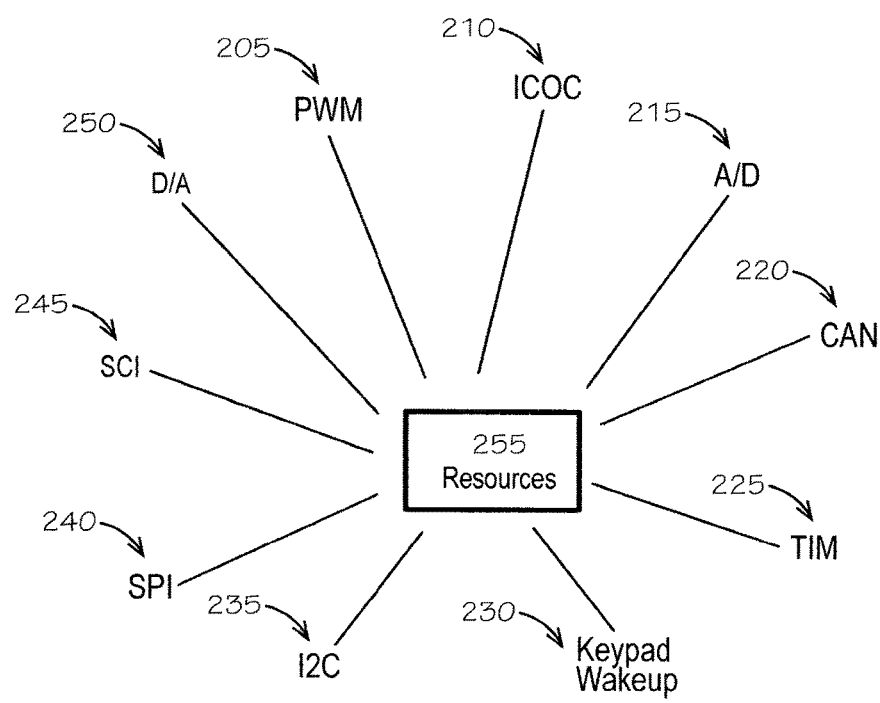
FIG. 2 shows microcontroller resources, under an embodiment.

FIG. 2 shows resources provided by a Microcontroller including Pulse Width Modulation 205, Input Capture/Output Compare (ICOC) 210, Analog to Digital Converter (A/D) 215, Controller Area Network (CAN) 220, Timers (TIM) 225, Keypay Wake-up 230, Inter-IC Bus (I2C) 235, Serial Peripheral Interface (SPI) 240, Serial Communications Interface (SCI) 245, and Digital to Analog Converter (D/A) 250. Additional resources may include Interrupts (IRQ), Byte Data Link Controller (BDLC), USB OTG, and Analog Compare. A detailed description of these resources follows.

Pulse Width Modulation (PWM) comprises a moderate to high speed switching digital signal. There is a proportional amount of time signal is logic high versus logic low (duty cycle) and timing interval between logic high transitions (period) are tightly controlled. PWM is typically used for speed control on motors, dimming function on lights, modulation of heating and cooling devices, and speed control on pumps.

Input Capture Output Compare (ICOC) detects a number in high/low logic transitions on connected signal (input capture) or changes state of an output upon a specific number of input transitions (output compare). ICOC may be used for counting of pulse events, such as pulse encoders for motors. Output compare may be used to automatically stop a motor once a desired encoder count is reached.

Digital to Analog (D/A or DAC) implements conversion of a digital value to a pseudo analog output. The output is not truly analog as the signal increments, or decrements, in discrete intervals. Interval levels are determined by the resolution of the DAC. D/A converters may be used for input signal generation to amplifiers and to interface with older analog instrumentation and control devices (such as analog flow controller setpoint adjustments). Digital to Analog converters (D/A) implement conversion of analog signals to discrete voltage (i.e. logic) levels.

Controller Area Network (CAN) comprises a 2 wire differential pair communications bus (asynchronous). The CAN was developed for use in automobiles, and provides communications between a multitude of embedded controllers within an automobile (including one or more of engine control, climate control, and safety systems).

Timers (TIM) may time transition events. Input transitions may start a time capture event in which an internal counter runs upon input signal level transition. TIM may be used to measure frequency of an oscillating signal or period/duty cycle of a PWM generated signal.

Keypad Wakeup detects input signals from alpha numeric (or numeric) keypads. Keypad presses generate an interrupt via the wakeup inputs. Keypad wakeup includes user interface keypads and controls.

Inner-IC Bus (I2C and also known as TWI or two wire interface) comprises a 2 wire (clock/data) serial communications and provides communication between an embedded controller and an I2C capable integrated circuit. I2C is typically used for interface with complex Integrated Circuits (including accelerometers and nonvolatile memory).

Serial Peripheral Interface (SPI) includes a 4 wire communication (including clock, data to peripheral, data from peripheral, and device select). SPI generally has the same uses as I2C. However SPI supports much higher data rates due to bidirectional data transfer. Many integrated circuits support both I2C and SPI on the same device.

Serial Communications Interface (SCI) comprises a 2 wire asynchronous serial communication. When paired with appropriate hardware, SCI may be used to implement RS232 serial communications. SCI represents an older communications standard used in personal computers, industrial controllers, and embedded devices. Hardware transceivers are typically incorporated with SCI communications to implement RS232 data transfer or RS485 data transfer (industrial applications). Transceivers boost signal levels from logic level to voltages corresponding to RS232 or RS485 transmission standards.

Universal Serial Bus (USB) provides serial communications commonly found on many consumer devices (computers, phones, cameras, tablets). When used as a peripheral USB connection, embedded device may be interfaced with personal computers, phones or tablets for control and data transfer.

Interrupt (IRQ) provides general purpose processing interrupts. Interrupts are used to interrupt the normal microcontroller operation and address interrupt condition. One example application of an interrupt comprises a loss of power interrupt controller wherein a loss of source power may produce an interrupt on the IRQ line and redirect processing operations to initiate a loss of power shutdown sequence.

Byte Data Link Controller (BDLC) comprises an older communication standard that predates CAN and with prior uses in automobile industry. The BDLC standard has largely been replaced by CAN.

USB On The Go (USB OTG) is used on embedded devices. It can either function as a peripheral or limited host. In peripheral mode, the embedded device operates as a peripheral to a personal computer or other control device. In host mode, the device can be used to read flash memory, interface with printers, and some other limited host modes.

Analog Compare comprises two or more analog inputs compared against each other or an internal reference voltage, An output state change may occurs when the comparison exceeds a threshold. As one example, a state change occurs when an input voltage 1 becomes greater than input voltage 2. Analog compare may be used to initiate a shutdown sequence if a battery voltage drops below a prescribed threshold.

In addition to the resources describe above, microcontroller interface signals may also include additional special purpose microcontroller signals. These resources or special purpose signals may function as general purpose I/O (Digital I/O) signals (FIG. 2, 255) which enables the microcontroller to interface with real world devices. Special purpose pins may be dynamically repurposed as alternative resources via control registers internal to a microcontroller.

Microcontrollers tend to target price sensitive/power sensitive applications. Many microcontroller applications are battery powered and are implemented in systems that cost a fraction of microcomputer based systems.

Figure 3:
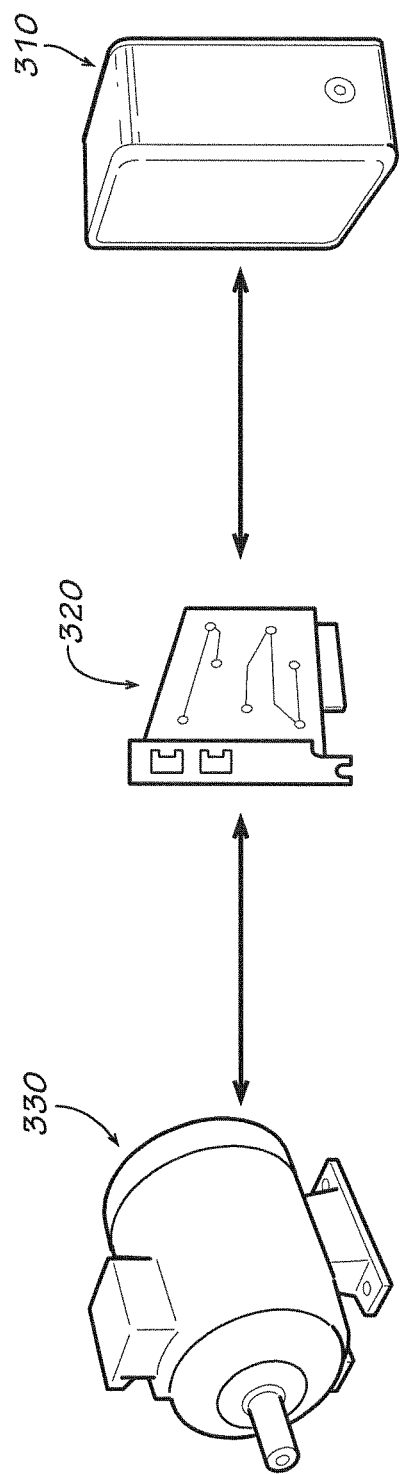
FIG. 3 shows a microcomputer transferring data to and receiving data from an external device through a peripheral card, under an embodiment.
Figure 4:
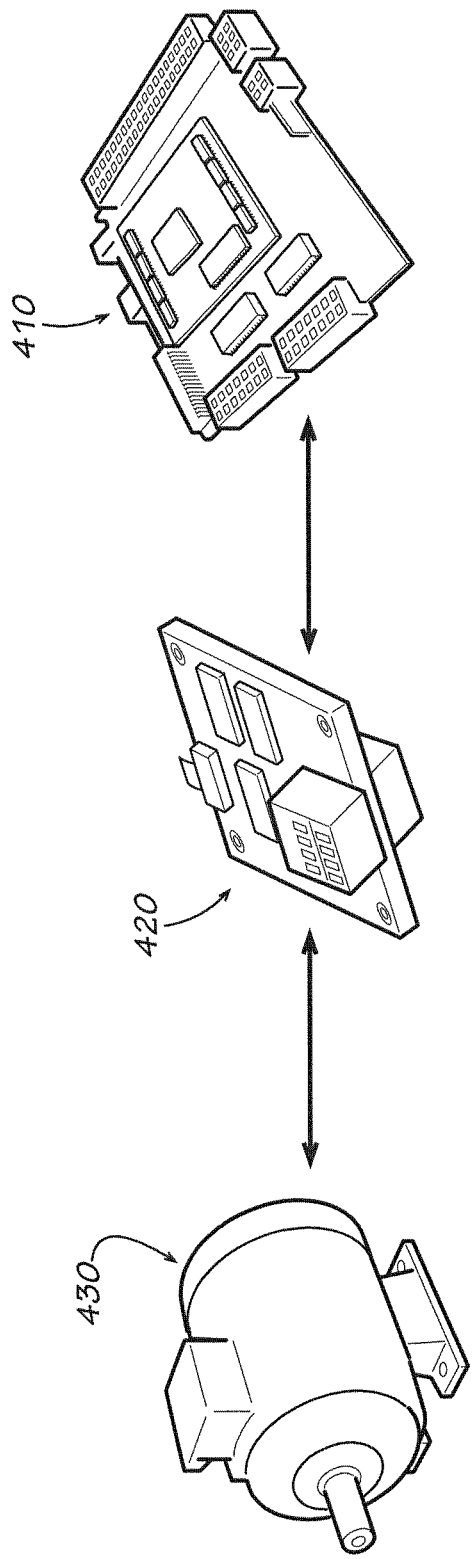
FIG. 4 shows a microcontroller transferring data to and receiving data from an external device through a peripheral card, under an embodiment.

While microcomputers are not generally preferred for instrumentation and control functions, these devices do have some limited applications in industrial settings. As shown in FIG. 3, interaction with external devices can be achieved via specialized peripheral devices (either internal or external). FIG. 3 show a microcomputer 310 that sends parallel data to a peripheral card 320 through an internal PCI bus. Based on the data, the peripheral card controls power to a motor 330 and then reads back motor speed in the form of pulsed digital output. Low level signal generation and control is executed by the peripheral device for this microcomputer implementation. In a microcontroller implementation, the low level control and instrumentation is executed by the microcontroller device while the peripheral serves primarily as a signal conditioning apparatus. FIG. 4 shows a peripheral card 420 that conditions low level control signals from a microcontroller 410 and sensor signal from a motor 430. The low level control and instrumentation is executed by the microcontroller device.

Most embedded systems don't have interchangeable processors. They typically have the processors built into the motherboard and the only interchangeable parts are the peripheral cards. Of the few that do have interchangeable processors, the emphasis is still on the peripherals and the compatible processors tend to be very limited and not as varied as those offered by the Processor Independent Embedded Platform (PIEP) as described herein.

Figure 5:
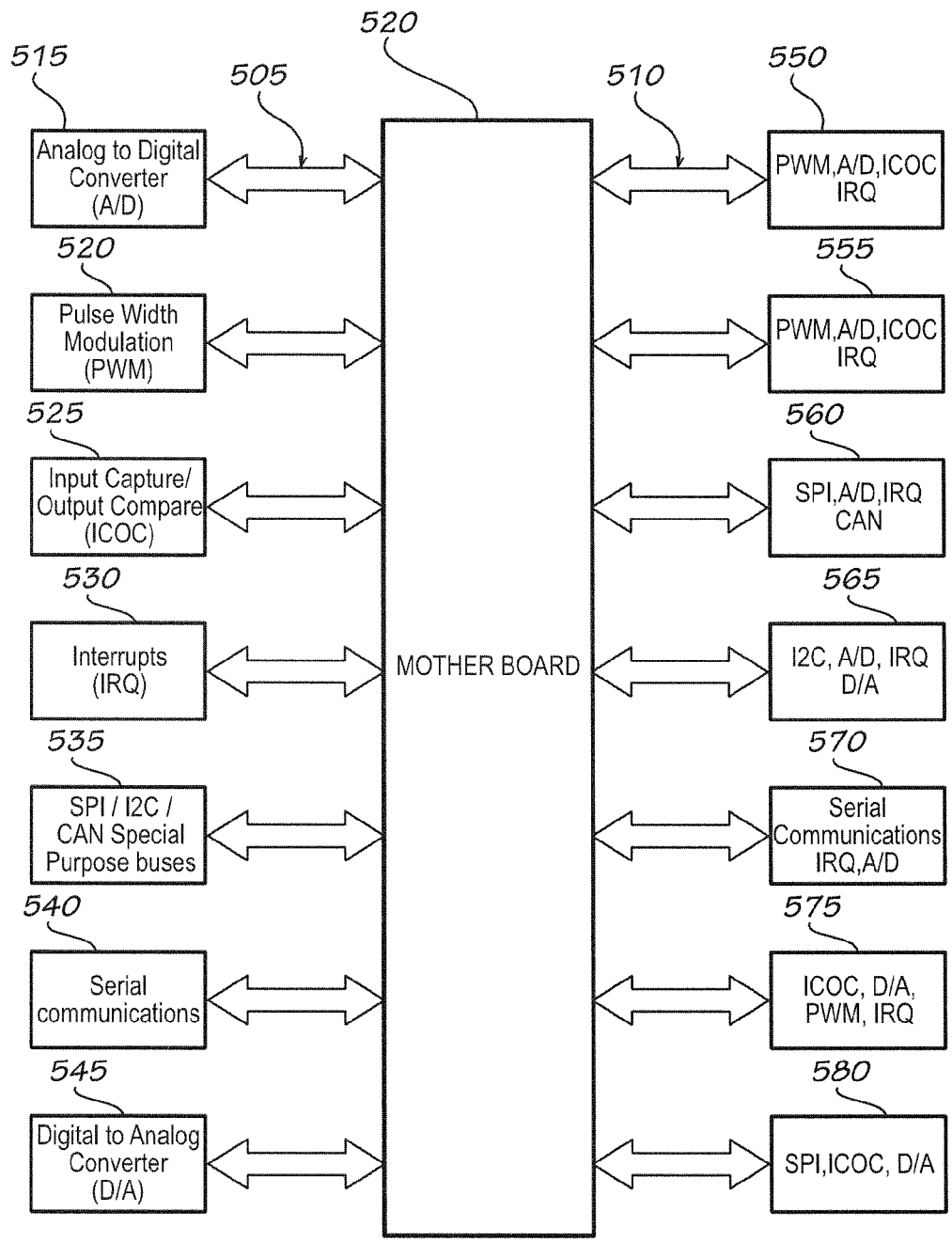
FIG. 5 is a block diagram showing a microcontroller interface and a peripheral interface of a PIEP motherboard, under an embodiment.

In designing the PIEP, specific interface requirements of the microcontroller were considered as well as interface requirements of peripheral devices. Defining specifications for both microcontroller and peripheral interface points permits optimization not only of both interface points but also the system as a whole. FIG. 5 shows the motherboard 520 of the PIEP which includes a microcontroller interface 505 and a peripheral interface 510. The microcontroller interface optimizes support for a wide array of microcontroller architectures and devices including Analog to Digital Converter (A/D) 515, Pulse Width Modulation (PWM) 520, Input Capture/Output Compare (ICOC) 525, Interrupts (IRQ) 530, SPI/I2C/CAN Special Purpose buses 535, Serial communications 540, and Digital to Analog Converter (D/A) 545. The peripheral interface is optimized for support of a wide array of peripherals including support for PWM, A/D, ICOC, IRQ 550 (for motion control/data acquisition interface), PWM, A/D, D/A, IRQ 555 (for Mixed signal general purpose interface), SPI, A/D, IRQ, CAN 560, (for SPI & CAN Interface), I2C, A/D, IRQ, D/A 565 for (I2C Interface, Serial Communications) IRQ, A/D 570 (for Serial Communications Interface), ICOC, D/A, PWM, IRQ 575 (for Mixed Signal Interface), and SPI, ICOC, D/A 580 (for Alternate SPI Interface).

In its simplest form, the PIEP design can be evaluated based on resource needs and availabilities. This first step was accomplished by selecting a wide array of peripherals that are likely to be used, identifying specific embodiments of each peripheral function, and then identifying resource needs for each embodiment. Table 1 below shows a Peripheral Usage Resource analysis.

their original state during transition. A switch debounce buffers out any "bounce" actuations or deactivations during the transition.

HART Protocol comprises a rugged serial protocol commonly used in industrial devices. Instruments, such as flow meters and sensors, may transmit data via the HART protocol to connected devices (such as embedded controllers).

TABLE 1

| | Type of Resource Used | | | | | | | |
|---|---|---|---|---|---|---|---|---|
| | Digital | SPI (3 sharable) | I2C (2 sharable) | SCI | A/D | PWM | ICOC | IRQ (sharable) |
| EEPROM | | | 2 | | | | | |
| RTC | | | 2 | | | | | 1 |
| Capacitive touch controller (AD 7147) | 2 | 4 | | | | | | 1 |
| D/A board dac8532 | | 4 | | | | | | |
| Dig Port Expander | | 4 | | | | | | |
| Dual Switch Debounce (Max 6817) | 1 | | | | | | | |
| HART Protocol Modem (Analog Devices AD5735 | | 4 | | | | | | |
| Light sensor | 1 | | | | | | | |
| Remote/Local Temp Sensor bd, 5 chan, I2C based (Max 1989) | | | 2 | | | | | 1 |
| Resistive touch controller (AD7877) | | 4 | | | | | | 1 |
| Serial Port Expander (SPI based) | | 4 | | | | | | |
| USB host adapter (SPI or SCI or Digital) | 11 (if not SPI) | 4 | | 8 | | | | |
| 16 seg LED driver with keypad reader I2C based, Max6955 | 2 | | 2 | | | | | |
| 4-20 ma input (max1400 front end) | | | | | 2 | | | |

The top row of the table includes commonly used resources (including Digital I/O, SPI, I2C, SCI, A/D, PWM, ICOC, and IRQ) while the left column indicates various peripherals including EEPROM, RTC, Capacitive touch controller (AD 7147), D/A board (dac 8532), Dig Port Expander, Dual Switch Debounce (Max 6917), Hart Protocol Modem (Analog Devices AD5735), Light Sensor, Remote/Local temp sensor, Resistive touch controller (AD7877), Serial Port Expander (SPI based), USB host adapter (SPI or SCI or Digital), 16 seg LED driver with keypad reader (I2C based, Max6955), and 4-10ma input.

Additional detail regarding the peripherals and their functions are provided below.

EEPROM comprises nonvolatile memory. Data is stored and retrieved in small intervals (typically either character or byte wide data). EEPROM is under one embodiment used to store operating parameters and calibration data.

Real time date clock (RTC) typically tracks time of day, and contains a calendar. Some devices may also include alarm functions wherein the clock will generate an output signal on a prescribed period (such as once per second) or on a specific time and date.

Dig Port Expander provides a virtual digital port. Communication between the expander and host processor is typically either SPI or IC2 based. The device outputs serve as general purpose digital signal lines, typically implementing either 8 or 16 digital I/O lines.

Dual Switch Debounce handles signal bounce during transition events. Upon actuation or deactivation of a switch, the switch contacts may momentarily "bounce" or return to Serial Port Expander creates a virtual SCI (serial communication interface) port. Expanders may interface via SPI or I2C interface. The virtual port may be realized (with appropriate transceivers) as RS232 serial ports or other SCI based ports.

Resistive Touch Controller comprises a membrane type switch controller wherein a button press changes the resistance of the membrane keypad. Detection of this event may be achieved with a resistive touch controller.

A 16 seg LED Driver may be used to drive two digits of a numeric display (with decimal points) whereas a typical LED numerical display (with decimal point) contains 8 segments.

A 4-20 mA input converts current level to a voltage level. Many industrial devices transmit sensor levels via a current signal that ranges from 4 mA up to 20 mA (4 mA representing the lowest level on the device scale, 20 mA the highest). Embedded controllers do not typically contain the hardware to directly measure current, therefore an interface device is needed to convert the current to a voltage.

As described above, the PIEP design can be evaluated based on resource needs and availabilities. This first step was accomplished by selecting a wide array of peripherals that are likely to be used, identifying specific embodiments of each peripheral function, and then identifying resource needs for each embodiment. As already indicated above, Table 1 above shows a Peripheral Usage Resource analysis listing common resources across the top of the table and peripherals along the left side of the table. Table entries map resources to peripherals. For example, the EEPROM row and I2C column intersect at a highlighted table entry containing the number two (2). This number indicates that the EEPROM peripheral requires two I2C resources. As another example, a capacitive touch controller requires 2 digital I/O, 4 SPI, and 1 IRQ resources. Of course, the table is representative and not all inclusive. Further, resources designated as sharable may be used by multiple peripherals.

Following identification of resource needs, a diverse group of microcontrollers (processors) were selected and analyzed. The microcontroller analysis considered resource types, the quantities of each type, as well as the commonality of resources (quantities and types) across the array of devices under consideration. Resources common to all evaluated devices were designated as the minimum acceptable level of resources that would be available in the implemented system design. Table 2 below shows the analysis of microcontroller resources common across architectures and processors.

TABLE 2

|  | Resource Type | | | | | |
| --- | --- | --- | --- | --- | --- | --- |
|  | Freescale MC9S12DP512 | Freescale ARM MAC7106 | Intel Z51F6412 | Microchip PIC24FJ256GA110 3.3 Volt part | Microchip 16 bit dsPIC30F6014A | Min Resource |
| Total I/O | 87 | 112 | 66 | 85 | 68 | 66 |
| A/D | 16 (10 bit) | 32 | 15 | 16 | 16 | 15 |
| PWM | 8 | 8 | 5 | 9 | 8 | 5 |
| TIM | 8 | 8 | 6 | 5 | 5 | 5 |
| ICOC | 8 | 8* |  | 9 | 8 |  |
| Keypad Wakeup IRQ | 20 |  |  |  |  |  |
| SCI | 2 | 4 | 4 | 4 | 2 | 2 |
| SPI | 3 | 4 | 2 | 3 | 2 | 2 |
| I2C | 1 | 1 | 1 | 3 | 1 | 1 |
| CAN | 5 | 4 |  |  | 2 | 2 |
| BDLC | 1 |  |  |  |  |  |
| USB OTG |  |  |  |  |  |  |

Table 2 features microprocessor type across the top of the table and resources corresponding to each such processor in the left column of the table. The resources include A/D, PWM, TIM, ICOC, Keypad wake IRQ, SCI, SPI, I2C, CAN, BDLC, and USB OTG. A detailed description of such resources and corresponding functionality is set forth above. As shown in the table, the Freescale MC9S12 processor includes 87 total I/O signal points including the following type (number) of resources: PWM (8), TIM (8), ICOC (8), Keypad Wake IRQ (20), SCI (2), SPI (3), I2C (1), CAN (5), and BDLC (1).

The introduction of any subsequent microcontroller (processor) device must contain the minimum resource types and quantities identified in order to retain full compliance with PIEP design specifications. Using a resource alignment method (FIG. 6), we matched the minimum resource requirements (guaranteed resources available from a microcontroller) against the resource needs of evaluated peripherals. This resulted in the creation of a generic or common alignment table. The alignment table helped us determine the optimum mix of resource types on a peripheral interface connector, the number of peripherals that could typically be stacked together (on a single interface header), and the total number of peripheral headers that should be implemented on a system.

From that we created the generic map file (see Table 3 below). The generic map file assigns specific resource types and quantities to specific peripheral interface headers. This assignment defines known resource locations and quantities that will be presented on the Motherboard. Independent of the installed processor, resources assigned by the generic map file will be presented in known locations (both interface header and pin position on the header). This knowledge enables the design of peripheral devices that can interface with the PIEP system, regardless of the specific processor installed.

Figure 6:
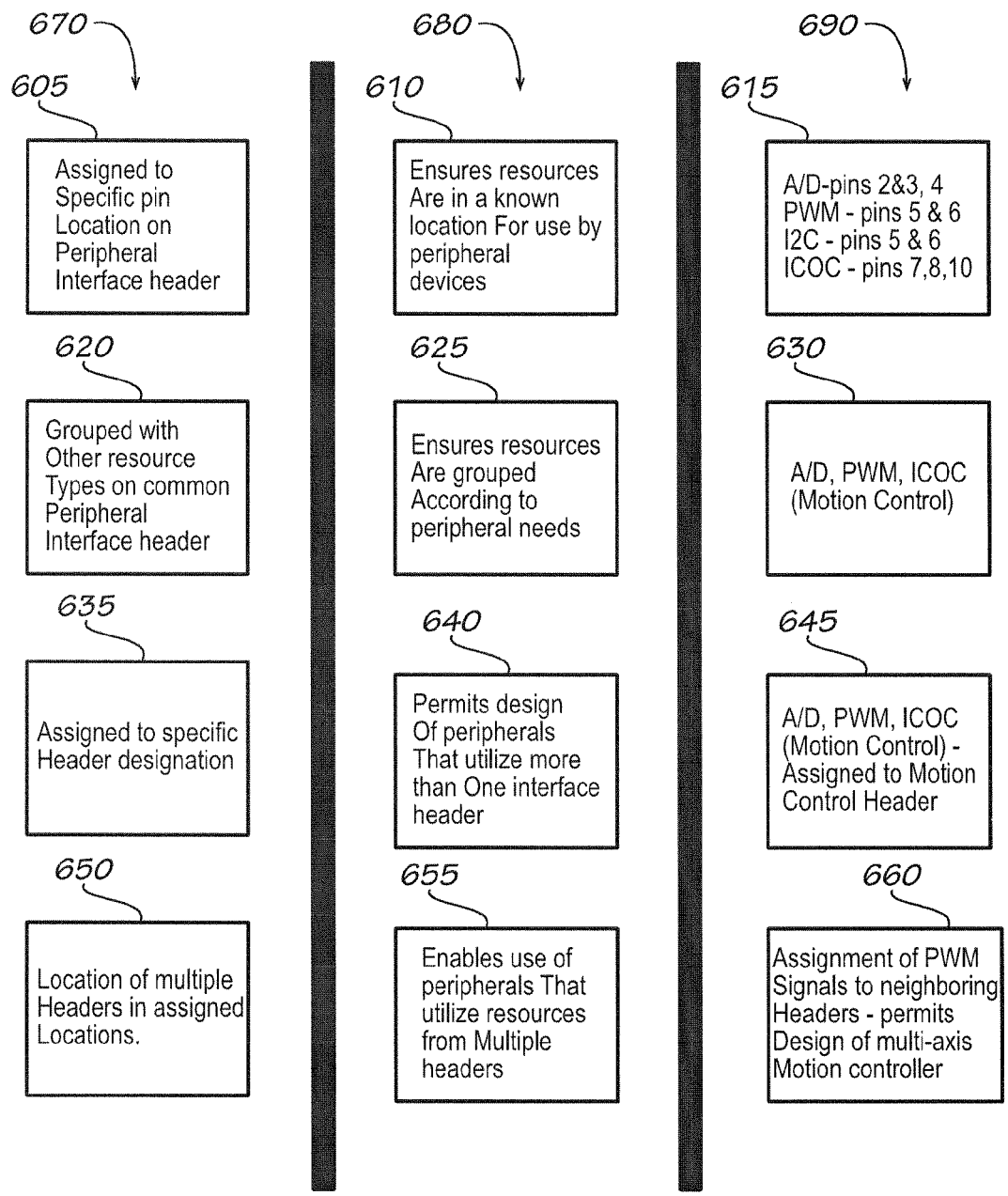
FIG. 6 shows steps of a resource alignment method under an embodiment

FIG. 6 shows the resource realignment method used to combine data from Table 1 and Table 2 in order to produce a generic map file (shown in Table 3 below) which maps specific microprocessor resources to a pin location on the PIEP board. The generic map file maps resource to pin/header locations across six top slot headers and six back slot headers. All twelve headers correspond to physical headers featured on the motherboard bottom. The top and back slot headers are referred to as Stackable Peripheral Interface Ports (SPIP). Each such header includes ten (10) pin locations.

The resource alignment method assigns resources to header/pin locations in four steps of decreasing priority. As seen in FIG. 6, each of the four steps includes a method component 670, a purpose component 680, and result component 690. The first step 605 of the alignment method assigns type of resource to pin number locations to ensure resources are in a known location across headers 610. In other words, if the resource appears on a header, it will appear in an assigned position. As one example of this resource assignment 615, the A/D resource is assigned to pins 2, 3 & 4. This means that if a header features three A/D resources, they will appear in position 2, 3 & 4 on such header. Step two 620 of the method includes grouping resource types on common peripheral headers according to functional needs or end uses of peripheral devices 625. As one example 630, A/D, PWM, and ICOC resources may be grouped to provide motion control processing. The third step 635 of the alignment method assigns resources (including the grouped resources) to specific header designations to permit the design of peripherals that utilize more than one interface header 640. As one example 645, the motion control resources (A/D, PWM, and ICOC) are assigned to a particular "motion control" header. The fourth step 650 of the resource alignment method includes locating adjacent resource groups for sharing by one or more peripherals 655.

As one example 660, the method may assign PWM signals to neighboring headers thereby permitting the design of a multi-axis motion controller.

Using the resource alignment method, the generic map file was created. Table 3 below shows the generic map file.

TABLE 3

Top Slots

| SPI1 (top) | | | Dig 1 (top) | |
|---|---|---|---|---|
| Vcc | AD-9 | 1 | Vcc | AD-1 |
| DIO | DIO-5 | | AD-2 | DIO-1 |
| SPI-MOSI | SPI-MISO | | PWM-1 | PWM-2 |
| SPI-SCK | SPI-SS | | ICOC-1 | ICOC-2 |
| GND | INTR1 | 9 | GND | ICOC-3 |

| I2C1 (top) | | | Dig2 (top) | |
|---|---|---|---|---|
| Vcc | AD-10 | 1 | Vcc | AD-3 |
| DIO | DIO-6 | | AD-4 | AD-5 |
| I2C-SDA | I2C-SCL | | PWM-3 | PWM-4 |
| DIO-7 | DIO-8 | | ICOC-4 | ICOC-5 |
| GND | INTR2 | 9 | GND | ICOC-6 |

| SCI1 (top) | | | Dig3 (top) | |
|---|---|---|---|---|
| Vcc | AD-11 | 1 | Vcc | AD-6 |
| DIO-9 | DIO-10 | | AD-7 | AD-8 |
| DIO-11 | DIO-12 | | PWM-5 | DIO-2 |
| SCI-RX | SCI-TX | | DIO-3 | DIO-4 |
| GND | INTR3 | 9 | GND | IRQ |

Back Slots

| SPI2 (bottom) | | | Dig4 (bottom) | |
|---|---|---|---|---|
| Vcc | DIO | 1 | Vcc | PS++ |
| DIO | PS++ | | PS++ | PS++ |
| SPI-MOSI | SPI-MISO | | PS++ | PS++ |
| SPI-SCK | SPI-SS | | PS++ | PS++ |
| GND | INTR7 | 9 | GND | INTR4 |

| I2C2 (bottom) | | | Dig5(bottom) | |
|---|---|---|---|---|
| Vcc | PS++ | 1 | Vcc | PS++ |
| PS++ | PS++ | | PS++ | PS++ |
| I2C-SDA+ | I2C-SCL+ | | PS++ | PS++ |
| DIO | PS++ | | PS++ | PS++ |
| GND | INTR8 | 9 | GND | INTR5 |

| SCI2 (Bottom) | | | Dig6 (bottom) | |
|---|---|---|---|---|
| Vcc | PS++ | 1 | Vcc | PS++ |
| PS++ | PS++ | | PS++ | PS++ |
| DIO-22 | DIO-23 | | PS++ | PS++ |
| SCI-RX | SCI-TX | | PS++ | PS++ |
| GND | INTR9 | 9 | GND | INTR6 |

Key to Table 3:
Vcc - peripheral voltage supply pin - either 5 V or 3.3 V supplies are permitted, processor specific implementation determines which voltage(s) is permitted.
AD - Analog to Digital Resource.
DIO - general purpose digital input/output resource.
SPI(X) - Serial peripheral interface communication bus (requires four resource pins for implementation).
INTR(X) - General purpose interrupt.
PWM - Pulse Width Modulation Resource.
ICOC - Input capture/output compare resource.
SCI(X) - Serial communications interface resource (requires two resource pins for implementation).
I2C(X) - Inter-IC communications bus (requires two resource pins for implementation).
Gnd - peripheral power supply ground pin.
Notes for Table 3:
The symbol "+" designates resources may be used by multiple devices (sharable resources). It is permissible to duplicate resources on headers if those resources are sharable. I2C is a sharable resource. The same I2C resource pins may be used to populate both I2C1 and I2C2 header positions (I2C1 & I2C2 pins 2; I2C1 & I2C2 pins 3). The "PS++" symbol indicates Processor specific implementation meaning that the pin is reserved for needs of specific processor implementation. These fields are populated with resources per map files of individual processor types.

The generic map file assigns specific resource types and quantities to specific peripheral interface headers. This assignment defines known resource locations and quantities that will be presented on the Motherboard. Independent of the installed processor, resources assigned by the generic map file will be presented in known locations (both interface header and pin position on the header). This knowledge enables the design of peripheral devices that can interface with the PIEP system, regardless of the specific processor installed.

The generic map of Table 3 features top slot headers (SPIP slots 1-6) including the SPI1, Dig1, I2C1, Dig2, SCI1, and Dig3 header. The generic map also features back slot headers (SPIP slots 7-12) including the SPI2, Dig4, I2C2, Dig5, SCI2, and Dig6 headers. The generic map file assigns certain resources to header pin locations. As just one example, Table 3 shows that an analog to digital resource AD-1 is assigned to Dig 1 header, pin 2. This is of course consistent with the alignment method which states that an AD resource (if present on a header) must appear at pin location 2, 3 or 4.

SPIP Slots 1-6 (top slots) should maintain compliance across processors to the greatest extent possible. SPIP Slots 7-12 (back slots) are generally recommended implementations and should be adhered to as processor resources permit and may be superseded if needed by higher priority processor specific functions The generic map defines a total of twelve generic SPIP assignments corresponding to twelve physical headers on the PIEP board. The map generally groups resources based on peripheral needs resulting in headers providing type of end use functions as follows. Accordingly, each header serves a general purpose or provides certain functionality as follows:

Dig1, Dig 2 headers provide motion control and data acquisition.

Dig3 header provides data acquisition and general purpose control/sensing.

SPI 1 & 2 headers provide support of SPI based integrated circuits.

I2C1 & I2C2 headers provide support of I2C based integrated circuits.

SCI1 & SCI2 headers provide support of SCI devices (RS232, RS422, RS485, etc), and CAN bus devices.

Dig4-Dig6 headers are reserved for processor specific implementations and resources that are not defined within the Generic Map File. An example is Digital to Analog converters. It is also used for additional resources (by number, not type) beyond those defined in the Generic Map File. For example, additional ATD resources may be presented on Dig4-Dig6 headers.

It should be noted that not all peripheral interface positions are defined in the generic map file. Assignments of these unallocated positions are deferred to processor specific implementations and may include additional allocation of existing resources or assignment of new resources not considered in the generic map file. If a new resource type is implemented, then the assignment (pin and header positions) should be adhered for any subsequent microcontroller implementations (pin positions required, header positions recommended). This requirement also applies to groups of resources where multiple resource types may be required in conjunction to implement a peripheral function.

Figure 7:
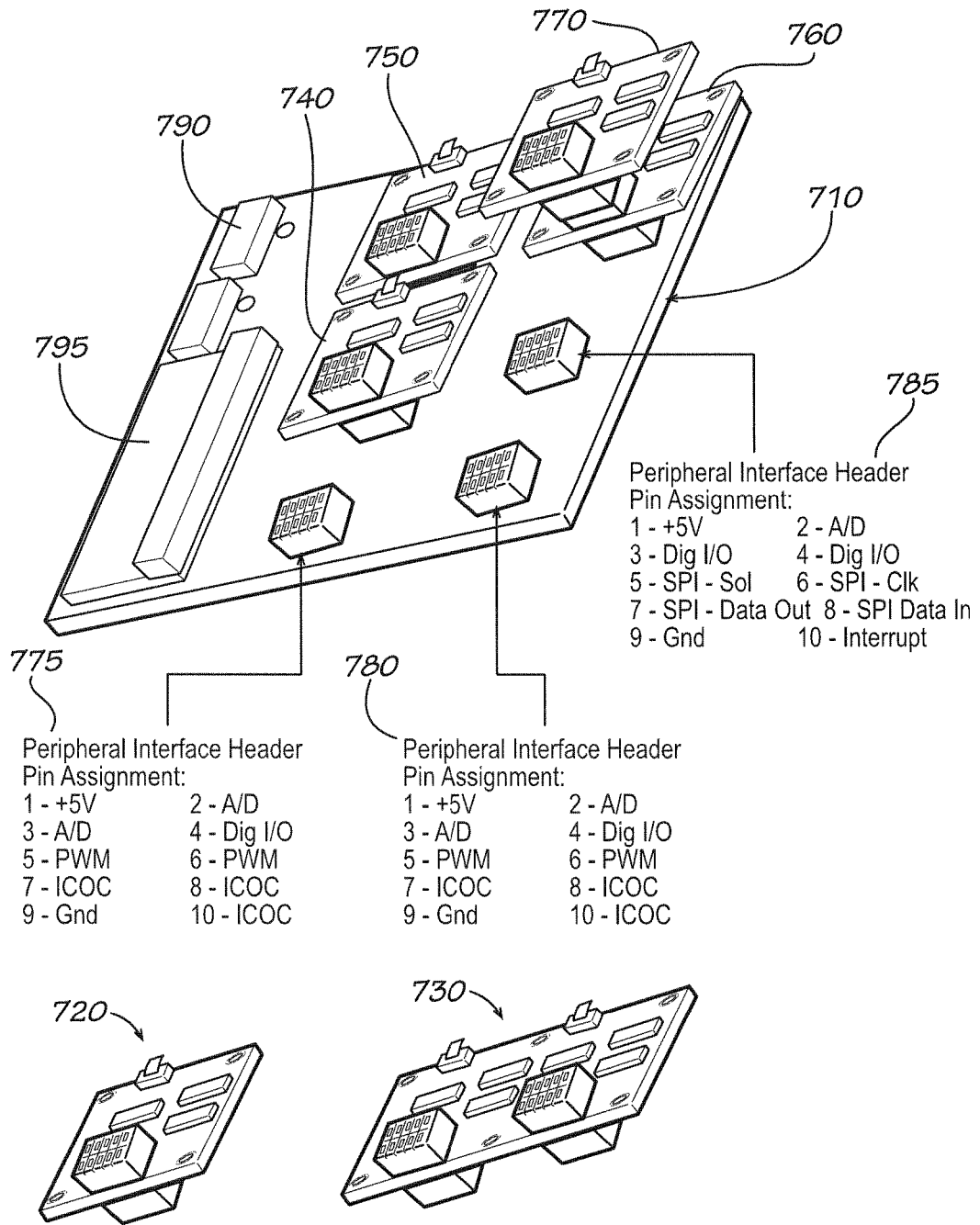
FIG. 7 shows a the PIEP motherboard design, under an embodiment.

Assignment of new resources is made with careful consideration of numerous factors. Inclusive in these considerations are other resources on the associated header, resources available on near neighbor peripheral connectors, and expected end use. FIG. 7 is an example embodiment of the PIEP design and demonstrates the numerous considerations applicable to the assignment of new resources. The PIEP motherboard includes a processor card 795 which itself physically embodies a mapping from microprocessor resources to motherboard pin assignments. The PIEP motherboard 710 includes peripheral interface headers located in proximity to one another. Single 720 and double headed 730 peripherals may couple with peripheral interface headers. The motherboard displays peripherals 740, 750, 760, 770 attached to peripheral headers. The motherboard also shows a stacked peripheral configuration 760, 770. A first peripheral 760 attaches to the motherboard and a second peripheral 770 attaches to the first peripheral to produce the stacked configuration 760, 770. Resources not used on the first (or bottom) peripheral are passed through to the second peripheral (i.e., the peripheral above). FIG. 7 displays pin assignments for three of the interface headers 775, 780, 785. It should of course be noted that under one embodiment, unassigned pin locations are available for assignment of resources. The motherboard includes supplemental processor connectors 790. Signal lines not routed from microprocessor to the peripheral headers are routed to the supplemental connectors.

While specific presentation of microcontroller signals to peripheral headers has some variability, depending upon the individual microcontroller implementations, the microcontroller to motherboard interface is more rigid. Upon assignment of the generic map file, it was possible to define the microcontroller to motherboard interface port. This port considered the number of peripheral interface signals required, the total number of signals available from microcontrollers under consideration, and any alternate presentations that may be desirable. Each peripheral interface header and pin was assigned a specific interface point on the microcontroller interface connector. Additionally, supplemental signals (power, debug interface, reset) were assigned to special purpose signal connectors not associated with the peripheral interface points.

Table 4 shows a processor specific SPIP map file for the Free Scale Processor (MC9S12DP512 processor).

| | Top Slots | | | |
|---|---|---|---|---|
| SPI1 (top) | | | Dig 1 (top) | |
| +5 V | ATD1-0 | 1 | +5 V | ATD0-0 |
| ATD1-1 | DIO/PTB-4 | | ATD0-1 | DIO/PTB-0 |
| SPI-MOSI | SPI-MISO | | PWM/PTP-0 | PWM/PTP-1 |
| SPI-SCK | SPI-SS | | ICOC/PTT-0 | ICOC/PTT-1 |
| GND | INTR1/KWH/PH-0 | 9 | GND | ICOC/PTT-2 |
| I2C1 (top) | | | Dig2 (top) | |
| +5 V | ATD1-2 | 1 | +5 V | ATD0-2 |
| ATD1-3 | DIO/PTB-5 | | ATDO-3 | ATD0-4 |
| I2C-SDA | I2C-SCL | | PWM/PTP-2 | PWM/PTP-3 |
| DIO/PTB-6 | DIO/PTB-7 | | ICOC/PTT-3 | ICOC/PTT-4 |
| GND | INTR2/KWH/PH1 | 9 | GND | ICOC/PTT-5 |
| SCI1 (top) | | | Dig3 (top) | |
| +5 V | ATD1-4 | 1 | +5 V | ATD0-5 |
| DIO/PTA-0 | DIO/PTA-1 | | ATD0-6 | ATD0-7 |
| DIO/PTA-2 | DIO/PTA-3 | | PWM/PTP-4 | DIO/PTB-1 |
| SCI-RX | SCI-TX | | DIO/PTB-2 | DIO/PTB-3 |
| GND | INTR3/IKWH/PH2 | 9 | GND | IRQ/PTE-1 |
| | Back Slots | | | |
| SPI2 (bottom) | | | Dig4 (bottom) | |
| +5 V | ATD1-5 | 1 | +5 V | DIO/PTK-0 |
| CAN0-H/PM0 | CAN0/PM1 | | DIO/PTA-4 | DIO/PTA-5 |
| SPI-MOSI+ | SPI-MISO+ | | I2C-SDA+ | I2C-SCL+ |
| SPI-SCK+ | DIO/PE-4 | | DIO/PTK-1 | DIO/PTK-2 |
| GND | INTR7/KWJ/PJ0 | 9 | GND | XIRQ/PTE-0 |
| I2C2 (bottom) | | | Dig5(bottom) | |
| +5 V | ATD1-6 | 1 | +5 V | DIO/PTK-3 |
| CAN1-H/PM-2 | CAN2-L/PM-3 | | DIO/PM-6 | DIO/PM-7 |
| I2C-SDA+ | I2C-SCL+ | | SPI2-MISO/PH4 | SPI2-MOSI/PH5 |
| DIO/PTA-6 | DIO/PTA-7 | | SPI2-SCK/PH6 | SPI2-SS/PH7 |
| GND | INTR2/KWH/PH1+ | 9 | GND | INTR5/KWH/PH3 |
| SCI2 (Bottom) | | | Dig6 (bottom) | |
| +5 V | ATD1-7 | 1 | +5 V | DIO/PTK-4 |
| CAN2-H/PM4 | CAN2-L/PM5 | | DIO/PE7 | DIO/PWM/PTP-5 |
| DIO/PWM/PTP-6 | DIO/PWM/PTP-7 | | I2C-SDA+ | I2C-SCL+ |

-continued

| SCI-RX | SCI-TX | | ICOC/PTT-6 | ICOC/PTT7 |
|---|---|---|---|---|
| GND | INTR3/KWH/PH2+ | 9 | GND | INTR6/KWJ/PJ1 |

A Key to Table 4:
AD - Analog to Digital Resource.
DIO - general purpose digital input/output resource.
SPI(X) - Serial peripheral interface communication bus (requires four resource pins for implementation).
INTR(X) - General purpose interrupt.
PWM - Pulse Width Modulation Resource.
ICOC - Input capture/output compare resource.
SCI(X) - Serial communications interface resource (requires two resource pins for implementation).
I2C(X) - Inter-IC communications bus (requires two resource pins for implementation).
Gnd - peripheral power supply ground pin.
XIRQ - non-maskable interrupt, this interrupt is the highest priority and will be serviced first in the event multiple interrupt pins are activated.
CAN - Controller Area Network communications protocol. Requires two resource pins for implementation.
Notes for Table 4:
The Freescale MC9S12DP512 only supports 5 V operation; therefore peripherals must be powered at 5 volts. The MC9SX12DP512 is pin compatible and supports both 3.3/5 volt peripherals. The MC9SX12 may under one embodiment be substituted for final implementation. This is permissible as it is compliance with the Generic Map File. Resources that are followed by a "/" indicate the specific port and pin on the processor from where this resource will be supplied. For example, I2C2 CAN1H/PM-2 indicates that this can resource is supplied by processor port M pin 2 of the port. The symbol '+' designates resources may be used by multiple devices (sharable resources). It is permissible to duplicate resources on headers if those resources are sharable. I2C is a sharable resource. The same I2C resource pins may be used to populate both I2C1 and I2C2 header positions (I2C1 & I2C2 pins 2; I2C1 & I2C2 pins 3).

Considering the total resources available from a microcontroller may exceed peripheral interface availability, supplemental resource connectors were also included in the design. These supplemental connectors, while not designed to directly interface peripheral devices, can be utilized in conjunction with hardware designed to install hardware remotely. These DPIP connectors permit processor specific functionality to be presented to the motherboard and also permit alternate presentation of resources that are assigned on the SPIP connectors. Duplication of resources (presentation on both DPIP connectors and SPIP connectors are permitted). Resource mapping of processor resources on DPIP connectors is performed in a manner wherein specific types of resources may be present at known locations.

Figure 8:
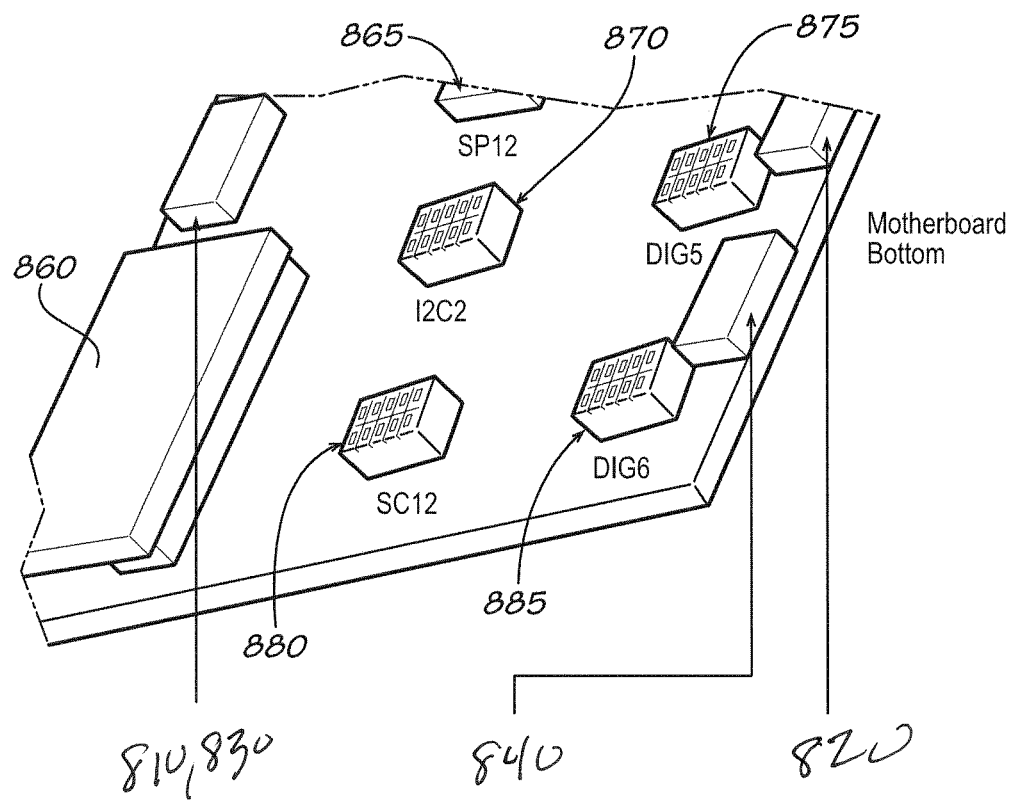
FIG. 8 shows supplemental processor resources implemented on motherboard DPIP

FIG. 8 shows under one embodiment supplemental processor resources implemented on motherboard DPIP headers with respect to the MC9S12 processor. FIG. 8 shows the processor card 860 and the SPI2 865, I2C2 870, DIG5 875, SCI2 880 and DIG 6 885 peripheral headers. The figure shows pin assignments for DPIP1 810, DPIP2 820, DPIP4 830, and DPIP5 840 headers. Details regarding the assignments are set forth in Table 5 below.

Table 5 shows under one embodiment the DPIP file for the MC9S12DP512 processor.

TABLE 5

(DPIP1-DPIP10 map files)

| DPIP1/ICOC | | | DPIP2/PWM | |
|---|---|---|---|---|
| PTT-0/ICOC | PTT-1/ICOC | 1 | PTP-0/PWM | PTP-1/PWM |
| PTT-2/ICOC | PTT-3/ICOC | 3 | PTP-2/PWM | PTP-3/PWM |
| PTT-4/ICOC | PTT-5/ICOC | 5 | PTP-4/PWM | PTP-5/PWM |
| PTT-6/ICOC | PTT-7/ICOC | 7 | PTP-6/PWM | PTP-7/PWM |
| PE-0/XIRQ | PE-1/IRQ | | | |

| DPIP5 | | | DPIP6 | |
|---|---|---|---|---|
| PTJ-0/KWJ0 | PTJ-1/KWJ1 | 1 | PH-0/MISO1/KWH0 | PH-1/MOSI1/KWH1 |
| PTJ-6/SDA | PTJ-7/SCL | 3 | PH-2/SCK1/KWH2 | PH-3/SS1/KWH3 |
| PTE-0/XIRQ | PE-1/IRQ | 5 | PH-4/KWH4 | PH-5/KWH5 |
| PE-3/Lstrb | PE4/Eclk | 7 | PH-6/KWH6 | PH-7/KWH7 |

| DPIP9 | | | DPIP10 | |
|---|---|---|---|---|
| PTK-0/XADDR14 | PTK-1/XADDR15 | 1 | +Vcc | +Vcc |
| PTK-2/XADDR16 | PTK-3/XADDR17 | 3 | Alt_Dbg-7 | Alt_Dbg-8 |
| PTK-4/XADDR18 | PTK-5/XADDR19 | 5 | Alt_Dbg-9 | Alt_Dbg-10 |
| PTK-7/ECS/ROMCTL | PTE0/XIRQ | 7 | Gnd | Gnd |

| DPIP3 | | | DPIP4 | |
|---|---|---|---|---|
| SPI3-MISO0 | SPI3-MOSI | 1 | RXCAN3 | TXCAN3 |
| SPI3-/SCK0 | SPI3-SS | 3 | PTM-2/RX_BF/RXCAN1 | PTM-3/TX_BF/TXCAN1 |
| SPI0-MISO0 | SPI0-MOSI | 5 | PTM-4/BF_PSYN/RXCAN4 | PTM-5/BF_PROK/TXCAN4 |
| SPI0-/SCK0 | SPI0-SS | 7 | PTM-6/BF_PERR/RXCAN4 | PTM-7/BF_PSLM/TXCAN4 |

| DPIP7 | | | DPIP8 | |
|---|---|---|---|---|
| PAD8/ATD1-0 | PAD9/ATD1-1 | 1 | PTB-0/ADDR0 | PTB-1/ADDR1 |
| PAD10/ATD1-2 | PAD11/ATD1-3 | 3 | PTB-2/ADDR2 | PTB-3/ADDR3 |
| PAD12/ATD1-4 | PAD13/ATD1-5 | 5 | PTB-4/ADDR4 | PTB-5/ADDR5 |

TABLE 5-continued (DPIP1-DPIP10 map files)

| PAD14/ATD1-6 +V_ADref | PAD15/ATD1-7 −V_ADref | 7 | PTB-6/ADDR6 | PTB-7/ADDR7 |

A key for the DPIP map file of Table 5 follows.
ICOC (X) - Input Capture/Output Compare resource.
SPI (X) - Serial Peripheral Interface resource.
SCI (X) - Serial Communications Interface resource type.
CAN - Controller Area Network communication resource type.
I2C - Inter-IC Communications resource type.
KW - Keypad wake-up resource type.
ATD - Analog to Digital Converter resource.
V_ADref - External voltage reference for processor Analog to Digital Converter resources.
ADDR - parallel data bus, may be implemented via digital I/O ports or by use of processor pins specifically designated for this purpose.
Alt_Dbg - alternate programming/debugging interface pins, other than debug/programming supported via 6 pin debug or 20 pin JTAG programming headers.
XADDR - Expanded address bus, provides for 16 bit parallel data transfers when used in conjunction with ADDR resources.
Alt_Dbg - alternate programming/debugging interface pins.
IRQ/XIRQ - High priority interrupt resources, take precedence over other interrupts when multiple interrupts occur.
Lstrb - Low byte strobe, indicates activity on processor data bus.
Eclk - External clock signal - can be used to monitor processor bus clock or inject an external clock onto processor internal bus clock.
ECS - controls processor clock source.
Vcc - peripheral power supply.
Gnd - peripheral power supply ground.

Referring back to the general design of the PIEP, the design may be alternatively be evaluated from the perspective of the microcontroller resources. While resource types (and quantities) vary among the different microcontroller embodiments, a core group and quantity of resources is generally expected on virtually all devices. For example, microcontrollers evaluated for use with the PIEP all contain at least eleven analog to digital resources (AD). These eleven resources have a fixed assignment on the motherboard peripheral interfaces, regardless of the connected microcontroller (see Table 3). Specifically, the resources always appear on peripheral connectors Dig1, Dig2, Dig3, SPI1, SCI1, and I2C1. Furthermore, these resources always appear on specific peripheral connector pins. If a peripheral connector contains only one AD resource, it will always appear on pin 2. Likewise, if a peripheral connector contains three AD resources, they will always appear on pins 2, 3, and 4 (see Table 3). In a similar manner, other minimum resource types and quantities are assigned specific locations on motherboard peripheral connectors. This assignment is known as the Generic Map File (see Table 3).

The Generic Map File provides the minimum resources that are guaranteed to be present, regardless of the connected microcontroller. Any peripheral designed to work with the Generic Map File is likewise guaranteed to be compatible with any connected microcontroller. The Generic Map File does not assign all peripheral interface headers or pins, only those designated as the guaranteed minimum resources available across all microcontrollers.

If a microcontroller contains more than the minimum number of a resource types, for instance 16 AD resources, then these resources will follow pin assignment convention as the higher priority (see Table 3 and 4). Stated another way, the additional resources will be assigned to pin positions 2, 3, and/or 4 on additional peripheral interface headers (such as Dig4 or SCI2). Adhering to this protocol enables additional peripheral interface connectors to be compliant with peripheral devices. For instance, if a peripheral requires two AD resources and two Pulse Width Modulation (PWM) resources, this peripheral will be guaranteed to properly connect with interface headers Dig1 and Dig2 (per the Generic Map File). If the implemented processor has adequate PWM and AD resources, then the peripheral may also be compliant with Dig3 or Dig4 interface headers.

In part, the design methodology does not attempt to ensure compliance of all motherboard peripheral interface connectors across all microcontrollers and all peripherals. Compliance is achieved if each peripheral type has at least one compliant connection point on the motherboard across all implemented microcontrollers. The only exception to this compliance is for resource types not found on all microcontrollers. For example, the DAC resource (digital to analog converter) is present on some but not all PIEP microcontrollers.

The Digital to Analog (D/A) resource is implemented on some, but certainly not all, microcontrollers. For microcontrollers that contain this resource, it will appear on header pin 3, connector Dig1 (primary) or Dig6 (secondary A peripheral that requires this resource will only be compliant with microcontrollers supporting this resource. This limitation, however, is not a function of the PIEP design but rather a limitation inherent to the microcontroller.

While resource types and quantities are a function of the microcontrollers utilized, specific groupings of resources on individual motherboard peripheral interface connectors is a function of peripheral resource needs. Based on an analysis of numerous peripherals, groupings of the most probable resource types and quantities were determined. These groupings define specific resource types, quantities, and total number of resource positions needed on each motherboard peripheral interface connector. This optimized grouping, the second component utilized in creating the Generic Map File, determined the number of resources per header (8) and unique resource combinations (for instance Dig1 contains 2 AD resources, 2 PWM resources, and 3 ICOC resources). For peripherals needing more than eight resources (or needing resource combinations not supported on a single header), the peripheral may utilize more than one header to acquire the necessary resources. In this manner, resource assignment also includes the physical grouping on adjacent motherboard peripheral headers to ensure "near neighbor" headers contain complimentary resources that may be used by these peripherals.

In limited instances, it may be desirable to reassign resources in unique configurations. For example, in a communications centric design it may be desirable to implement six SCI headers on the motherboard while other uses of the same microcontroller may need no SCI headers. Assuming the microcontroller has the resources to support these implementations; it is possible to reassign the default resource mapping for a microcontroller by use of a remapping adapter. This adapter, attaching between the motherboard and microcontroller, reroutes the microcontroller signals for alternate presentations to the motherboard thus creating a different map file. Pin level compliance on the motherboard peripheral interface connectors must generally be adhered to, but not overall motherboard peripheral header functionality.

Figure 9:
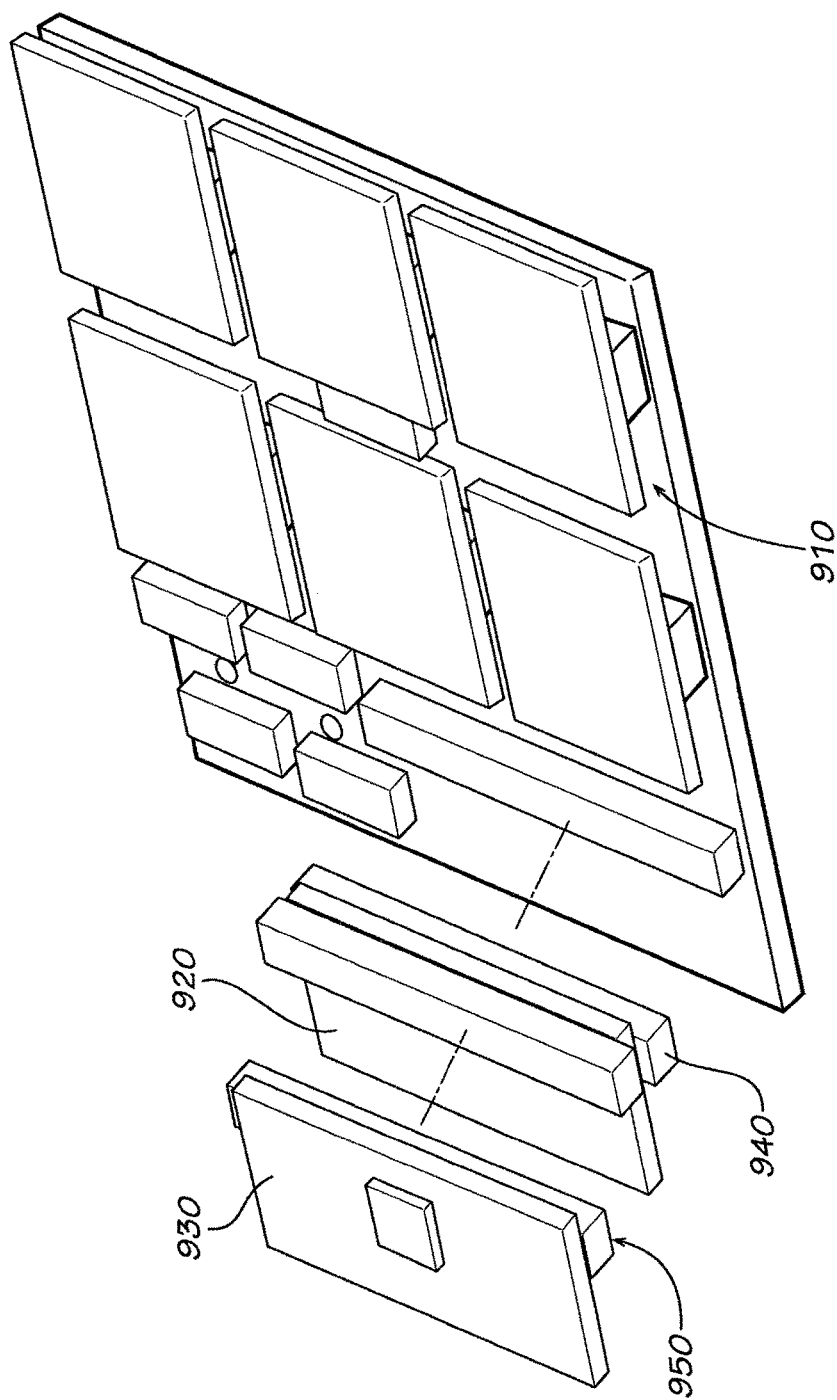
FIG. 9 is an example of a remap adapter connecting between processor board and mother board, under an embodiment.

As stated above, the PIEP platform permits reassignment of default processor map files via a processor remap adapter. This is a physical device designed for installation between the processor and motherboard. This apparatus reroutes processor signals for alternate presentations to the motherboard. The most common example of this implementation is the substitution of SPIP header types. For example, if the SIP2 header is not required, a remap adapter may be utilized to assign this connector the functionality of a Dig port. Typically the new resources are allocated from a pool of resources that, by default, have been allocated to one or more DPIP headers and do not appear on other SPIP headers. FIG. 9 shows the PIEP motherboard with a remap adapter board 920. The motherboard features a 200 pin header 940 routing microcontroller resources to motherboard pin locations (e.g. SPIP and DPIP headers). The processor board 930 features a processor and 200 pin interface 950 which maps processor microprocessor ports/resources to header pin positions. The processor board interface and the motherboard 200 pin header then couple under one embodiment to route signals to motherboard pin locations based on the processor board interface assignments. Under an alternative embodiment, FIG. 9 shows a remap adapter 920 which reassigns processor map files. The adapter mounts between the motherboard and processor resources for alternate presentation, i.e. for alternate map file.

The map files, both generic and specific, can most accurately be thought of as a blueprint for the physical hardware implementation of processor boards. The generic map file defines resource types and quantities that must be present on individual motherboard headers and pins. The processor specific map file is an expansion of the generic map file, assigning resources to unallocated locations within the generic map file and identifying specific pins on the microcontroller that are utilized to execute the generic map file requirements. To fully understand how this process is implemented, an example embodiment implementation will be discussed.

All interface points contained on the motherboard are derived from the processor routed through a centralized 200 position header. As the motherboard is a fixed design that doesn't vary with processor implementations, it is the responsibility of the processor board to align processor resources with the correct headers and pins on the motherboard. This alignment is achieved through the 200 pin processor to motherboard header.

Figure 10:
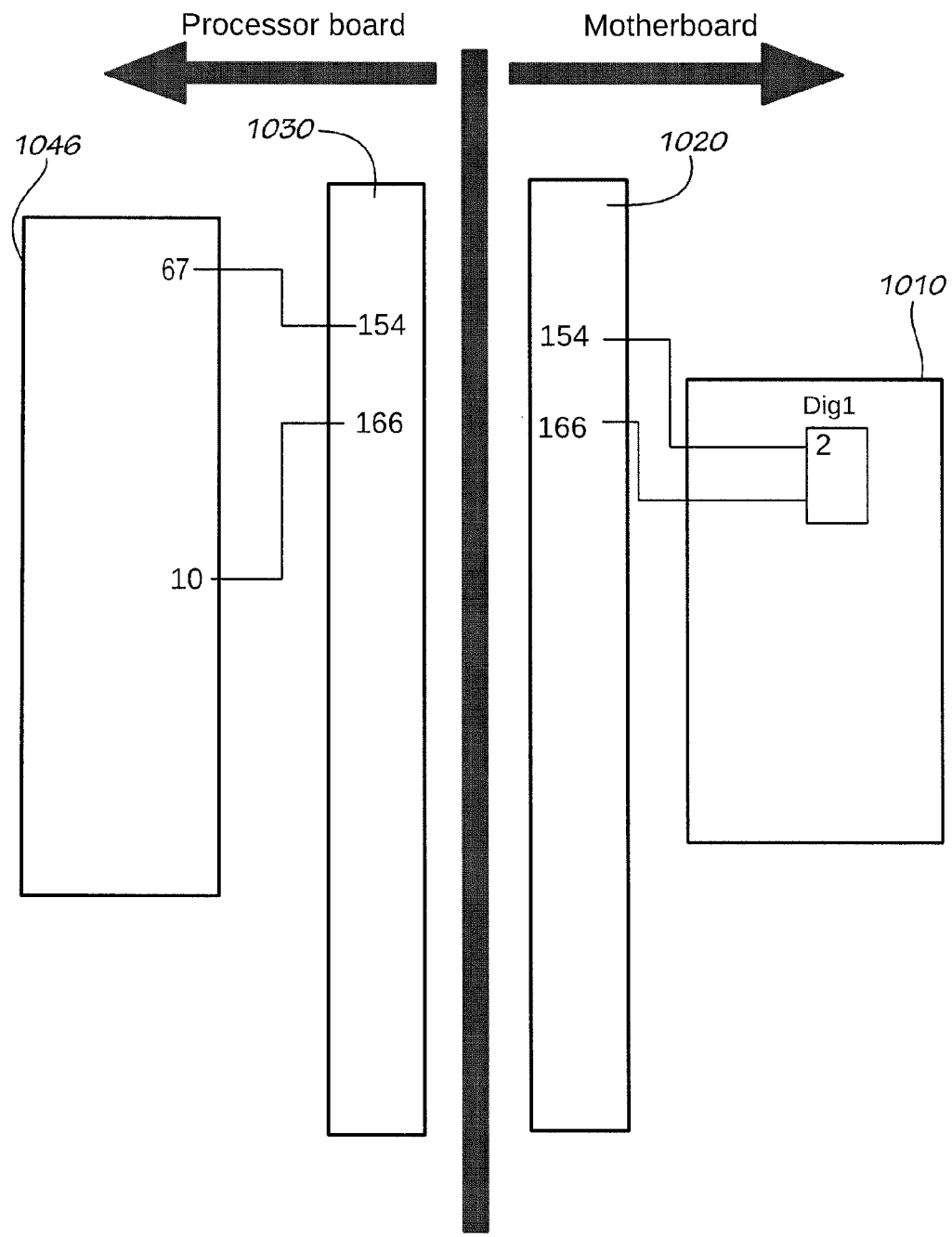
FIG. 10 shows a motherboard and processor board 200 pin interface, under an embodiment, under an embodiment.

Referencing FIG. 10, the generic map file requires SPIP header Dig1, pin 2 on motherboard 1010 to contain an analog to digital resource. This specific header pin (Dig1, pin 2) is routed to pin position 154 on the 200 pin processor interface header 1020 (contained on the motherboard). The processor board 1046 likewise contains a mating 200 pin header 1030 wherein Dig1, pin 2, is presented on pin position 154. Evaluating the resources available on the MC9SX12DP512 processor, it can be seen that an analog to digital resource (ATD0-0) is available on pin 67 of the processor. By connecting the processor pin 67 to pin 154 on the 200 position interface header 1030, an analog to digital signal will be presented on the motherboard Dig1, pin 2, header position. In a likewise manner, the various signals from the microcontroller are assigned to specific locations on the mating 200 pin header 1030, with each header pin ultimately routing to a fixed location on the motherboard.

Figure 11:
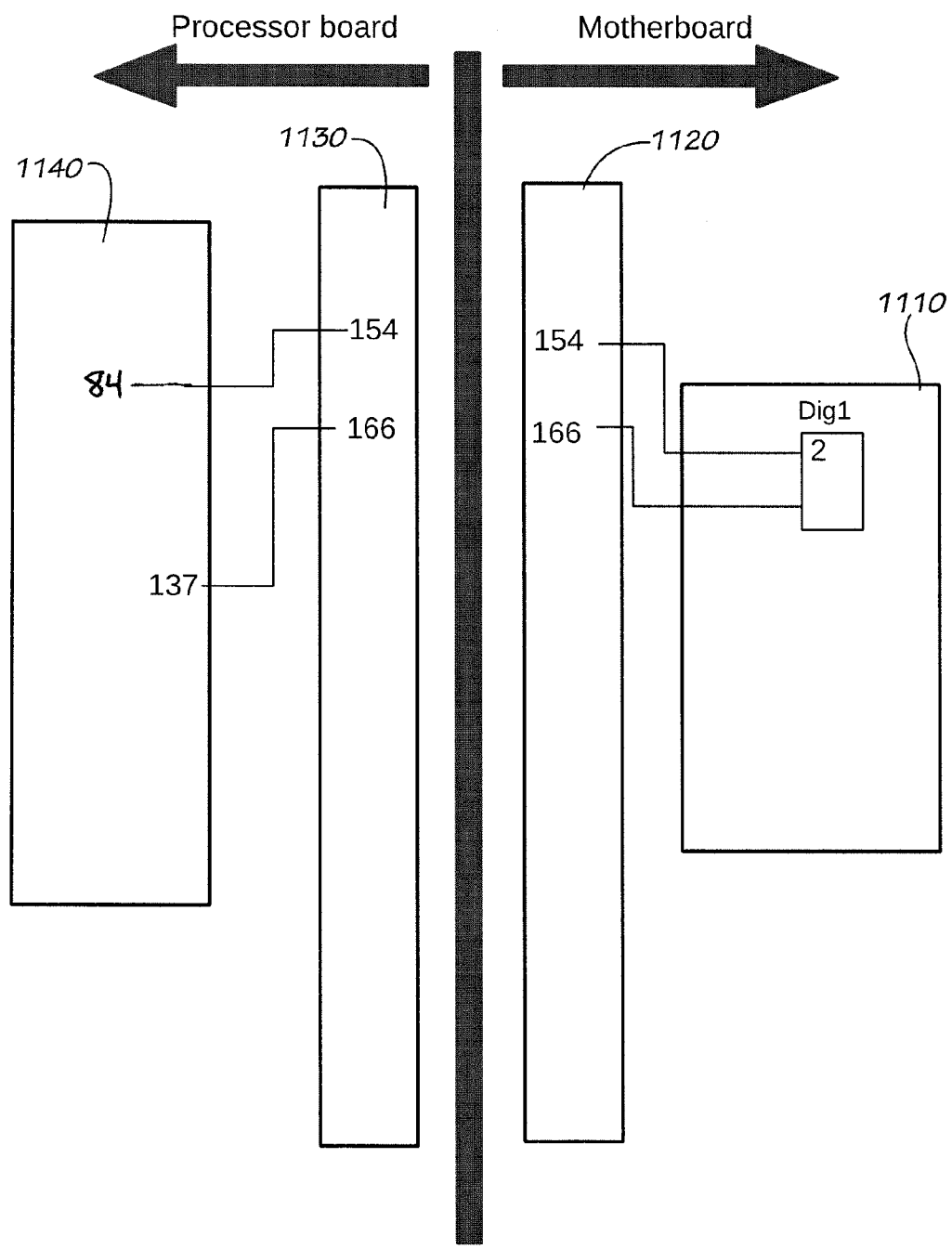
FIG. 11 shows a motherboard and processor board 200 pin interface, under an embodiment, under an embodiment.

Referring to FIG. 10, it is readily apparent how this method aids in processor independence. In the cited figures, Digital header 1, pin 2, requires an analog to digital resource (per the generic map file). This pin is physically connected to position 154 on the processor interface header. Similarly, for implementation on the Freescale MC9SX12DPX512 processor, an analog to digital resource is available on the processor pin 67 of processor. By routing this processor pin (pin 67) to the interface header 1030 position 154, a connection path is established via interface header 1020 position 154 to route an analog to digital resource to the Dig1, pin 2, header position on motherboard 1010. For implementation on the Atmel SAM3X9E processor (see FIG. 11), an analog to digital resource is available on processor pin 84 of processor located on processor board 1140. Likewise by routing a connection between processor pin 84 and the 200 pin position 154 on the interface header, a pathway is established to pin 154 on the motherboard header 1120 to provide an analog to digital resource for Dig1, pin 2 on motherboard 1110, with the Atmel processor installed (FIG. 11). The fact that these processors have resources assigned to different pins, are physically different sizes, have different number of total pins (112 for Freescale, 144 for Atmel ARM); doesn't impact the ability to implement the processors with the described method. By containing the processor on a separate physical board and providing a common interface point (the 200 pin header), many processor specific details can be abstracted from the design (such as physical size and processor pin assignments).

Based on the description above, it should be evident that the 200 position interface header residing between the motherboard and processor is an instrumental aspect of the processor independence component. This interface point permits alignment of various processor signals and resources such that they are presented to the correct locations on the motherboard (in accordance with the generic and processor specific map files).

Figure 12:
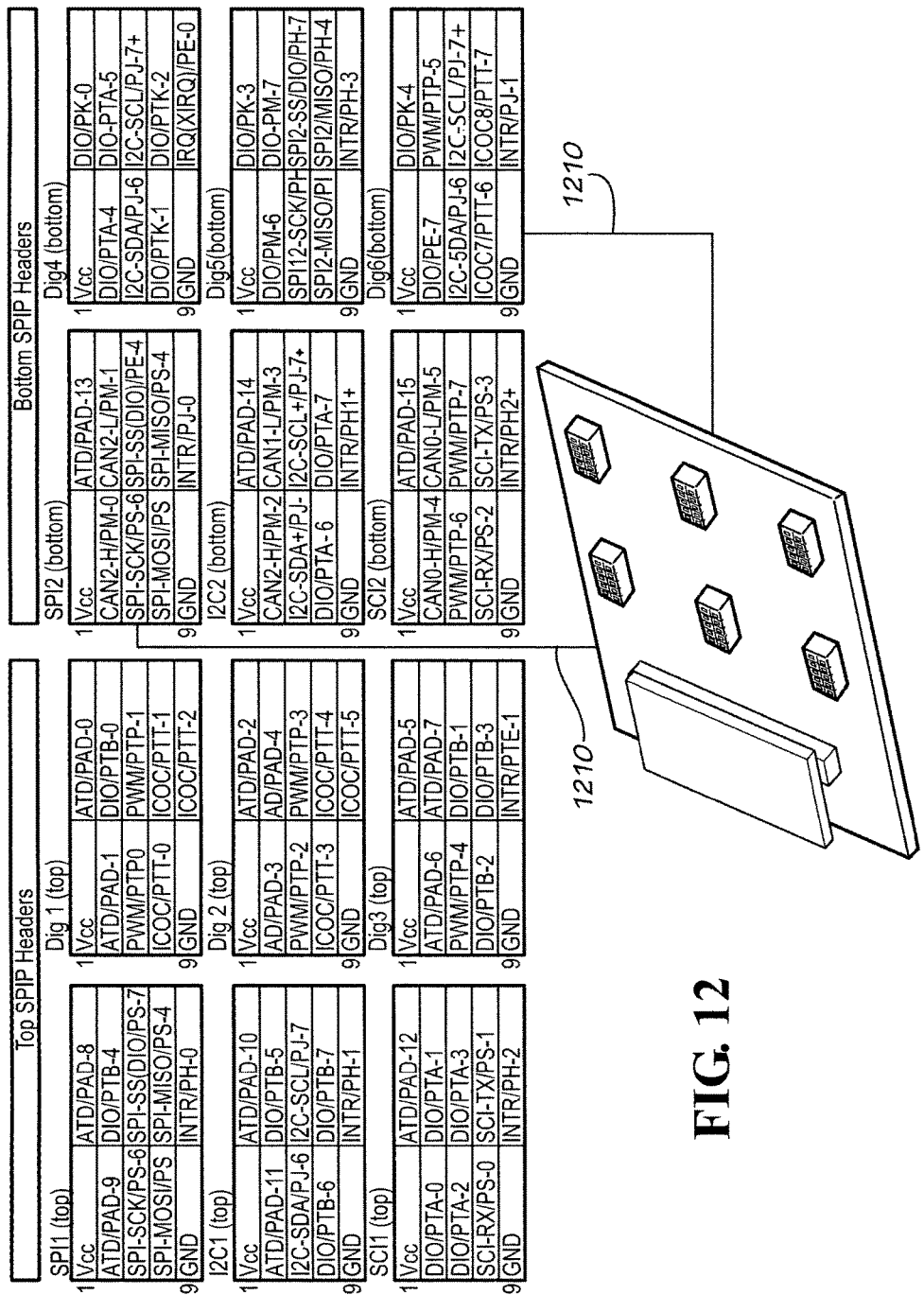
FIG. 12 shows a processor map file detailing motherboard pin assignments for a specific processor, under an embodiment.
Figure 13:
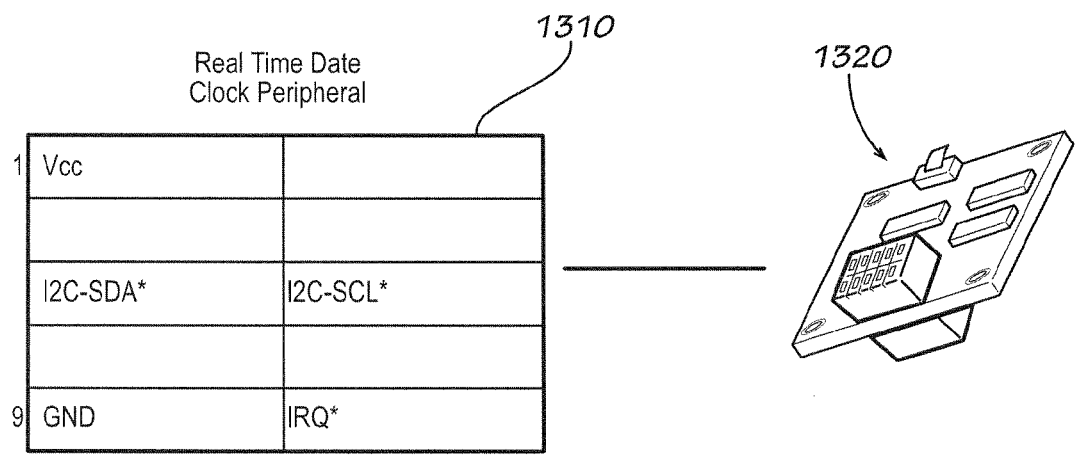
FIG. 13 shows a peripheral map file showing resources needed by the peripheral, under an embodiment, under an embodiment.
Figure 14:
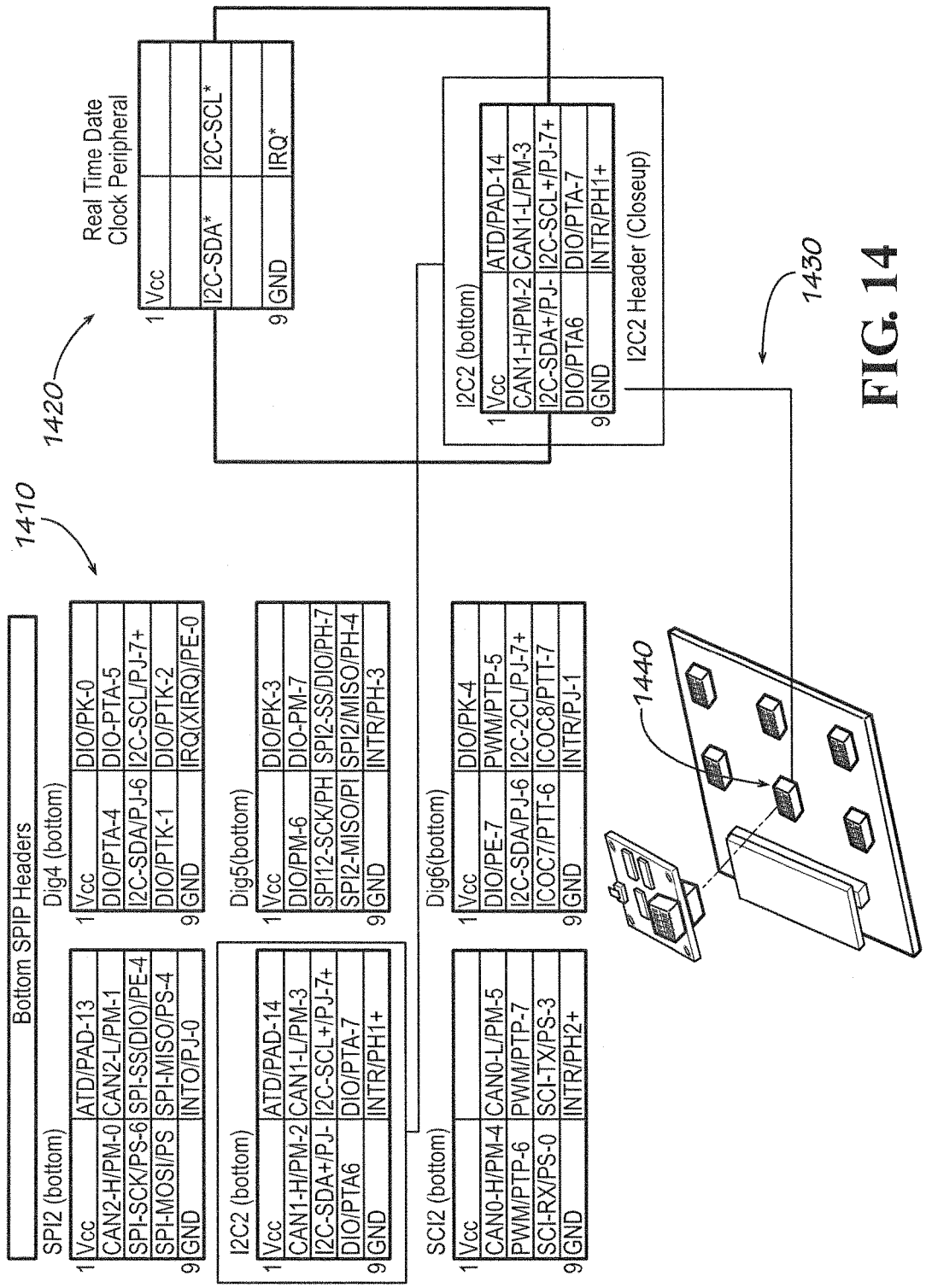
FIG. 14 is an example of identifying which motherboard headers contain the resources needed by a peripheral, under an embodiment.
Figure 15:
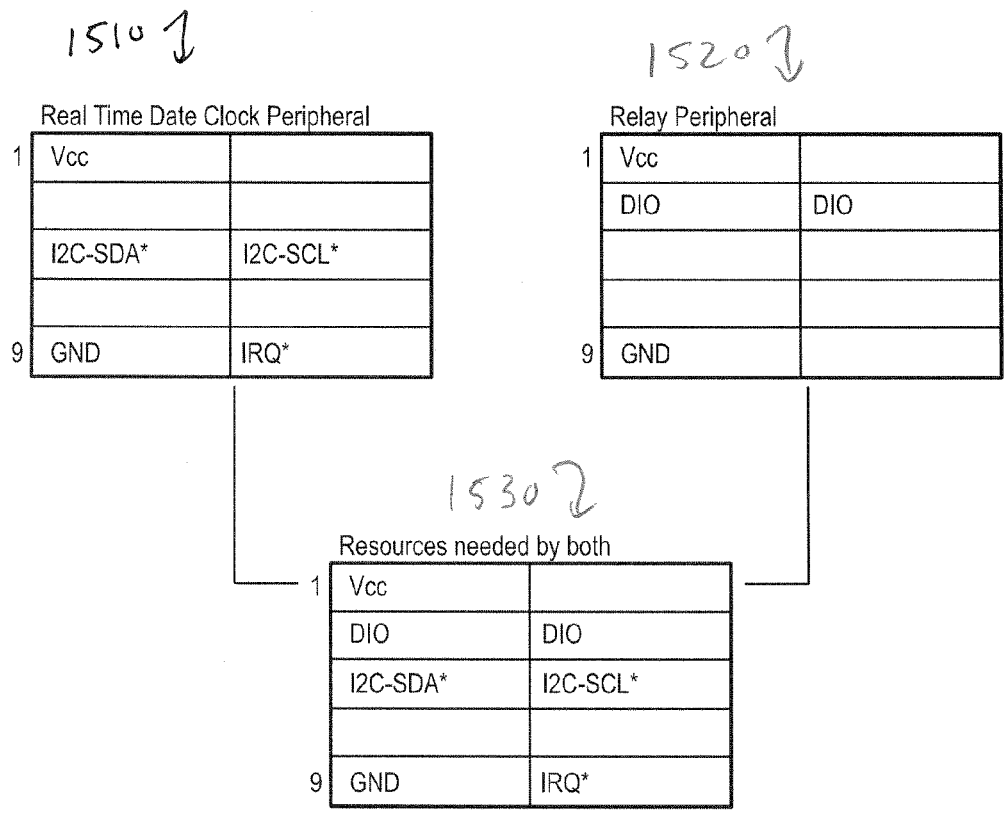
FIG. 15 shows an example of identifying needed resources for and installing a stacked peripheral, under an embodiment.
Figure 15:
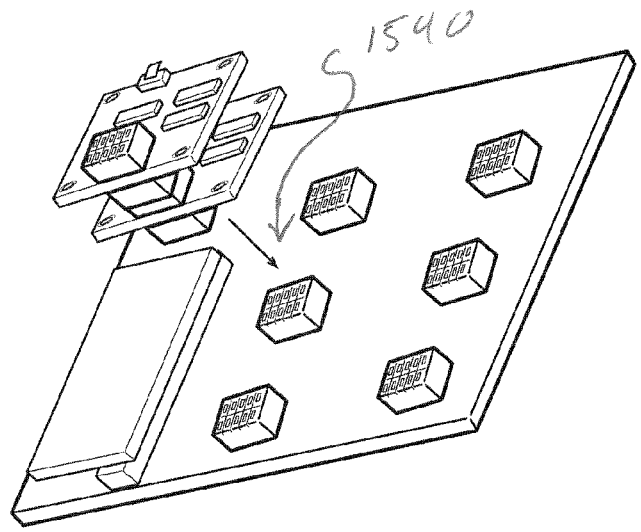

FIG. 12 shows how to use the PIEP design to install a peripheral onto the PIEP mother board. FIG. 12 shows the Freescale 9S12 processor specific map file. The lines 1210 show the correspondence between the map file SPIP assignments and the physical SPIP headers on the motherboard. The processor map file details the motherboard pin assignments for the corresponding headers. FIG. 13 shows a Real Time Date Clock Peripheral. Specifically, FIG. 13 shows the peripheral map file 1310 which indicates required resources. FIG. 13 also shows the peripheral device itself 1320. FIG. 14 demonstrates a procedure for installing the peripheral. First, the user opens the processor map file 1410. Second, the user opens the peripheral map file 1420. Third, the user identifies which motherboard headers contain the resources needed 1430. These are the headers where peripherals may be installed on the motherboard. FIG. 14 then shows installation 1440 of the peripheral. FIG. 15 shows how to install stacked peripherals. The peripherals to be installed include the real time data clock peripheral and the relay peripheral. First, the user opens the processor map files. Second, the user opens the peripheral map for both peripherals (1510, 1520). Third, the user ensures that the peripherals don't need the same resources 1530 (except for sharable resources such as I2C or general interrupts). Fourth, the user identifies which motherboard headers contain the resources needed by both peripherals 1540. These are the headers where peripherals can be installed on the motherboard. Note that any processor resource type can also be used as DIO.

Figure 17B:
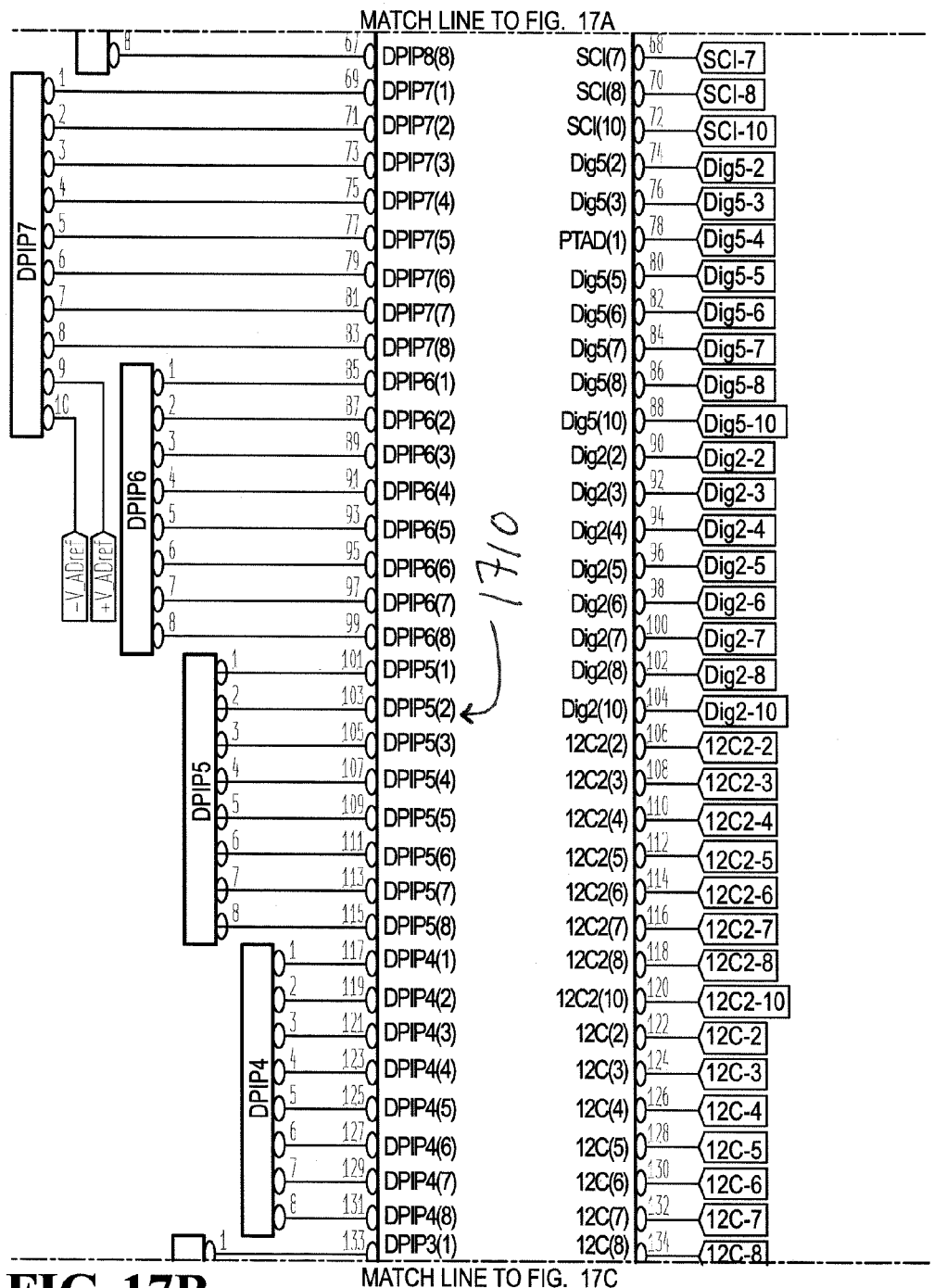
Figure 17C:
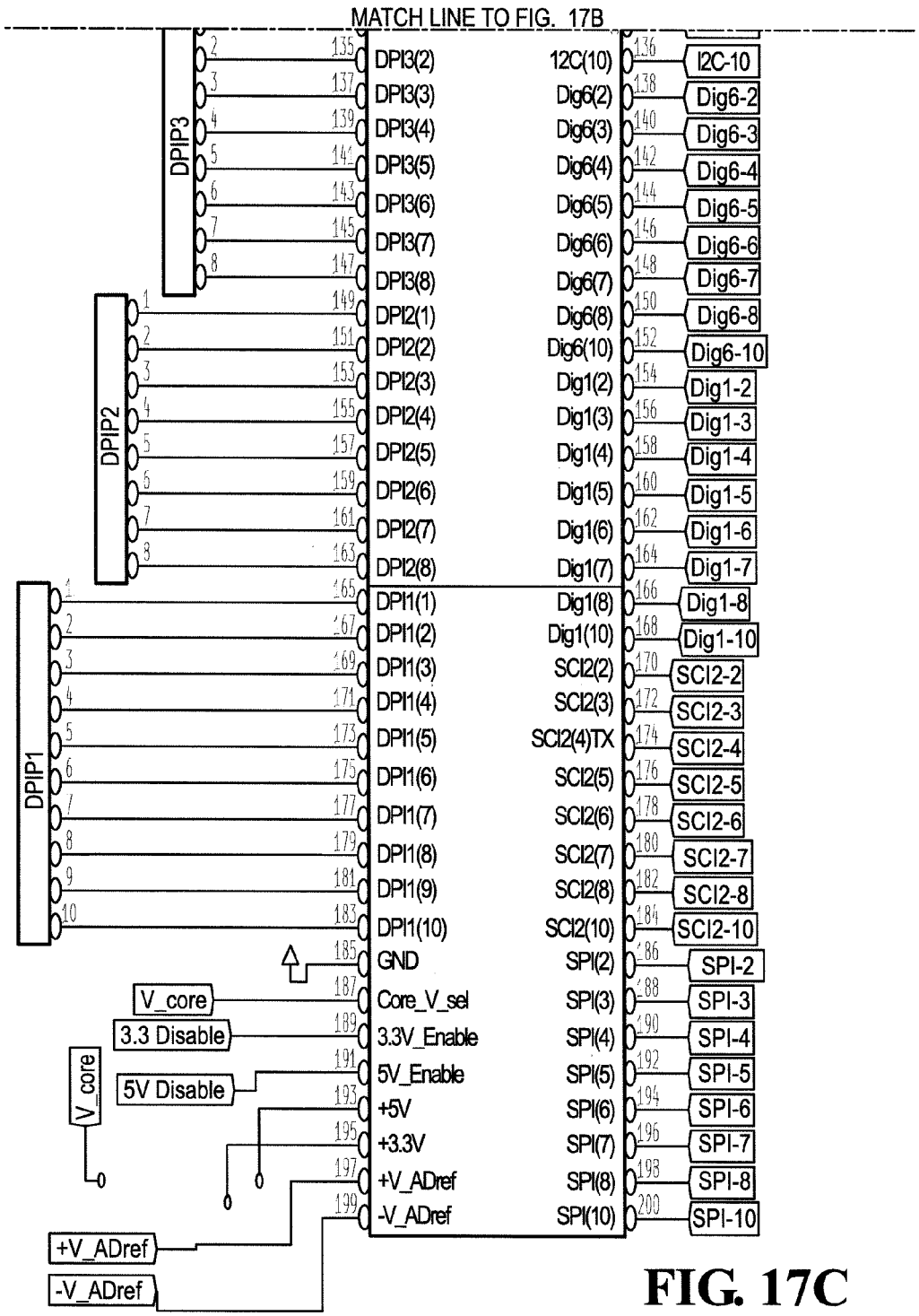
Figure 18A:
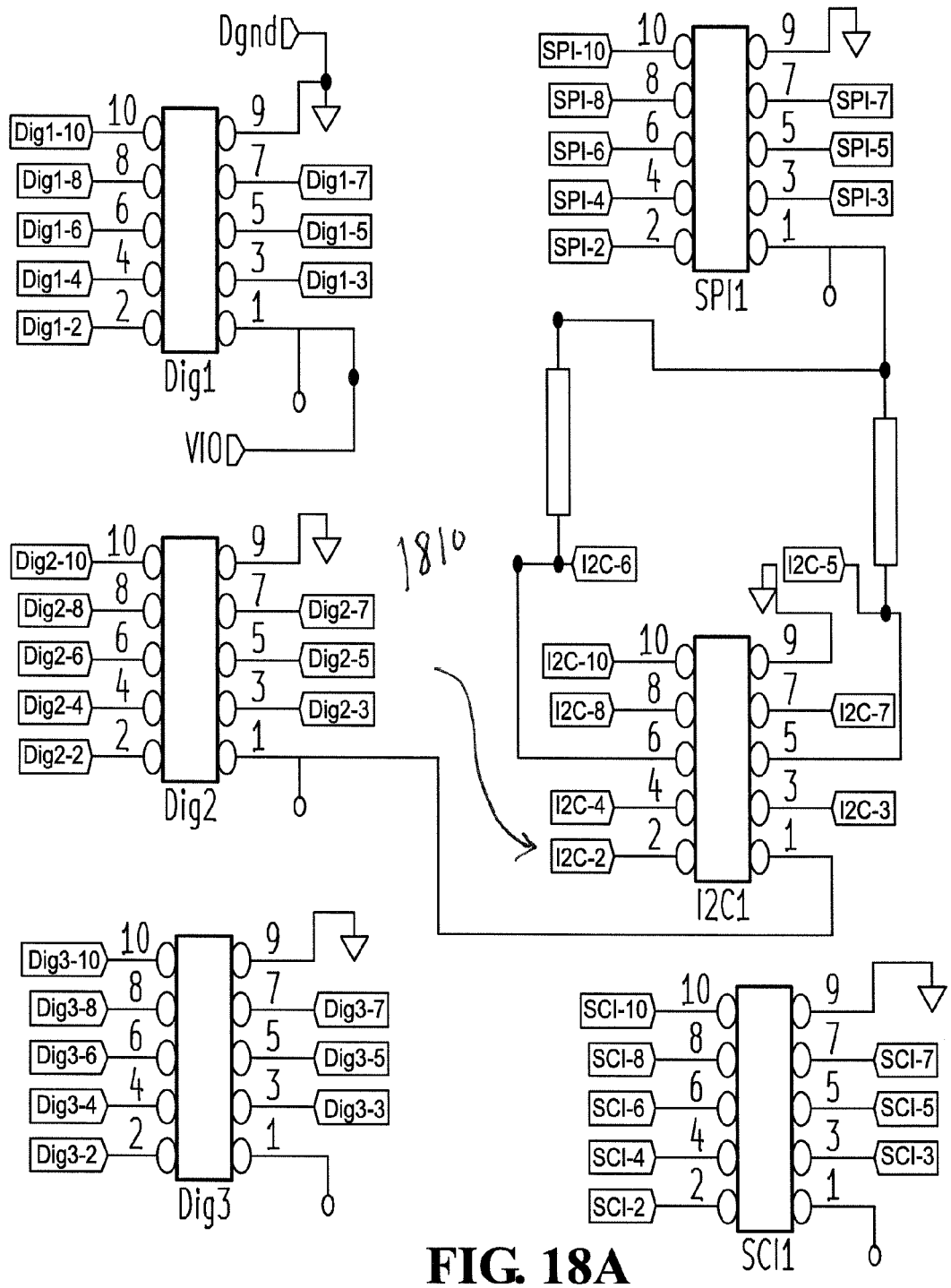
FIGS. 18A-18B include a schematic of SPIP header assignments, under an embodiment.
Figure 18B:
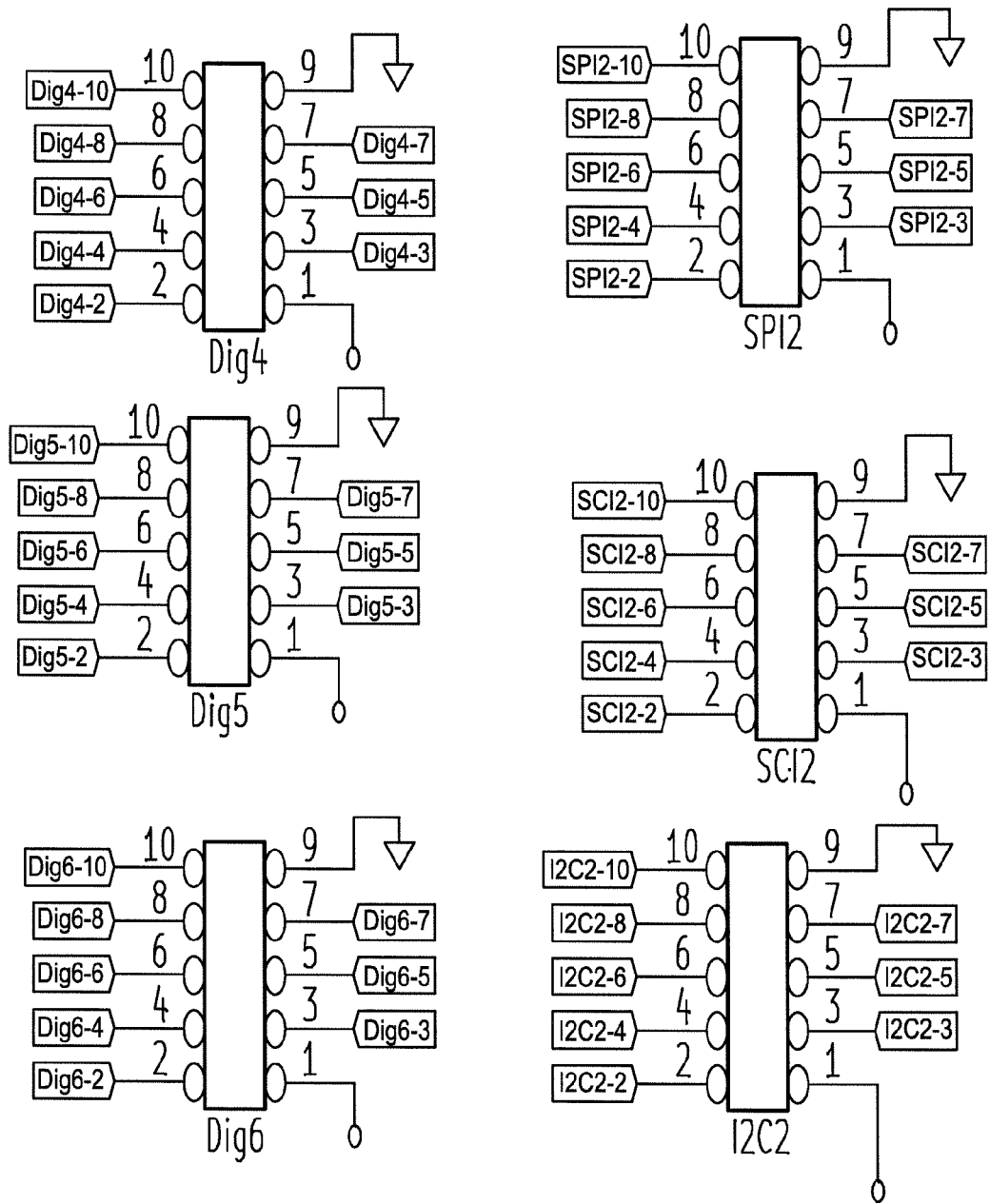

As already described in detail above, the PIEP design implements a mapping of resources from processor to PIEP header/pin locations through a 200 pin interface between the PIEP motherboard and the processor board. FIGS. 16A-16D includes a 200 pin processor interface header contained within a processor circuit board module or located on a processor board. FIGS. 17A-17C includes a schematic of a 200 pin processor interface header, contained within a motherboard module or located on a motherboard. FIGS. 18A-18B include SPIP header assignments.

Figure 16D:
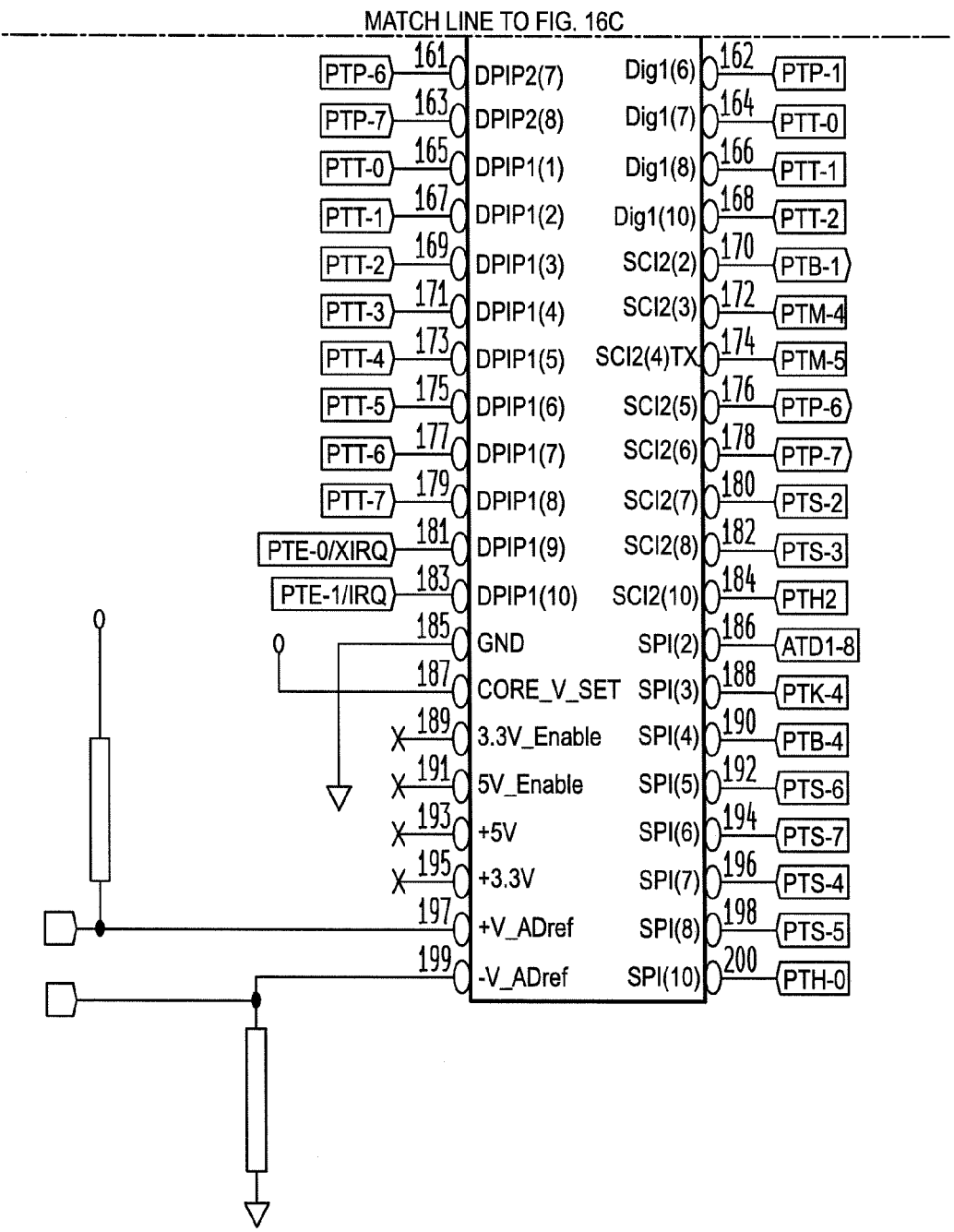

Referencing FIGS. 16A-16D, interface header connection points 1 through 200 are represented. Connection points on the 200 pin interface header route to various DPIP, SPIP, and processor debug headers on the motherboard, along with power and ground connections. As a point of clarification, each connection point on the interface header contains a reference label indicating the intended termination points. For instance, interface header pin 103 is assigned a reference label of DPIP5(2) (FIG. 16B, 1610), indicating the termination point of this pin is the DPIP5 header, position 2. As seen in FIGS. 17A-17C, the physical connection between the motherboard interface header pin 103 and the DPIP5 header, pin 2 is indicated by a line drawn between the two connection points (FIG. 17B, 1710). For SPIP headers (with reference to FIGS. 18A-18B), the termination points are indicated by global labels. For instance, interface header position 122 is assigned a global label of I2C-2 (FIG. 16B, 1620). This same global label can be found in FIGS. 18A-18B at the 12C header, pin 2 (FIG. 18A, 1810). The matching global labels (in this instance I2C-2) indicate a physical connection between the two points. This is functionally equivalent to the connecting lines utilized for DPIP headers.

Figure 19B:
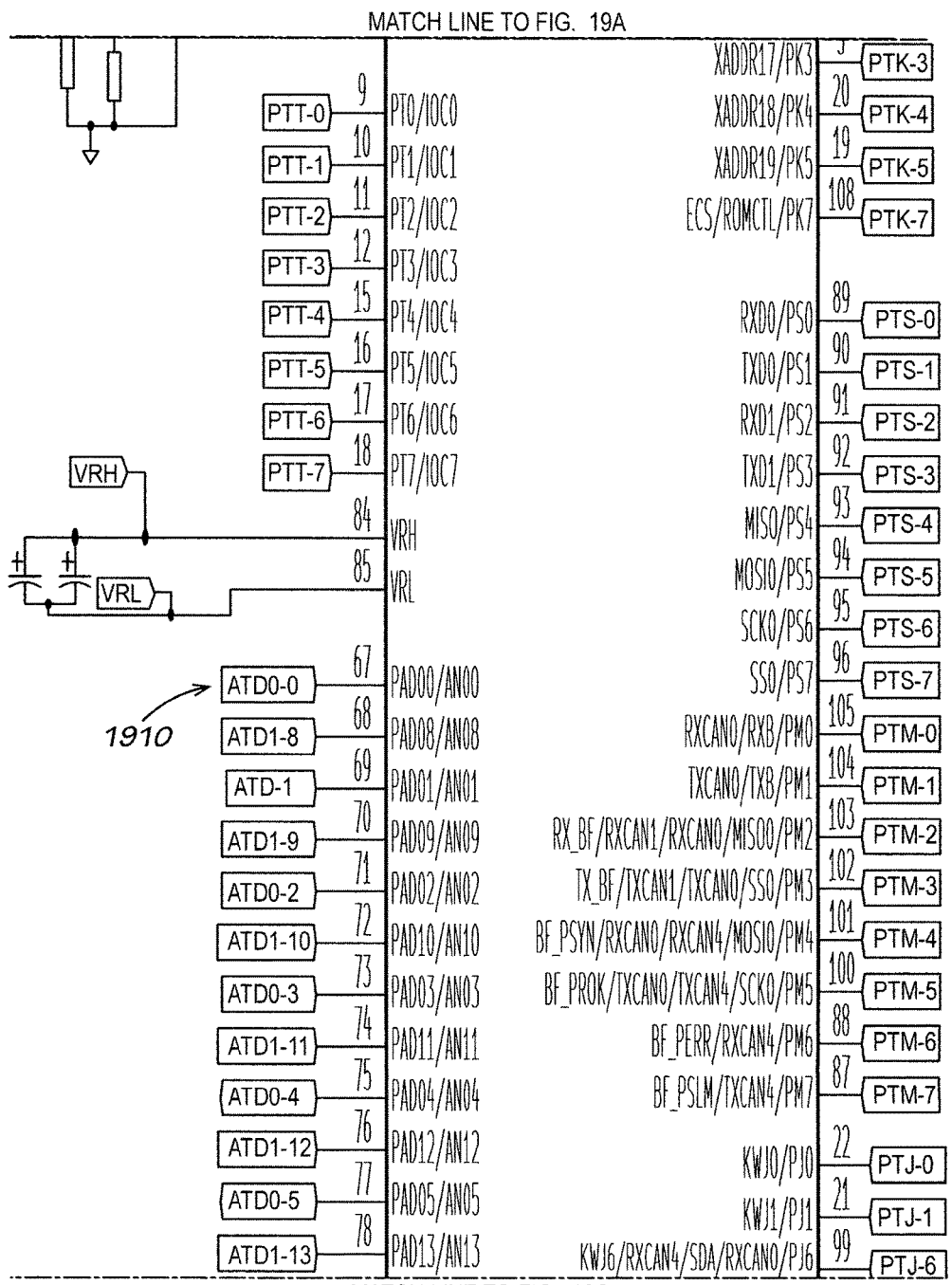
Figure 19C:
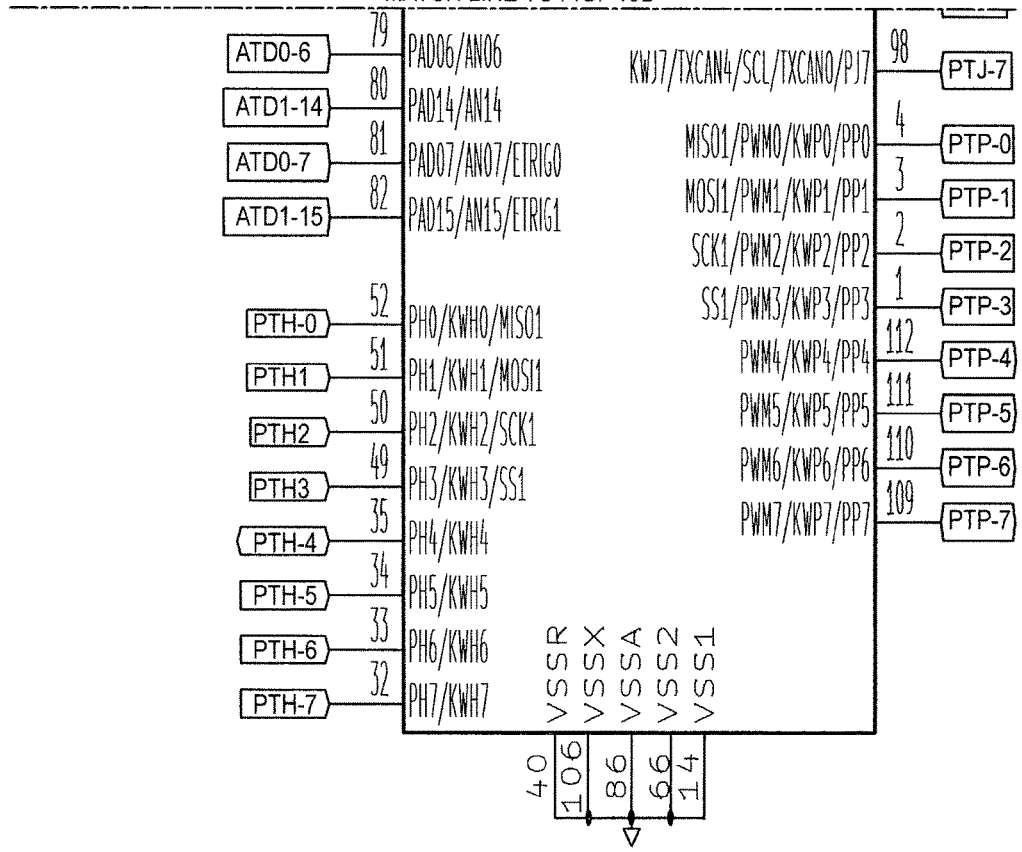

The connection points indicated in the Motherboard schematics is not to be confused with the Map Files nor processor termination points. The Motherboard schematics indicate the physical connections between the various headers and connectors on the Motherboard solely. Assignment of actual processor resources occurs on individual processor schematics. For instance, per the Generic Map File, the Dig1 header, pin 2 is assigned an analog to digital resource. When designing the processor board, it is known that the mating Processor Interface header pin position 154 routes to the Dig1 header, pin 2 (FIG. 16C, 1630). The processor board must assign an analog to digital resource to this pin position (154) in order to make the analog to digital converter resource appear on the appropriate header and pin (Dig1/pin 2). Referencing the Freescale processor schematic shown in FIGS. 19A-19C, it can be seen that the mating processor board 200 pin connector, position 154, is assigned an analog to digital resource (processor pin position 67, resource ATD0-0, FIG. 19B, 1910).

In summary, the motherboard contains static, processor agnostic, connections with all processor related interfaces routing to a 200 pin interface connector. The mate to this 200 pin connector is attached a processor board. Resources are allocated to various motherboard connectors and headers on the processor board. It is here where specific resource types and quantities are routed to the processor board 200 pin connector. Upon mating a specific processor board with the motherboard, the circuit is completed for attachment of specific resources to various motherboard headers (SPIP) and connectors (DPW).

Figure 20:
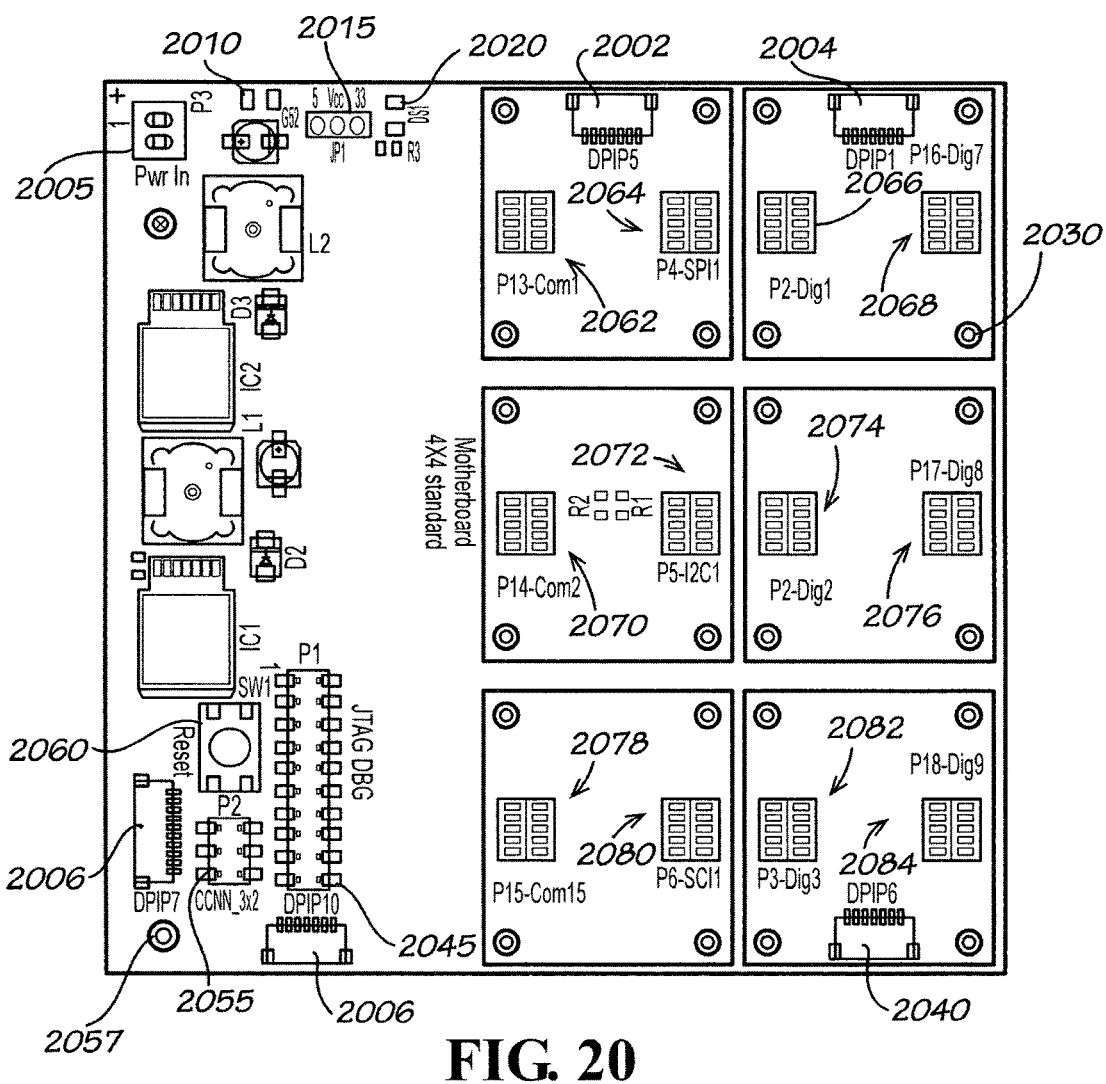
FIG. 20 is a top view of a PIEP motherboard, under an embodiment.

FIG. 20 is the front view of a PIEP motherboard, under an alternative embodiment. The top of the motherboard includes a power input (DC 9V-24V) 2005, a +5V supply indicator 2010, a +5V/+3.3V peripheral voltage select 2015, and a +3.3V supply indicator 2020. The top of the motherboard also includes SPIP peripherals 2062, 2064, 2066, 2068, 2070, 2072, 2074, 2076, 2078, 2080, 2082, and 2084. Note that under this embodiment paired headers (e.g., 2062, 2064) can not be used concurrently. The peripheral orientation determines which header (of the pair) may be utilized for specific application. The top of the motherboard also includes a JTAG-20 Debug/Programming Interface 2045, a 6 pin Debug/ICD header 2055, and a processor mounting hole 2057. The top of the motherboard includes DPIP supplemental signal connectors 2002, 2004, 2006, 2040.

Figure 21:
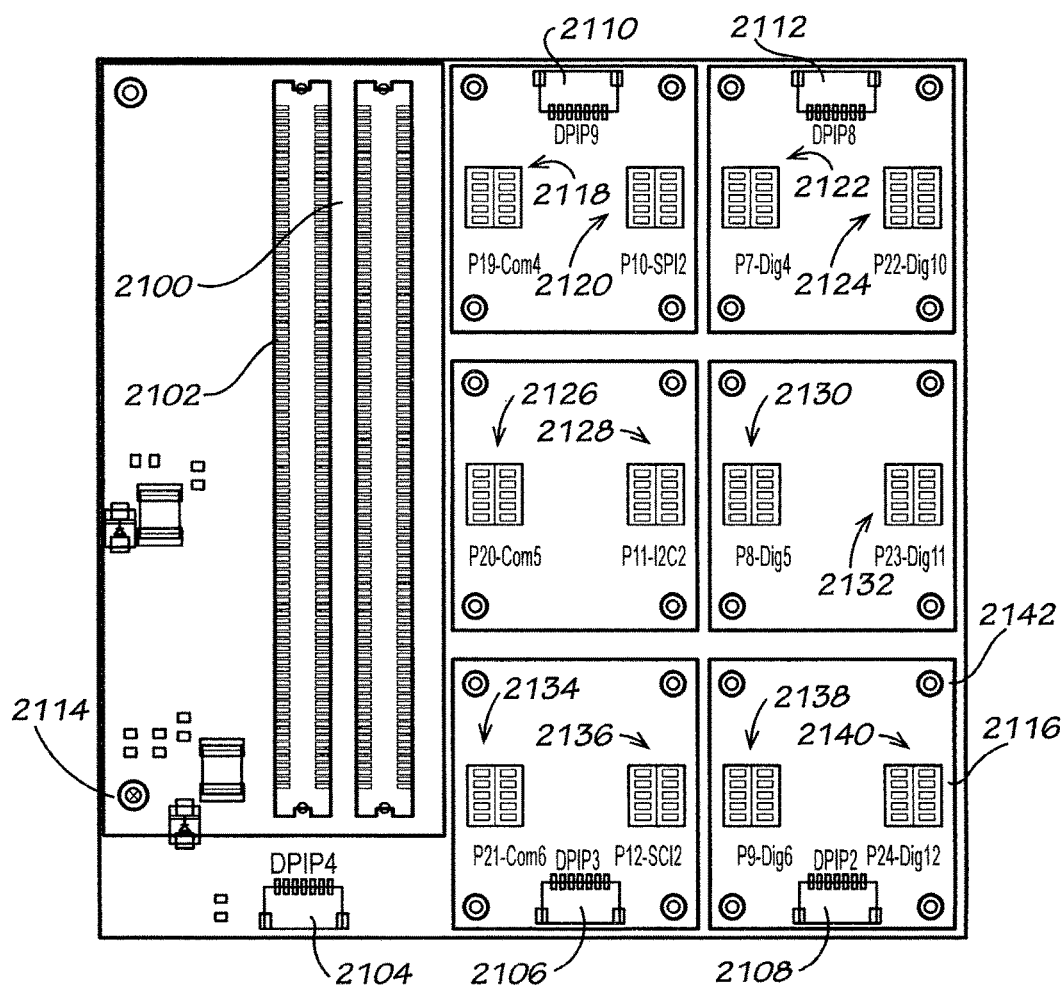
FIG. 21 is a back view of a PIEP motherboard, under an embodiment

FIG. 21 is the back view of a PIEP motherboard, under an alternative embodiment. The back of the motherboard also includes 12 SPIP peripheral headers 2118, 2120, 2122, 2124, 2126, 2128, 2130, 2132, 2134, 2136, 2138, and 2140. Note that SPIP headers represent mutually exclusive pairs (e.g. 2122, 2124). The peripheral board orientation selects on one of the two headers. The motherboard includes a Processor Interface Connector 2100 which is backwards compatible with all PIEP processor boards. The back of the motherboard also includes a Supplemental Processor Interface Connector 2102 for access to SPIP headers 2062, 2070, 2078, 2068, 2076, 2084, 2118, 2120, 2122, 2124, 2126, 2128, 2130, 2132, 2134, 2136, 2138, and 2140. In other words, such headers are routed to the Supplemental Processor Interface Connector 2102. The back of the motherboard also includes Processor Mount Hole 2114 and Peripheral Mount Hole 2142.

FIG. 22 is a schematic of an H-Bridge peripheral. FIG. 22 shows SPIP bottom header No. 1 2210. Such header interfaces with motherboard SPIP or peripherals stacked below board. The SPIP top header No. 1 2220 permits additional peripheral boards to be stacked above H-bridge board. SPIP bottom header No. 2 2230 interfaces with motherboard SPIP or peripherals stacked below board. The SPIP top header No. 2 2240 permits additional peripheral boards to be stacked above H-bridge board.

As already described in detail above, a processor board implements the processor specific map files through a 200 pin interface header. The processor specific SPIP file assigns additional resources to the generic map in view of processor resource offering. The processor board interface header also assigns certain microprocessor resources to motherboard DPIP headers. Accordingly, each processor board implements and SPIP map file and a DPIP map file. Such map files for the Freescale processor are already described below. Additional processor specific map file implementations are described below. Note that each table set forth below includes twelve map SPIP header assignments Table 6 is an SPIP map for the Cortex LM4F232H5QD ARM processor.

TABLE 6

| Top Slots | | | | | |
|---|---|---|---|---|---|
| SPI1 (top) | | | Dig 1 (top) | | |
| +5 V | AD-9/PE-5 | 1 | +5 V | AD-1/PE3 | |
| AD-10/PE-4 | DIO-5 | | AD-2/PE2 | DIO-1 | |
| SPI-MOSI/PA-5 | SPI-MISO/PA-4 | | PWM-1/PP-0 | PWM-2/PP-1 | |

TABLE 6-continued

| | | | | |
|---|---|---|---|---|
| SPI-SCK/PA-2 | SPI-SS/PA-3 | | ICOC-1 | ICOC-2 |
| GND | INTR1 | 9 | GND | ICOC-3 |

| I2C1 (top) | | | Dig2 (top) | |
|---|---|---|---|---|
| +5 V | AD-11/PB-4 | 1 | +5 V | AD-3/PE1 |
| AD-12/PB-5 | DIO-6 | | AD-4/PE0 | AD-5/PD7 |
| I2C-SDA/PB-3 | I2C-SCL/PB-2 | | PWM-3/PP-3 | PWM-4/PM-6 |
| DIO-7/PA-14 | DIO-8 | | ICOC-4/ | ICOC-5 |
| GND | INTR2 | 9 | GND | ICOC-6 |

| SCI1 (top) | | | Dig3 (top) | |
|---|---|---|---|---|
| +5 V | AD-13/PD3 | 1 | +5 V | AD-6/PD6 |
| DIO-9 | DIO-10 | | AD-7/PD5 | AD-8/PD4 |
| DIO-11 | DIO-12 | | PWM-5/PM-7 | DIO-2 |
| SCI-RX | SCI-TX | | DIO-3 | DIO-4 |
| GND | INTR3 | 9 | GND | IRQ |

Back Slots

| SPI2 (bottom) | | | Dig4 (bottom) | |
|---|---|---|---|---|
| +5 V | AD-14/PD-2 | 1 | +5 V | C0+ |
| CAN0TX | CAN1RX | | C0− | C0O |
| SPI-MOSI | SPI-MISO | | SPI-MOSI | SPI-MISO |
| SPI-SCK | SPI-SS | | SPI-SCK | SPI-SS |
| GND | INTR1 | 9 | GND | XIRQ |

| I2C2 (bottom) | | | Dig5(bottom) | |
|---|---|---|---|---|
| +5 V | AD-15/PD-1 | 1 | +5 V | C1+ |
| CAN1TX | Not Used | | C1− | C1O |
| I2C-SDA | I2C-SCL | | I2C-SDA | I2C-SCL |
| SCI-RX | SCI-TX | | SCI-RX | SCI-TX |
| GND | INTR2+ | 9 | GND | INTR |

| SCI2 (Bottom) | | | Dig6 (bottom) | |
|---|---|---|---|---|
| +5 V | USB0EPEN | 1 | +5 V | C2+ |
| USB0ID | USB0VBUS | | C2− | C2O |
| USB0D+ | USB0D− | | TempS+ | TempS− |
| SCI-RX | SCI-TX | | SCI-RX | SCI-TX |
| GND | USBFLT | 9 | GND | INTR |

Key to the SPIP map file for the Cortex LM4F232H5QD ARM follows
AD - Analog to Digital Resource
DIO - general purpose digital input/output resource
SPI(X) - Serial peripheral interface communication bus (requires four resource pins for implementation)
INTR(X) - General purpose interrupt
PWM - Pulse Width Modulation Resource
ICOC - Input capture/output compare resource
SCI(X) - Serial communications interface resource (requires two resource pins for implementation)
I2C(X) - Inter-IC communications bus (requires two resource pins for implementation)
Gnd - peripheral power supply ground pin
XIRQ - non-maskable interrupt, this interrupt is the highest priority and will be serviced first in the event multiple interrupt pins are activated.
USB(X) - Universal serial bus communications - only low speed USB is supported directly on the motherboard.
Temp(X) - temperature sensor resource input
C(X) - Analog compare function - as implemented, three resources are required (two analog inputs, one output).
Notes for Table 6
The Cortex LM4F232H5QD only supports peripherals operating a 5 volts, therefore the peripheral voltage pins (pins 1) indicate the supported voltage. The I2C2 pin 4 is unused. This is permissible as it is compliance with the Generic Map File. Resources that are followed by a "/" indicate the specific port and pin on the processor from where this resource will be supplied. An example is I2C1, pin 2, AD-11/PB-4. This analog to digital resource is supplied by processor port B pin 4 of the port. The '+' designated resources may be used by multiple devices (sharable resources). It is permissible to duplicate resources on headers if those resources are sharable. I2C is a sharable resource. The same I2C resource pins may be used to populate both I2C1 and I2C2 header positions (I2C1 & I2C2 pins 2; I2C1 & I2C2 pins 3).

Table 7 shows the DPIP map file for the Cortex LM4F232H5QD processor.

TABLE 7

| DPIP1/Motion Control interrupts & fault inputs | | | DPIP2/Motion Out | |
|---|---|---|---|---|
| Quad Encoder PhA | Quad Encoder PhB | 1 | PWM-8 | PWM-9 |
| Quad Encodr IDX | Quad Encoder2 PhA | 3 | PWM-10 | PWM-11 |
| Quad Encoder2 PhB | Quad Encoder2 IDX | 5 | PWM-12 | PWM-13 |

TABLE 7-continued

| | | | | |
|---|---|---|---|---|
| PWMFAULT0 | PWMFAULT1 | 7 | PWM-14 | PWM-15 |
| PWMFAULT2 | PWMFAULT2 | | | |

| DPIP5 | | | DPIP6 | |
|---|---|---|---|---|
| I2C3-SDA | I2C3-SCL | 1 | TIMER0 | TIMER1 |
| I2C3-SDA | I2C3-SCL | 3 | TIMER2 | TIMER3 |
| SCI5-TX | SCI5-RX | 5 | TIMER4 | TIMER5 |
| PE-3/Lstrb | PE4/Eclk | 7 | PWMFLT3 | PWMFLT4 |

| DPIP9 | | | DPIP10 | |
|---|---|---|---|---|
| PTK-0/XADDR14 | PTK-1/XADDR15 | 1 | +5 V | +5 V |
| PTK-2/XADDR16 | PTK-3/XADDR17 | 3 | Alt_Dbg-7 | Alt_Dbg-8 |
| PTK-4/XADDR18 | PTK-5/XADDR19 | 5 | Alt_Dbg-9 | Alt_Dbg-10 |
| PTK-7/ECS/ROMCTL | PTE0/XIRQ | 7 | Gnd | Gnd |

| DPIP3 - Onboard Comm 4 Wire - alternate map for offboard | | | DPIP4 - Offboard Comm | |
|---|---|---|---|---|
| SPI3 - MISO | SPI3 - MOSI | 1 | SCI3 - TX | SCI3 - RX |
| SPI3 - SCK | SPI3 - SS | 3 | SCI4 - TX | SCI4 - RX |
| SPI4 - MISO | SPI4-MOSI | 5 | CAN3 - TX | CAN3 - RX |
| SPI4-SCK | SPI4-SS | 7 | CAN4 - TX | CAN4 - RX |

| DPIP7 | | | DPIP8 | |
|---|---|---|---|---|
| Analg Cmp2 in+ | Analg Cmp2 in− | 1 | PTB-0/ADDR0 | PTB-1/ADDR1 |
| Analg Cmp2 Out | Temp sensor | 3 | PTB-2/ADDR2 | PTB-3/ADDR3 |
| ATD in 21 | ATD in 22 | 5 | PTB-4/ADDR4 | PTB-5/ADDR5 |
| ATD in 23 | ATD in 24 | 7 | PTB-6/ADDR6 | PTB-7/ADDR7 |
| +V_ADref | −V_ADref | | | |

Key for Table 7:
Quad Encoder (X) - Motion control encoder input resource.
PWMFault (X) - Pulse width modulation fault condition output resource.
PWM (X) - Pulse Width Modulation outpu resource.
SPI (X) - Serial Peripheral Interface resource.
COM (X) - Generic place holder for a to be allocated communication resource type.
SCI (X) - Serial Communications Interface resource type.
CAN - Controller Area Network communication resource type
I2C - Inter-IC Communications resource type.
TIMER(X) - Timer resources.
ATD - Analog to Digital Converter resource.
V_ADref - External voltage reference for processor Analog to Digital Converter resources.
ADDR - parallel data bus, may be implemented via digital I/O ports or by use of processor pins specifically designated for this purpose.
XADDR - Expanded address bus, provides for 16 bit parallel data transfers when used in conjunction with ADDR resources.
Alt_Dbg - alternate programming/debugging interface pins, not utilized on the Cortex processor.
Analg Cmp(X) - Analog comparator, two analog input voltages are compared, output resource reflects relative level of input signals (signal one greater than or less than signal two).
Temp Sensor - Processor temperature sensor resource input
+5 V - peripheral power supply
Gnd - peripheral power supply ground Table 8 is a SPIP map for the Microchip DSPIC33EP256MU814 processor.

TABLE 8

| Top Slots | | | | |
|---|---|---|---|---|
| SPI1 (top) | | | Dig 1 (top) | |
| +3.3 V | RB11-ATD11 | | +3.3 V | RB12 - ATD12 |
| RE4 - QEIA PhA | RB6 - QEIA - PhB | | RB13 - AN13 | RH8 - DIO |
| RF8-SPI1-SLK* | RK0- SPI1 SS | | RE1 - PWM1H | RE3 - PWM2H |
| RF13 - SPI1-MISO* | RF12 - SPI1 - MOSI* | | RE6 - ICOC-0 | RB4 - ICOC - 2 |
| GND | RD4 - IRQ-0* | | GND | RA2 - ICOC - 3** |
| I2C1 (top) | | | Dig2 (top) | |
| +3.3 V | RD0 - DIO | | +3.3 V | RB14 - ATD14 |
| RH10 - DIO | RH11 - DIO | | RB15 - ATD15 | RE8 - ATD20 |
| RD-9 - I2C SCL* | RD10 - I2C SDA* | | RE5 - PWM3H | RE7 - PWM4H |
| RH12 - Dio | RH13 - DIO | | RA3 - ICOC- 4 | RG7 - ICOC - 5 |
| GND | RD5 - IRQ-1* | | GND | RG6 - ICOC - 6** |

TABLE 8-continued

| SCI1 (top) | | Dig3 (top) | |
|---|---|---|---|
| +3.3 V | RE9 - AN21 | +3.3 V | RA6 - ATD22 |
| RD14 - CAN1-RX | RD13 - CAN1-TX | RA7 - ATD23 | RB8 - ATD8 |
| RH14 - Dio | RH15 - DIO | RC2 - PWM5H | RH9 - DIO |
| RG13 - SCI1 - RX | RG14 - SCI1 - TX | RJ14 - DIO | RJ15 - DIO |
| GND | RE2 - ICOC** | GND | RB7 - ICOC - 7** |

| Bottom Headers | | | |
|---|---|---|---|
| SPI2 (bottom) | | Dig4 (bottom) | |
| +3.3 V | RB9 - ATD9 | +3.3 V | RB3 - C2in1+ |
| RF1 - QEI B - PhA | RA15 - QEI B - PhB | RG9 - C2in1− | RE8 - C2out |
| RG0 - SPI3-SCK* | RK-1 - SPI3 - SS | RB2 - C2in2− | RG8 - C2in3− |
| RG12 - SPI3 - MISO* | RG1 - SPI3 - MOSI* | RJ2 - DIO | RK15 - DIO |
| GND | RD15 - IRQ-2* | GND | RD8 - RTC IRQ* |
| I2C2 (bottom) | | Dig5(bottom) | |
| +3.3 V | RJ0 -Dio | +3.3 V | RD7 - C3in+ |
| RJ1 - DIO | RJ10 - DIO | RC14 - C3in1− | RB3 - C3out |
| RF5 - I2C2 - SCL* | RF4 - I2C2 - SDA* | RD6 - C3in2− | RC13 - C3in3− |
| RJ11 - Dio | RJ12 - DIO | RJ3 - DIO | RJ4 - Dio |
| GND | RF2 - IRQ-3* | GND | RD1 - IRQ-5* |
| SCI2 (Bottom) | | Dig6 (bottom) | |
| +3.3 V | RJ13 - DIO | +3.3 V | RJ5 - DIO |
| RD4 - CAN2-RX | RD3 - CAN2-TX | RC3 - PWM6L | RJ8 - PWM7L |
| RD12 - SCI2-RTS | RD11 - SCI2-CTS | RC4 - PWM6H | RJ9 - PWM7H |
| RG15 - SCI2-RX | RA14 - SCI2-TX | RJ6 - Dio | RJ7 - DIO |
| GND | RD15 IRQ-4 | GND | RF2 - ICOC - 8 |

Key to Table 8:
AD - Analog to Digital Resource.
DIO - general purpose digital input/output resource.
SPI(X) - Serial peripheral interface communication bus (requires four resource pins for implementation).
INTR(X) - General purpose interrupt.
PWM - Pulse Width Modulation Resource.
ICOC - Input capture/output compare resource.
SCI(X) - Serial communications interface resource (requires two resource pins for implementation).
I2C(X) - Inter-IC communications bus (requires two resource pins for implementation).
Gnd - peripheral power supply ground pin.
CAN - Controller Area Network communications protocol. Requires two resource pins for implementation.
C(X) - Analog Compare resource, three resource pins per module. Two input analog voltages are compared.
Output resource pin denotes comparison of (C+ > C−) or (C+ < C−).
Notes to Table 8:
The '*' denotes sharable resource - multiple peripheral devices can utilize common resource pins without conflict. The '**' pins can also function as a general purpose interrupt. Processor port and pin are referenced first followed by resource type. Dig1 pin 2 is supplied by processor port B, pin 12. The resource supplied is an analog to digital converter resource Table 9 shows the DPIP map file for the Microchip DSPIC33EP256MU814 processor.

TABLE 9

| DPIP1 Comparators & fault inputs | | DPIP2/PWM | | |
|---|---|---|---|---|
| Cvref - RB10 | RB5 - C1in+ | 1 | RE0 - PWM1L | RE1 - PWM1H |
| C1in1(−) - RG7 | RB4 - Cin2− | 3 | RE2 - PWM2L | RE3 - PWR2H |
| C1in3(−) - RG6 | RC1 - C1out | 5 | RE4 - PWM3L | RE5 - PWM3H |
| C2in1(−) - RG9 | RB3 - C2in1+ | 7 | RE6 - PWM4L | RE7 - PWM4H |
| C2in3(−) - RG8 | C2out - RE0 | | | |

| DPIP3 - In Circuit Debug 4 Wire - alternate map for offboard | | CAN & Timers | | |
|---|---|---|---|---|
| PGEC1 - RB6 | PGED1 - RB7 | 1 | RG1 - TIM0 | RG12 - TIM1 |
| PGEC3 - RB1 | PGED3 - RB0 | 3 | RG13 - TIM2 | RG14 - TIM3 |
| RF8 - SCI3/RX | RF12 - SCI3/TX | 5 | RD11 - TIM4 | RD12 - TIM5 |
| RF13 - SCI4/RX | RG0 - SCI4ATX | 7 | RD13 - TIM6 | RD14 0 TIM7 |

| DPIP9 (parallel Master Mode upper 8 bit address) | | DPIP10 (Parallel Master Mode optional sigs) | | |
|---|---|---|---|---|
| RJ8 - PMA8 | RJ9 - PMA9 | 1 | +3.3 V | +3.3 V |
| RJ10 - PMA10 | RJ11 - PMA11 | 3 | RJK13 - PMBE | RK14 - PMWR |
| RJ12 - PMA12 | RJ13 - PAM13 | 5 | RK15 - PMRD | RD8 - RTC IRQ* |

TABLE 9-continued

| RK11 - PMCS1/PMA14 | RK12 - PMCS2 | 7 | Gnd | Gnd |
|---|---|---|---|---|

| DPIP5-DCI/SPI | | | DPIP6 (Parallel Master Port 8 bit address) | |
|---|---|---|---|---|
| SPI2 -/SCK - RG6 | SPI2/SS - RG9 | 1 | RJ0 - PMA0 | RJ1 - PMA1 |
| SPI2/MOSI - RG8 | SPI2/MISO - RG7 | 3 | RJ2 - PMA2 | RJ3 - PMA3 |
| RB2 - COFS | RG8 - CSCK | 5 | RJ4 - PMA4 | RJ5 - PMA5 |
| RD6 - CSDI | RC13 - CSDO | 7 | RJ6 - PMA6 | RJ7 - PMA7 |

| DPIP7 | | | DPIP8 (Parallel Master Port 8 bit data) | (++)Shares A PWM pin |
|---|---|---|---|---|
| RC1 - AN16 | RC2 - AN17 | 1 | RH0 - PMD0 | RH1 - PMD1 |
| RC3 - AN18 | RC4 - AN19 | 3 | RH2 - PMD2 | RH3 - PMD3 |
| RB2 - AN2 | RE0 - AN24 | 5 | RH4 - PMD4 | RH5 - PMD5 |
| RE1 - AN25 | RE2 - AN26 | 7 | RH6 - PMD6 | RH7 - PMD7 |
| RA10 - Vref+ | RA9 - Vref− | | | |

Key to Table 9:
SPI (X) - Serial Peripheral Interface resource.
SCI (X) - Serial Communications Interface resource type.
AN - Analog to Digital Converter resource.
V_ref - External voltage reference for processor Analog to Digital Converter resources.
PMA - Parallel Master Mode Data Bus, address bits
PMD - Parallel Master Mode Data Bus, data bits.
PM(X), Other than PMA or PMD, control signals for parallel master mode data bus.
Alt_Dbg - alternate programming/debugging interface pins, other than debug/programming supported via 6 pin debug or 20 pin JTAG programming headers (not included).
C(#)in - Analog comparator analog input.
C(#)out - Analog comparator, comparator result output (greater than is high output, less than is low output).
TIM - timer/counter resource.
COFS - Codec Frame Synchronization resource, resource used in the Data Converter Interface Module.
CSCK - Data Converter Interface Module (DMI) clock signal.
CSDI - DMI host data input.
CSDO - DMI host data out.
DMI - Data Converter Interface Module, communications protocol supporting audio codec transfers, and select peripherals with DMI interfaces.
RTC IRQ - Real time clock alarm output interrupt, output changes state on a prescribed frequency or on a specific date, time as configured in software.
PGE(X) - programming/debugging pins supported through the in-circuit debug (ICD) interface.
Note that only 3.3 V peripheral supply voltage supported with this processor. Parallel Master Mode data transfer requires use of both DPIP6 (address bus) and DPIP8 (data bus). When used in conjunction with DPIP9, 16 bit addressing is supported.
Notes for Table 9:
Only 3.3 V peripheral supply voltage supported with this processor. Parallel Master Mode data transfer requires use of both DPIP6 (address bus) and DPIP8 (data bus). When used in conjunction with DPIP9, 16 bit addressing is supported.

Table 10 shows the SPIP map file for the Atmel ARM SAM3X8E processor.

TABLE 10

| Top Slots | | | | |
|---|---|---|---|---|
| SPI1 (top) | | | Dig 1 (top) | |
| +3.3 V | PA6 - AD_3 | 1 | +3.3 V | PA3 - AD_1 |
| PC8 - DIO | PC23 - DIO | | PA4 - AD_2 | PB16 - DAC1** |
| PA27 - SPI0_SPCK | PA28 - SPI0_NPCS0 | | PC18 - PWM | PC7 - PWM |
| PA25- SPI0_MISO | PA26 - SPI0_MOSI | | PC25 - TIOA6* | PC26 - TIOB6* |
| GND | PA29 - SPI0_NPCS1 | 9 | GND | PB27 - TIOB0* |
| I2C1 (top) | | | Dig2 (top) | |
| +3.3 V | PC6- DIO | 1 | +3.3 V | PB19 - AD12 |
| PA0 - CANRX0 | PA1 - CANTX0 | | PB17 - AD10 | PB18 - AD11 |
| PA17 - I2C - SDA | PA18 - I2C SCL | | PC3 - PWM0 | PC9 - PWM3 |
| PD9 - DIO | PD10 - DIO | | PC28 - TIOA7* | PC29 - TIOB7* |
| GND | PC1 - DIO | 9 | GND | PA5 - TIOA2* |
| SCI1 (top) | | | Dig3 (top) | |
| +3.3 V | PA2-AD0 | 1 | +3.3 V | PA22 - AD_4 |
| PC30 - DIO | PD0 - DIO | | PA23 - AD_5 | PA24 - AD_6 |
| PD1 - DIO | PD2 - DIO | | PA19 - PWM1 | PA20 - MCCDA** |
| PA8 - URXD | PA9 - UTXD | | PA21 - MCDA0** | PC14 - DIO |
| GND | PB25 - TIO | 9 | GND | PD7 - TIOA8* |

TABLE 10-continued

| Back Slots | | | | |
|---|---|---|---|---|
| SPI2 (bottom) | | | Dig4 (bottom) | |
| +3.3 V | PC17 - DIO | 1 | +3.3 V | PB1 - ETXEN |
| PB23 - (USART2) CS+ | PB22 - (USART2) RTS+ | | PB0 - ETXCK | PB2 - ETX0 |
| PB24 - (USART2) SCK2+ | PC13 - DIO | | PB3 - ETX1 | PB4 - ECRSDV |
| PB20 - (USART2) MISO/ | PB21 - (USART2) MOSI | | PB5 - ERX0 | PB6 - ERX1 |
| GND | PC16 - DIO | 9 | GND | PB7 - ERXER |
| I2C2 (bottom) | | | Dig5(bottom) | |
| +3.3 V | PD6 - PWMF12 | 1 | +3.3 V | PA7 - TCLK2 |
| PC2 - PWML0 | PC15 - DIO | | PB8 - DIO | PB9 - DIO |
| PB12 - I2C - SDA | PB13 - I2C - SCL | | PC10 - DIO | PC11 - DIO |
| PD5 - SCI - RXD3 | PD4 - SCI - TXD3 | | PB26 - DIO | PC12 -DIO |
| GND | PC4 - DIO/PWML1 | 9 | GND | PD8 - TIOB8 |
| SCI2 (Bottom) | | | Dig6 (bottom) | |
| +3.3 V | PC24 - DIO | 1 | +3.3 V | PC5 - DIO |
| PA15 - (USART1) CTS | PA14 - (USART1) RTS | | PC22 - PWML5 | PB15 - DAC0 |
| PA16 - (USART1) SCK1 | PB14 - DIO | | PC19 - PWMH5 | PC20 - PWMH4 |
| PA12 - (USART1) RXD1 | PA13 - (USAR1T) TXD1 | | PA10 - RXD0 | PA11 - TXD0 |
| GND | PD3 - DIO | 9 | GND | PC21 - PWML4 |

Key to Table 10:
AD - Analog to Digital Resource.
DIO - general purpose digital input/output resource.
SPI(X) - Serial peripheral interface communication bus (requires four resource pins for implementation).
INTR(X) - General purpose interrupt.
PWM - Pulse Width Modulation Resource.
SCI(X) - Serial communications interface resource (requires two resource pins for implementation).
I2C(X) - Inter-IC communications bus (requires two resource pins for implementation).
Gnd - peripheral power supply ground pin.
CAN - Controller Area Network communications protocol. Requires two resource pins for implementation.
DAC - Digital to Analog Converter resource.
UT/UR/USART - Universal Synchronous Asynchronous Receiver/Transmitter - Flexible serial communication module capable.
TIO - Timer Input Output resource - can be configured to function as a timer, input capture/output compare, or interrupt resource.
MC(X) - Multi-media card interface resource - Three resource lines required for implementation (not all resources are shown on map file).
PWMF(X) - Pulse Width Modulation fault output - state changes if PWM error condition occurs.
E(X) - Ethernet communications resource - minimum of 6 resource pins required for implementation.
Notes for Table 10
The SAM3X8E processor supports 3.3 V peripherals only. Processor port and pin position are indicated first followed by resource type. Dig1 position 2 indicates processor port A, pin 3, supplies an analog to digital resource to this SPIP header position. All pins, unless otherwise noted, can serve as a Digital input/output resource (DIO). The '*' indicates processor specific resource permitted in these locations; also, Generic Map file requires Digital I/O (DIO) resources in these locations; processor pins occupying these locations can also function as a DIO resource. The '*' indicates Timer/Counter resources (TIO) can also function as input capture/output compare, interrupt, or digital I/O (DIO) resources. The + USART resources can function as Serial Peripheral Interface (SPI) or Serial Communications Interface (SCI) resources. Select implementations may also support supplemental SCI resources Clear To Send (CTS) and Request To Send (RTS) data flow control functions Table 11 shows the DPIP map file for the Atmel ARM SAM3X8E processor.

TABLE 11

| DPIP1/Motion Control interrupts & fault inputs | | | DPIP2/Motion Out | |
|---|---|---|---|---|
| PB25 - TIOA0 | PB27 - TIOB0 | 1 | PC3 - PWMH0 | PC5 - PWMH1 |
| PA2 - TIOA1 | PA5 - TIOA2 | 3 | PC7 - PWMH2 | PC9 - PWMH3 |
| PC25 - TIOA6 | PC26 - TIOB6 | 5 | PC20 - PWMH4 | PC19 - PWMH5 |
| PC28 - TIOA7 | PC29 - TIOB7 | 7 | PC18 - PWMH6 | PD6 - PWMF12 |
| PD7 - TIOA8 | PD8 - TIOB8 | | | |
| DPIP5 | | | DPIP6 (SEE DPIP10 for MMC Card) | |
| PA17 - TWD0 | PA18 - TWCK0 | 1 | PA19 - MCCK | PA20 - MCCDA |
| PB12 - TWD1 | PB13 - TWCK1 | 3 | PA21 - MCDA0 | PA22 - MCDA1 |
| PA12 - USART1_RX(MISO) | PA13 - USART1_TX(MOSI) | 5 | PA23 - MCDA2 | PA24 - MCDA3 |
| PA16 - USART1_SCK1 | PA15 - USART1_CTS(SS) | 7 | VDD | VSS |
| DPIP9 | (+) Shares Timer (++) PWM | | DPIP10 (If using MMC card see DPIP6) | |
| PC19 - NANDOE++ (PWM) | PC20 - NANDWE++ (PWM) | 1 | +3.3 V | +3.3 V |
| PD9 - NANDCLE | PD8 - NANDALE+(TIOB8) | 3 | PD0 - MCDA4/DIO/INT | PD1 MCDA5/DIO/INT |

TABLE 11-continued

| PA2 - NANDRDY+(TIOA1) | PA6 - NCS0+ (TIOB2) | 5 | PD2 - MCDA6/DIO/INT | PD3 MCDA7/DIO/INT |
|---|---|---|---|---|
| PA7 - NCS1 | PB27 - NCS3+(TIOB0) | 7 | Gnd | Gnd |

| DPIP3 - Onboard Comm 4 Wire - alternate map for offboard | | | DPIP4 - Offboard Comm | |
|---|---|---|---|---|
| PA25 - SPI0_MISO | PA26 - SPI0_MOSI | 1 | PA9 - UTXD | PA8 - URXD |
| PA27 - SPI0_SPCK | PA28 - SPI0_NPCS0 (SS) | 3 | PD4 - USART3_TX | PD5 - USART3_RX |
| PB21 - USART2_MISO(RX) | PB20 - USART2_MOSI(TX) | 5 | PA0 - CANTX0 | PA1 - CANRX0 |
| PB24 - USART2_SCK | PB23 - USART2_SS(CTS) | 7 | PB14 - CANTX1 | PB15 - CANRX1/(DAC0) |

| DPIP7 | | | DPIP8 (8 bit NAND Flash also requires DPIP9) | (++)Shares A PWM pin |
|---|---|---|---|---|
| PA3 - AD1 | PA4 - AD2 | 1 | PC2 - D0 | PC3 - D1++(PWM) |
| PA6 - AD3 | PB17 - AD10 | 3 | PC4 - D2 | PC5 - D3++(PWM) |
| PB18 - AD11 | PB19 - AD12 | 5 | PC6 - D4 | PC7 - D5++(PWM) |
| PA 11 - ADTRG | PB16 - DAC1 | 7 | PC8 - D6 | PC9 - D7++(PWM) |
| ADVREF | GNDANA | | | |

The Key to Table 11:
TIO(X) - Timer input/counter resource.
PWM(X) - Pulse Width Modulation Resource.
SPI(X) - Serial Peripheral Resource Interface communications protocol.
USART(X) - Universal Synchronous/Asynchronous Receiver Transmitter; flexible serial communications.
UT(X)/UR(X) - Transmitter/Receiver resources of USART module.
CAN(X) - Controller Area Network - a rugged two wire communications protocol originally developed for automotive use.
TW(X) - Two wire interface - functionally equivalent to I2C (Inter-IC communications protocol).
MC(X) - multimedia card serial interface protocol - supports SD memory cards among other physical media.
AD - Analog to Digital Converter resource.
ADTrig - External trigger signal to initiate analog to digital conversion process.
DAC - Digital to Analog Converter resource.
ADVref - External reference voltage for analog to digital converter.
AGND - External reference voltage ground for analog to digital converter.
D(#) - Parallel data bus for NAND bus controller.
NAN(X) - NAND bus controller control signals.
MCD(X) - Direct Memory Access (DMA) data bus.
Notes for Table 11
NAN flash uses same resources as select PWM and timers, and conflicting resources can not be operated concurrently. Processor only supports 3.3 V peripheral voltage. Resources listed in ( ) on map files are alternate functions of processor pins.

Table 12 shows the SPIP map file for the MAC7106 ARM processor.

TABLE 12

| Top Slots | | | | |
|---|---|---|---|---|
| SPI1 (top) | | | Dig 1 (top) | |
| Vcc | AD-9/PH-8 | 1 | Vcc | AD-1/PH-0 |
| AD-10/PH-9 | DIO-5/PB-5 | | AD-2/PH-1 | DIO-1/PA-8 |
| SPI-MOSI/PB-3 | SPI-MISO/PB-2 | | PWM-1/PF-2 | PWM-2/PF-3 |
| SPI-SCK/PB-4 | SPI-SS/PB-6 | | ICOC-1/PF-8 | ICOC-2/PF-9 |
| GND | INTR1/PF-7 | 9 | GND | ICOC-3/PF-10 |
| I2C1 (top) | | | Dig2 (top) | |
| Vcc | AD-11/PH-10 | 1 | Vcc | AD-3/PH-2 |
| AD-12/PH-11 | DIO-6/PA-13 | | AD-4/PH-3 | AD-5/PH-4 |
| I2C-SDA/PB-0 | I2C-SCL/PB-1 | | PWM-3/PF-4 | PWM-4/PF-5 |
| DIO-7/PA-14 | DIO-8/PA-15 | | ICOC-4/PF-11 | ICOC-5/PF-12 |
| GND | INTR2/PF-14 | 9 | GND | ICOC-6/PF-13 |
| SCI1 (top) | | | Dig3 (top) | |
| Vcc | AD-13/PH-12 | 1 | Vcc | AD-6/PH-5 |
| DIO-9/PG-8 | DIO-10/PG-9 | | AD-7/PH-6 | AD-8/PH-7 |
| DIO-11/PE-8 | DIO-12/PE-9 | | PWM-5/PF-6 | DIO-2/PA-9 |
| SCI-RX/PG-0 | SCI-TX/PG-1 | | DIO-3/PA-10 | DIO-4/PA-11 |
| GND | INTR3/PF-15 | 9 | GND | IRQ/PD-4 |
| Back Slots | | | | |
| SPI2 (bottom) | | | Dig4 (bottom) | |
| Vcc | AD-14/PH-13 | 1 | Vcc | DIO/PB-9 |
| DIO-13/PB-10 | DIO-14/PB-11 | | DIO/PB-8 | DIO/PB-7 |
| SPI-MOSI/PB-14 | SPI-MISO/PB-15 | | DIO/PI-4 | DIO/PI-5 |

TABLE 12-continued

| | | | | |
|---|---|---|---|---|
| SPI-SCK/PB-13 | SPI-SS/PB-12 | | DIO/PI-6 | DIO/PB-7 |
| GND | INTR1/PF-7+ | 9 | GND | XIRQ/PD-3+ |

| I2C2 (bottom) | | | Dig5(bottom) | |
|---|---|---|---|---|
| Vcc | AD-15/PH-14 | 1 | Vcc | DIO/PA-0 |
| CAN1TX/PG-4 | CAN1RX/PG-5 | | DIO/PA-1 | DIO/PA-2 |
| I2C-SDA/PB-0+ | I2C-SCL/PB-1+ | | DIO/PA-3 | DIO/PA-4 |
| SCI-RX/PG-12 | SCI-TX/PG-13 | | DIO/PA-5 | DIO/PA-6 |
| GND | INTR2/PF-14+ | 9 | GND | DIO/PA-7 |

| SCI2 (Bottom) | | | Dig6 (bottom) | |
|---|---|---|---|---|
| Vcc | DIO-19/PH-15 | 1 | Vcc | AD/PE-10 |
| CAN2TX/PG-6 | CAN2RX/PG-7 | | CAN4TX/PG-10 | CAN4RX/PG-11 |
| DIO-22/PE-13 | DIO-23/PE-14 | | AD/PE-11 | AD/PE-12 |
| SCI-RX/PG-2 | SCI-TX/PG-3 | | SCI-RX/PG-14 | SCI-TX/PG-15 |
| GND | XIRQ/PD-3+ | 9 | GND | INTR/PF-15+ |

The Key to Table 12:
AD - Analog to Digital Resource
DIO - general purpose digital input/output resource
SPI(X) - Serial peripheral interface communication bus (requires four resource pins for implementation)
INTR(X) - General purpose interrupt
PWM - Pulse Width Modulation Resource
ICOC - Input capture/output compare resource
SCI(X) - Serial communications interface resource (requires two resource pins for implementation)
I2C(X) - Inter-IC communications bus (requires two resource pins for implementation)
Gnd - peripheral power supply ground pin
XIRQ - non-maskable interrupt, this interrupt is the highest priority and will be serviced first in the event multiple interrupt pins are activated.
CAN - Controller Area Network communications protocol. Requires two resource pins for implementation.
Notes for Table 12:
The Freescale MAC7106 supports either 3.3 V or 5 V powered peripherals; therefore the peripheral voltage is designated as Vcc. Actual peripheral voltage is user selected by a jumper on the motherboard. I2C2 pin 4 is unused. This is permissible as it is compliance with the Generic Map File. Resources that are followed by a "/" indicate the specific port and pin on the processor from where this resource will be supplied. An example is the I2C1, pin 2, AD-11/PH-10. This analog to digital resource is supplied by processor port H pin 10 of the port. The '+' designated resources may be used by multiple devices (sharable resources). It is permissible to duplicate resources on headers if those resources are sharable. I2C is a sharable resource. The same I2C resource pins may be used to populate both I2C1 and I2C2 header positions (I2C1 & I2C2 pins 2; I2C1 & I2C2 pins 3). Digital port 5 has been implemented with resources from a single port on the processor (port A). For this implementation, the Dig5 header supports parallel data transfer from port A to connected devices with an 8 bit wide data bus.

Table 13 shows the SPIP map file for the Zilog Z51F6412 processor.

TABLE 13

| SPI1 (top) | | | Dig 1 (top) | |
|---|---|---|---|---|
| Vcc | AD-9/P30 | 1 | Vcc | AD-1/P21 |
| DIO/P74 | DIO-5/P75 | | AD-2/P22 | DIO-1/P70 |
| SPI-MOSI/P36 | SPI-MISO/P37 | | PWM-1/P53 | PWM-2/P54 |
| SPI-SCK/P35 | SPI-SS/P76 | | ICOC-1/P51 | ICOC-2/P60 |
| GND | INT2/P12 | 9 | GND | ICOC-3/P61 |

| I2C1 (top) | | | Dig2 (top) | |
|---|---|---|---|---|
| Vcc | AD-11/P31 | 1 | Vcc | AD-3/P23 |
| DIO/P77 | DIO-6/P80 | | AD-4/P24 | AD-5/P24 |
| I2C-SDA/P07 | I2C-SCL/P06 | | PWM-3/P55 | PWM-4/P56 |
| DIO-7/P81 | DIO-8/P40 | | ICOC-4/P64 | ICOC-5/P65 |
| GND | INT3/P13 | 9 | GND | INT0/P10 |

| SCI1 (top) | | | Dig3 (top) | |
|---|---|---|---|---|
| Vcc | AD-13/P34 | 1 | Vcc | AD-6/P25 |
| DIO/P41 | DIO/P42 | | AD-7/P26 | AD-8/P27 |
| DIO/P00 | DIO/P01 | | PWM-5/P57 | DIO-2/P71 |
| SCI-RX/P03 | SCI-TX/P02 | | DIO-3/P72 | DIO-4/P73 |
| GND | INT4/T14 | 9 | GND | INT1/P11 |

| Back Slots | | | | |
|---|---|---|---|---|
| SPI2 (bottom) | | | Dig4 (bottom) | |
| Vcc | DIO/P43 | 1 | Vcc | DIO/P50 |
| DIO/P52 | Not Used | | DIO/P62 | DIO/P63 |
| SPI-MOSI1/P46 | SPI-MISO1/P47 | | SPI-MOSI+ | SPI-MISO+ |
| SPI-SCK1/P45 | SPI-SS1/P44 | | SPI-SCK+ | Not Used |
| GND | INTR2/ | 9 | GND | INT5/P15 |

| I2C2 (bottom) | | | Dig5(bottom) | |
|---|---|---|---|---|
| Vcc | Not Used | 1 | Vcc | Not Used |
| Not Used | Not Used | | DIO/P04 | DIO/P05 |
| I2C-SDA/P07+ | I2C-SCL/P06+ | | I2C3-SDA+ | I2C-3-SCL+ |
| DIO/P51 | Not Used | | Not Used | Not Used |
| GND | INTR3/ | 9 | GND | INT6/P16 |

| SCI2 (Bottom) | | | Dig6 (bottom) | |
|---|---|---|---|---|
| Vcc | Not Used | 1 | Vcc | Not Used |
| Not Used | Not Used | | Not Used | Not Used |
| DIO/P66 | DIO/P67 | | I2C-SDA+ | I2C-SCL+ |
| SCI2-RX/P33 | SCI2-TX/P32 | | Not Used | Not Used |
| GND | INTR4/ | 9 | GND | INT7/P17 |

Key for Table 13:
AD - Analog to Digital Resource.
DIO - general purpose digital input/output resource.
SPI(X) - Serial peripheral interface communication bus (requires four resource pins for implementation).
INTR(X) - General purpose interrupt.
PWM - Pulse Width Modulation Resource.
ICOC - Input capture/output compare resource.
SCI(X) - Serial communications interface resource (requires two resource pins for implementation).
I2C(X) - Inter-IC communications bus (requires two resource pins for implementation).
Gnd - peripheral power supply ground pin.
Notes for Table 13:

TABLE 13-continued

The Zilog Z51F6412 supports either 3.3 V or 5 V powered peripherals, therefore the peripheral voltage is designated as Vcc. Actual peripheral voltage is user selected by a jumper on the motherboard. I2C2 pin 4 is unused. This is permissible as it is compliance with the Generic Map File. Resources that are followed by a "/" indicate the specific port and pin on the processor from where this resource will be supplied. An example is I2C1, pin 2, AD-11/P31. This analog to digital resource is supplied by processor port pin 31. The '+' designated resources may be used by multiple devices (sharable resources). Note that it is permissible to duplicate resources on headers if those resources are sharable. I2C is a sharable resource. The same I2C resource pins may be used to populate both I2C1 and I2C2 header positions (I2C1 & I2C2 pins 2; I2C1 & I2C2 pins 3). The Zilog chip does not have adequate resources to fully populate all map positions (header positions), but does have adequate resources to support the required generic map file. Future implementations include a smaller form factor motherboard with 9 total SPBP headers. This future board will retain processor and peripheral compliance with existing designs and will be better suited for processors with limited resources.

Table 14 shows the SPIP map file for the Microchip sPIC30F6014A processor.

TABLE 14

| Top Slots | | | | | |
|---|---|---|---|---|---|
| SPI1 (top) | | | Dig 1 (top) | | |
| Vcc | AD-9/PTB-10 | 1 | Vcc | AD-1/PTB-2 | |
| AD-10/PTB-11 | DIO-5/PTC-3 | | AD-2/PTB-3 | DIO-1PTA-6 | |
| SPI-MOSI/PTF-8 | SPI-MISO/PTF-7 | | PWM-1/PTD-0 | PWM-2/PTD-1 | |
| SPI-SCK/PTF-6 | SPI-SS/PTC-4 | | ICOC-1/PTD-9 | ICOC-2/PTD-10 | |
| GND | INTR2/PTA-13 | 9 | GND | ICOC-3/PTD-11 | |
| I2C1 (top) | | | Dig2 (top) | | |
| Vcc | AD-11/PTB-12 | 1 | Vcc | AD-3/PTB-4 | |
| AD-12/PTB-13 | DIO-6/PTD-5 | | AD-4/PTB-5 | AD-5/PTB-6 | |
| I2C-SDA/PTG-3 | I2C-SCL/PTG-2 | | PWM-3/PTD-2 | PWM-4/PTD-3 | |
| DIO-7/PTD-6 | DIO-8/PTD-7 | | ICOC-4/PTD-12 | ICOC-5/PTD-13 | |
| GND | INTR3/PTA-14 | 9 | GND | ICOC-6/PTD-14 | |
| SCI1 (top) | | | Dig3 (top) | | |
| Vcc | AD-13/PTB-14 | 1 | Vcc | AD-6/PTB-7 | |
| AD-14/PTB-15 | DIO/PTC-15 | | AD-7/PTB-8 | AD-8/PTB-9 | |
| DIO/PTD-8 | DIO/PTD-15 | | PWM-5/PTD-4 | DIO-2/PTA-7 | |
| SCI-RX/PTF-2 | SCI-TX/PTF-3 | | DIO-3/PTC-1 | DIO-4/PTC-2 | |
| GND | INTR4/PTA-15 | 9 | GND | INTR1/PTA-12 | |
| Back Slots | | | | | |
| SPI2 (bottom) | | | Dig4 (bottom) | | |
| Vcc | Not Used | 1 | Vcc | Not Used | |
| CAN0RX/RF0 | CAN0TX/RF-1 | | Not Used | Not Used | |
| SPI-MOSI/PTG-8 | SPI-MISO/PTG-7 | | SPI-MOSI+ | SPI-MISO+ | |
| SPI-SCK/PTG-6 | SPI-SS/PTG-9 | | SPI-SCK+ | Not Used | |
| GND | INTR2/PTA-13+ | 9 | GND | Not Used | |
| I2C2 (bottom) | | | Dig5(bottom) | | |
| Vcc | AD-15 | 1 | Vcc | Not Used | |
| CAN1RX/PTG-0 | CAN1-TXTPTG-1 | | Not Used | Not Used | |
| I2C-SDA/PTG-3+ | I2C-SCL/PTG-2+ | | I2C3-SDA+ | I2C-3-SCL+ | |
| Not Used | Not Used | | Not Used | Not Used | |
| GND | INTR3/PTA-14+ | 9 | GND | Not Used | |
| SCI2 (Bottom) | | | Dig6 (bottom) | | |
| Vcc | Not Used | 1 | Vcc | Not Used | |
| CSDI/PTG-12 | CSDO/PTG-13 | | Not Used | Not Used | |
| CSCK/PTG-14 | COFS/PTG-15 | | I2C-SDA+ | I2C-SCL+ | |
| SCI2-RX/PTF-4 | SCI2-TX/PTF-5 | | Not Used | Not Used | |
| GND | INTR4/PTA-15+ | 9 | GND | Not Used | |

The Key for Table 14:
AD - Analog to Digital Resource
DIO - general purpose digital input/output resource
SPI(X) - Serial peripheral interface communication bus (requires four resource pins for implementation)
INTR(X) - General purpose interrupt
PWM - Pulse Width Modulation Resource
ICOC - Input capture/output compare resource
SCI(X) - Serial communications interface resource (requires two resource pins for implementation)
I2C(X) - Inter-IC communications bus (requires two resource pins for implementation)
Gnd - peripheral power supply ground pin TABLE 14-continued CAN - Controller Area Network communications protocol. Requires two resource pins for implementation
CSD(X) - Data Converter Interface communications (requires four resources). Inclusive in this protocol is I2S (inter-IC Sound), a protocol used for transmission of audio signals
Notes for Table 14:
Microchip sPIC30F6014A supports either 3.3 V or 5 V powered peripherals; therefore the peripheral voltage is designated as Vcc. Actual peripheral voltage is user selected by a jumper on the motherboard I2C2 pin 4 is unused. This is permissible as it is compliance with the Generic Map File. Resources that are followed by a "/" indicate the specific port and pin on the processor from where this resource will be supplied. Not all are shown. Example, I2C1, pin 2, AD-11/PTD-5. This analog to digital resource is supplied by processor port D pin 5. The '+' designated resources may be used by multiple devices (sharable resources). It is permissible to duplicate resources on headers if those resources are sharable. The I2C is a sharable resource. The same I2C resource pins may be used to populate both I2C1 and I2C2 header positions (I2C1 & I2C2 pins 2; I2C1 & I2C2 pins 3). The dsPIC30 chip does not have adequate resources to fully populate all map positions (header positions), but does have adequate resources to support the required generic map file. Future implementations may include a smaller form factor motherboard with 9 total SPDP headers. This future board may retain processor and peripheral compliance with existing designs and will be better suited for processors with limited resources.

An embodiment of the systems and methods described herein includes enabling a plurality of microcomputer devices to interconnect with a plurality of peripheral devices, accessory devices, and other apparatuses that utilize interface signals from microcontrollers in a manner that abstracts the microcontroller interface.

An embodiment of the systems and methods described herein includes assigning a plurality of microcontroller resources to specific physical locations on hardware devices including interface connectors, interface boards, and motherboards.

An embodiment of the systems and methods described herein may include aligning common resources across a plurality of microcontrollers of different types, capabilities, and/or architectures to a common physical hardware interface. Such embodiment includes a method, abstracted from hardware, that defines the grouping of different resource types into common interface points and the number of resources that are commonly grouped per interface.

An embodiment of the systems and methods described herein may include resource mapping of a plurality of microcontroller resources into common interface locations while minimizing/eliminating duplication of resources across interface points.

An embodiment of the systems and methods described herein may include full utilization of resources assigned to a specific interface point by permission of selective signal pass through of resources to subsequently attached devices.

An embodiment of the systems and methods described herein may include sharing of resources (that are sharable) across a plurality of connection interface points, whether those points occupy a common interface location or a plurality of interface points.

An embodiment of the systems and methods described herein may include selective grouping of microcontroller resources such that an optimized arrangement is presented. Optimization balances number of signals and resources present against probability those resources may be consumed by a specific interface device.

An embodiment of the systems and methods described herein may include logical grouping of mixed resources in a manner that creates the greatest probability that interface devices will have all required signals present on an interface point.

An embodiment of the systems and methods described herein may include logical grouping of mixed resources in a manner that provides preferential implementation of said resources for specific types of end uses and applications. Such embodiment may include grouping of resources in a manner that maximizes motion control interface capabilities.

An embodiment of the systems and methods described herein may include sharing of multiple interface points with a common interface board. For instances where an interface device may require more resources or different resources than are present in a single connection point, such embodiment may permit attachment of multiple interface points to a common interface device. Such embodiment may include the ability to share unused (or sharable) resources with other interface devices in a stacked (or other) arrangement.

An embodiment of the systems and methods described herein may include of multiple resource points in a mutually exclusive or non-exclusive configuration to permit smallest possible space allowance for multiple interface points. Attachment of interface devices may preclude or include availability of unused signals and interface points to other devices.

An embodiment of the systems and methods described herein may include assigning resources unique to a specific microcontroller (not shared by other architectures or processor families) into unique physical and logical locations. Such embodiment may be enumerated in a manner to minimize the probability of resource conflict and incompatible interface devices across various devices.

An embodiment of the systems and methods described herein may include permitting access to microcontroller resources common across multiple families (but are not designated interface resources) through common interface points (debug headers, A/D reference voltages, etc).

An embodiment of the systems and methods described herein may include defining required resources for a specific interface device and resources that may be consumed by that device. Such embodiment includes a method for identifying possible resource conflicts between interface devices that share a common interface board connector through a stacked connection (or other connection) arrangement. Embodiments may include a method which defines attributes including interface device function, microcontroller resources required, physical locations the board may be installed, resources consumed by the interface board on an associated interface connector, and operating voltage required. One embodiment may use such attribute information to identify resource conflicts with other interface boards.

An embodiment of the systems and methods described herein may include reallocating processor resources so that said resources are presented in a user defined order and sequence for interface with system compatible peripherals, components, and systems. Such embodiment includes reallocation of resources at the system level, component level, and intermediate level. Example enumerations of this may include, but are not limited to: resource remapping circuit board between microcontroller board and interface board (system level); resource remapping on individual peripheral devices via a remapping PCB residing between the peripheral and interface board (intermediate level); jumper selections to permit one of X resources to interface with a specific component (end user may select which resource to allocate; component level).

An embodiment of the systems and methods described herein may include a method to present mutually exclusive interfaces between a microcontroller and device. Such embodiment may include a plurality of peripheral interface connectors on an interface board that reside within a bounding region that permits use of only one of the plurality of connectors. Such embodiment may be utilized to minimize system physical size by presenting a multiplicity of resources and interfaces wherein only one grouping of said resources may be expected to be used.

An embodiment of the systems and methods described herein includes providing a logical and physical interface between a microcontroller, an interface board, and peripheral or other interface devices. Such interface may include a microcontroller board presenting microcontroller resources and signals to defined locations on the associated microcontroller printed circuit board such that signals are presented in a defined manner and location to the interface board. Such embodiment may include use of an adapter board, cable, or similar interface device that satisfies the basic functionality of providing a physical means to connect microcontroller interface points to an external device. Other embodiments may include adapter cables, adapter boards, and interface methods to provide connectivity between an interface board and microcontroller board wherein the microcontroller board may not have been specifically designed for connectivity with the interface board (third party microcontroller development systems are an example). Embodiments may utilize an adapter board or other physical device to reassign microcontroller resources from a designated state and location such that alternate presentation of the signals and resources to the interface board is possible.

The interface board of an embodiment may present microcontroller resources to defined interface points in a common and generic manner such that resources commonly shared across a multiplicity of microcontrollers and architectures are presented in common logical and physical locations. Full compliance may not be required, permissible, nor desirable.

Presentation of the signals to interface points under an embodiment may consist of a 10 position interface connector with 8 resource positions defined and 1 power, 1 ground position defined. This arrangement does not exclude other configurations, including use of multiple connectors, alternate number of pins, alternate number of signal, power or ground connections.

Presentation of the microcontroller signals to the interface board under one embodiment may consist of a 200 position interface that includes resource signals, power, ground, debugging interface points, A/D reference voltages, and voltage selection lines, among other signals. Other embodiments include alternate number of interface points, use of multiple interface connectors, or alternate signal interfaces.

An embodiment of the systems and methods described herein includes permitting microcontroller and peripheral devices to operate at different source voltages (if permitted by the microcontroller). Such embodiment may include an interface board that presents a source voltage to a microcontroller device while presenting an alternate supply voltage to one or a multiplicity of peripheral devices, debug devices, or apparatuses that may interface with a microcontroller interface point.

An embodiment of the systems and methods described herein includes automatically disabling system supply voltages as a function of connected microcontroller interface board, cable, or other microcontroller interface device. Such embodiment may include disabling of a system voltage supply by a microcontroller board if disabled voltage is not supported by said microcontroller and use of stated voltage supply may result in incorrect operation of microcontroller, incorrect interface with external devices, or damage to microcontroller device. Such embodiment may include an implicit assumption that in many instances the disallowed voltage level may correspond to the logic level of the connected devices; therefore the system voltage may not in and of itself present connectivity issues but rather discrete logic levels derived from the supplied voltage may.

An embodiment of the systems and methods described herein includes permitting attachment of devices and components requiring voltage levels not supported by a connected microcontroller. Such embodiment may consist of a stackable peripheral interface card containing logic and system voltage level translation circuits required for compliance between a microcontroller and peripheral device.

An embodiment of the systems and methods described herein includes selectively connecting a peripheral interface point to a multiplicity of microcontroller interface points and selectively disconnect one, multiple or all interconnects. Such embodiment may include the ability to connect a peripheral resource to multiple microcontroller resource types in a manner that permits singular assignment of said microcontroller resource to said peripheral resource at some future time. An example implementation of this embodiment may include use of multiple jumpers to connect a singular peripheral resource to multiple microcontroller resources. Removal of one, multiple, or all jumpers may be permissible and may depend upon end use of said device.

An embodiment of the systems and methods described herein include permitting additional interface points between an interface board and a microcontroller device (inclusive are microcontroller circuit boards, interface cables, and other interface methods). This method and apparatus may permit compatible use of devices without said additional interface point, inclusive of interface devices are peripheral devices and microcontroller devices. There may be an additional interface point (or points) on an interconnect board to provide upward compatibility of interface boards, devices, and microcontrollers with interface boards and devices that require enhanced designs to accommodate higher signals speeds, alternate operating voltages, and additional interface points (an example may include direct memory access or LCD interfaces) or other unspecified features.

An embodiment of the systems and methods described herein includes permitting access to microcontroller signals that may or may not be present on interface connectors. Such embodiment may include byte wide or port wide resource presentation on a single interface point that may or may not conflict with other interface points. Such embodiment may include specialized interface points to accommodate specific functionality that may or may not benefit from presentation on an interface connector. Such embodiment may include presentation of signals and resources on dedicated connectors wherein the amount of microcontroller resources present exceeds available interface resource points for interface board points or the resources are not of a type that are suited for presentation on the interface connectors.

An embodiment of the systems and methods described herein includes reassigning microcontroller resources for presentation to external connection points and peripheral devices. Embodiments of this may include a device for reassignment of resources that resides between the microcontroller and associated interface board and a device that reassigns resources specific to a peripheral interface point and resides between the interface point and associated peripheral device. An embodiment of the interface board may permit physical relocation of signal assignment by means of connectors, jumpers, or other physical connection devices.

An embodiment of the systems and methods described herein includes presenting microcontroller resources on secondary connectors in a manner and order such that said resources may be remapped into primary interface locations for alternate embodiments. Resources may be grouped in a specified manner such that said resources are commonly presented on same secondary connectors, largely independent of microcontrollers used. If resources are not present on a specific microcontroller device or if a higher priority need for allocation of resources is presented, allocation of resources per specification may be deviated from in order to derive overall greater benefit from alternate implementation.

Microcontroller generally refers to the class of computing devices that include but are not limited to microcontrollers, embedded microcontrollers, microcomputers, embedded computers, programmable interrupt controllers, and other derivatives. It may also refers to devices containing data bus widths of 8, 16, and 32 bits but are not specifically restricted to these bus widths.

Architectures generally refers to the microcode language employed by the original designer of a microcontroller or microcomputer. Architectures include certain hardware features common to devices utilizing the specific language. These are generically referred to as microprocessor families.

Resources generally refer to special purpose function employed within microcontrollers that are common across a microcontroller family and may be present across multiple families. Examples include analog to digital converters, pulse width modulators, input capture, I2C bus, SPI bus.

Interface board generally refers to a printed circuit board, cabling, or other physical connecting method employed to bridge signal connections between a microcontroller and devices that interface with microcontroller signal lines. This type of device may be referenced as a motherboard.

Peripherals refer to devices that interface with microcontrollers and provide enhanced functionality to resources present on the microcontroller or augment functionality of the microcontroller. Examples include breakout board (facilitates physical connectivity to microcontroller signal lines), and serial communications boards (implements the hardware specific layer of a communications protocol), I2C based relative humidity sensor (implements an enhanced functionality not inherent to the microcontroller by means of a microcontroller communications bus).

An embodiment of the systems and methods described herein may include a motherboard containing voltage regulation circuitry necessary to accept an unregulated DC power source and produce two regulated supply voltages of 3.3 Volts and 5 Volts. Both sources may be presented to the microcontroller interface and to a jumper selector (for peripheral devices) on the motherboard. The microcontroller interface board has the ability to disable either of the supply voltages. This may be required if the microcontroller only supports a specific voltage for peripheral devices. The motherboard may also contain two dedicated connectors for use as processor direct access interfaces. The purpose of these connectors is to provide code debugging and software download/upload from a host device to a microcontroller device. Interface of the processor to peripheral devices may be primarily achieved by means of twelve dedicated peripheral interface connectors (Stackable Peripheral Interface Ports or SPIP) with each connector containing 10 interface points. Two of the ten interface points (on each SPIP connector) are dedicated to power and ground while the remaining eight are dedicated to microcontroller resources. Power is derived from the power selector jumper via user selection and restricted as required by the specific processor interface adapter (via disabling invalid voltage rails). Finally, the motherboard of the embodiment contains nine additional interface connectors. Under an embodiment, Direct Processor Interface Ports or DPIP connectors permit processor specific functionality to be presented to the motherboard and also permit alternate presentation of resources that are assigned on the SPIP connectors. Duplication of resources (presentation on both DPIP connectors and SPIP connectors) are permitted under an embodiment. Resource mapping of processor resources on DPIP connectors may be performed in a manner wherein specific types of resources may be present at known locations. This presentation permits the utilization of an optional adapter to be installed between the microcontroller board and motherboard under an embodiment. This optional board may be designed to permit remapping of resources to increase end use specific functionality. An example of how such adapter may be used is the implementation of a remapping adapter that provides additional communications SPIP connectors than are permitted in the default configuration. Other examples include motion control and data acquisition centric remap adapters.

SPIP connectors are mapped by logical function with a generic map that generally describes the resource assignment to each SPIP connector that is independent of the type of microcontroller employed under an embodiment. Under an embodiment, the general functionality for a default configuration (without a remap adapter) may be as follows: two SPIP connectors—motion control and analog signal measurement; two SPIP connectors—Serial communications (RS233, RS485, TTL serial, USB, CAN); two SPIP connectors each for Serial Peripheral Interface (SPI Bus) and two for I2C bus communications. Remaining SPIP connectors may be mapped for specific device implementation under an embodiment, but such mapping requires placement of supplemental resources in a fixed location that subsequently used by other microcontrollers that may likewise share this resource.

Under an embodiment of the systems and methods described herein, the interface board permits the end user to reconfigure resource mapping between any specific microcontroller/microcontroller board and associated peripheral devices. Specifically, microcontroller resources (A/D converters, pulse with modulators, communications buses, and other special purpose ports) are presented to user interface connectors under such embodiment. Signals presented to peripheral headers may likewise be presented to user interface connectors. By use of user arranged interconnect cables, specific allocation of processor resources may be defined for each peripheral interface connector and position within the connector. This conceived arrangement permits greatest flexibility within the smallest permissible space under an embodiment.

Under an embodiment of the systems and methods described herein, additional space has been reserved on the interface board to permit additional connectivity between microcontroller boards, the interconnect board and (optionally) peripheral connectors. The additional interconnection is backwards compatible.

Under an embodiment of the systems and methods described herein, a Microcontroller Board contains the microcontroller and supporting devices including those components necessary for the microcontroller to function with the interface board and produce usable signals. Supplemental circuitry and connectors not essential for basic operation are permissible on the microcontroller board with implementation under one embodiment in support of special functions and capabilities not directly supported by the interconnect board. In lieu of a microcontroller board, an interface adapter board may be utilized that provides necessary signal interface and mapping to permit microcontroller boards (third party or otherwise) to interface with the PIEP motherboard under an embodiment.

Peripheral Boards comprise under an embodiment standard sized peripheral boards that occupy a 1.25×1.25" footprint and contain top and bottom 10 position headers to receive signals from the PIEP motherboard and pass signals (selectively) to stacked peripherals. For peripheral boards that require resources beyond those available on a single SPIP header, peripheral boards may span additional headers to acquire additional signals and gain additional board space.

One embodiment of the systems and methods described herein employs two 3 Amp switching regulator circuits to power devices on the board (peripheral devices and microcontroller). Debug headers support JTAG 20 position header interfaces and Freescale/Aurduio 6 position header interfaces (signals may be dynamically mapped on 6 position header, based on the specific microcontroller board installed).

A Resource Remapping Board may be used under an embodiment of the systems and methods described herein. Under such embodiment, the remap board resides physically between the microcontroller board and interface board. The resource remapping board retains the ability to reorganize microcontroller interface lines from the microcontroller (whether signal lines terminate on DPW headers, SPIP headers, or a supplemental microcontroller to interface board connector). Based on resource assignments, there is under an embodiment a largely known allocation of resources for all terminating signals, regardless of microcontroller utilized. Some natural variation may exist due to variances in resources available for each specific microcontroller, but sufficient commonality exists to largely satisfy implementation needs. For instances where insufficient resources are available to fully populate a specific resource type, resource substitution via the most closely available resource type (satisfying the expected end uses for the primary resources) are typically made. Additionally, it is recognized that many microcontrollers permit dynamic signal assignment wherein a specified interface point may be singularly assigned one of a multiplicity of functions. This dynamic assignment of functions is considered in resource allocation and is sometimes a requirement in order to fulfill resource mapping requirements. For the purposes of DPID signal assignment, it is permissible under an embodiment to allocate the same physical interconnect point to multiple resources, with functionality determined by microcontroller register configurations.

The embodiments described herein include identifying resource needs of a plurality of peripherals, the resource needs including a type and a quantity of at least one resource corresponding to each peripheral of the plurality of peripherals, identifying resource requirements of a plurality microcontrollers, the resource requirements including a type and a quantity of each resource provided by the plurality of microcontrollers, comparing the resource needs of the plurality of peripherals with the resource requirements of the plurality of microcontrollers to identify generic resources common to the plurality of microcontrollers, wherein a first microcontroller of the plurality of microcontrollers provides the generic resources to processor pin locations according to a first architecture, wherein a second microcontroller of the plurality of microcontrollers provides the generic resources to processor pin locations according to a second architecture, wherein the first architecture is different than the second architecture, assigning each resource of the generic resources to a fixed location on a motherboard, the assigning including assigning the fixed location to an interface pin, and identifying for each resource of the generic resources a processor pin location of the first microcontroller providing the resource, routing the processor pin location providing the resource to the assigned interface pin, wherein the interface pin provides the resource to the fixed location on the motherboard.

The embodiments described herein include generating a generic map, the generating the generic map including identifying the generic resources and assigning each resource of the generic resources to the fixed location on a motherboard.

The generic resources of an embodiment comprise one or more of a pulse width modulation (PWM) resource, an input capture output compare (ICOC) resource, an analog to digital converter (A/D) resource, a digital to analog converter (D/A) resource, a controller area network (CAN) resource, a timers (TIM) resource, a keypad wakeup resource, and an Inner-IC Bus (I2C) resource, a serial peripheral interface resource (SPI), a serial communications interface (SCI) resource, a Universal Serial Bus (USB) resource, an Interrupt (IRQ) resource, and a byte data link controller (BDLC) resource.

The plurality of peripherals of an embodiment includes one or more of an electrically erasable programmable read-only memory (EEPROM), a real time date clock (RTC), a capacitive touch controller, a digital to analog board, a digital port expander, a dual switch debounce, a HART protocol modem, a light sensor, a remote temperature sensor, a serial port expander, a USB host adapter, an input converting a current level to a voltage level, a sixteen segment LED driver, a resistive touch controller, and a serial port expander.

The first microcontroller of an embodiment is located on a first processor board.

The first microcontroller of an embodiment comprises the MC9S12DP512 processor.

The interface pin of an embodiment comprises a corresponding interface pin of a motherboard interface header.

The motherboard interface header of an embodiment is located on the motherboard.

The interface pin of an embodiment comprises a corresponding interface pin of a first processor interface header.

The first processor interface header of an embodiment is located on the first processor board.

The first processor interface header of an embodiment mates with the motherboard interface header.

The motherboard of an embodiment includes one or more peripheral headers.

Each peripheral header of the one or more peripheral headers of an embodiment comprises ten pin number locations.

The fixed location of an embodiment comprises a pin number location on a peripheral header of the one or more peripheral headers, the ten pin number locations including the pin number location.

The embodiments described herein include assigning each resource of the generic resources to the fixed location includes assigning the generic resources according to a resource alignment method.

The resource alignment method of an embodiment includes assigning at least one resource of the generic resources to at least one pin number location, the ten pin number locations comprising the at least one pin number location.

The resource alignment method of an embodiment includes grouping resources of the generic resources on a common peripheral header, the grouping providing the common peripheral header with one or more functions.

The one or more functions of an embodiment includes motion control and data acquisition.

The one or more functions of an embodiment includes general purpose control and sensing.

The one or more functions of an embodiment includes support of SPI based integrated circuits.

The one or more functions of an embodiment includes support of I2C based integrated circuits The one or more functions of an embodiment includes support of SCI devices and CAN bus devices The resource alignment method of an embodiment includes assigning resources of the generic resources to peripheral header locations.

The resource alignment method of an embodiment includes locating adjacent resource groups for sharing by peripherals of the plurality of peripherals, the generic resources including the adjacent resource groups.

The embodiments described herein include identifying for each resource of the generic resources a processor pin location of the second microcontroller providing the resource, routing the processor pin location providing the resource to the assigned interface pin, wherein interface pin provides the resource to the fixed location on the motherboard.

The second microcontroller of an embodiment is located on a second processor card.

The second microcontroller of an embodiment comprises the Atmel SAM3X9E processor.

The embodiments described herein include a system comprising a generic map file including generic resources, the generic map file assigning each resource of the generic resources to a fixed location on a motherboard, the generic resources including resources common to a plurality of microcontrollers, the assigning including assigning the fixed location to an interface pin, the plurality of the microcontrollers including a first microcontroller and a second microcontroller, the first microcontroller of the plurality of microcontrollers providing the generic resources to corresponding processor pin locations according to a first architecture, wherein the second microcontroller of the plurality of microcontrollers provides the generic resources to corresponding processor pin locations according to a second architecture, wherein the first architecture is different than the second architecture, and a first processor card comprising the first microcontroller routing each resource of the generic resources from the corresponding processor pin location providing the resource to the assigned interface pin, wherein the interface pin provides the resource to the fixed location on the motherboard.

The interface pin of an embodiment comprises a corresponding interface pin of a motherboard interface header.

The motherboard interface of an embodiment header is located on the motherboard.

The interface pin of an embodiment comprises a corresponding interface pin of a first processor interface header.

The first processor of an embodiment interface header is located on the first processor board.

The first processor interface header of an embodiment mates with the motherboard interface header.

The invention claimed is:

1. A method comprising,
identifying resource needs of a plurality of peripherals, the resource needs including a type and a quantity of at least one resource corresponding to each peripheral of the plurality of peripherals;
identifying resource requirements of a plurality microcontrollers, the resource requirements including a type and a quantity of each resource provided by the plurality of microcontrollers;
comparing the resource needs of the plurality of peripherals with the resource requirements of the plurality of microcontrollers to identify generic resources common to the plurality of microcontrollers, wherein a first microcontroller of the plurality of microcontrollers provides the generic resources to processor pin locations according to a first architecture, wherein a second microcontroller of the plurality of microcontrollers provides the generic resources to processor pin locations according to a second architecture, wherein the first architecture is different than the second architecture;
assigning each resource of the generic resources to a fixed location on a motherboard, the assigning including assigning the fixed location to an interface pin; and
identifying for each resource of the generic resources a processor pin location of the first microcontroller providing the resource, routing the processor pin location providing the resource to the assigned interface pin, wherein the interface pin provides the resource to the fixed location on the motherboard.

2. The method of claim 1, comprising generating a generic map, the generating the generic map including identifying the generic resources and assigning each resource of the generic resources to the fixed location on a motherboard.

3. The method of claim 1, wherein the generic resources comprise one or more of a pulse width modulation (PWM) resource, an input capture output compare (ICOC) resource, an analog to digital converter (A/D) resource, a digital to analog converter (D/A) resource, a controller area network (CAN) resource, a timers (TIM) resource, a keypad wakeup resource, and an Inner-IC Bus (I2C) resource, a serial peripheral interface resource (SPI), a serial communications interface (SCI) resource, a Universal Serial Bus (USB) resource, an Interrupt (IRQ) resource, and a byte data link controller (BDLC) resource.

4. The method of claim 1, wherein the plurality of peripherals includes one or more of an electrically erasable programmable read-only memory (EEPROM), a real time date clock (RTC), a capacitive touch controller, a digital to analog board, a digital port expander, a dual switch debounce, a HART protocol modem, a light sensor, a remote temperature sensor, a serial port expander, a USB host adapter, an input converting a current level to a voltage level, a sixteen segment LED driver, a resistive touch controller, and a serial port expander.

5. The method of claim 1, wherein the first microcontroller is located on a first processor board.

6. The method of claim 5, wherein the first microcontroller comprises the MC9S12DP512 processor.

7. The method of claim 6, wherein the interface pin comprises a corresponding interface pin of a motherboard interface header.

8. The method of claim 7, wherein the motherboard interface header is located on the motherboard.

9. The method of claim 8, wherein the interface pin comprises a corresponding interface pin of a first processor interface header.

10. The method of claim 9, wherein the first processor interface header is located on the first processor board.

11. The method of claim 10, wherein the first processor interface header mates with the motherboard interface header.

12. The method of claim 1, wherein the motherboard includes one or more peripheral headers.

13. The method of claim 12, wherein each peripheral header of the one or more peripheral headers comprises ten pin number locations.

14. The method of claim 13, wherein the fixed location comprises a pin number location on a peripheral header of the one or more peripheral headers, the ten pin number locations including the pin number location.

15. The method of claim 14, wherein the assigning each resource of the generic resources to the fixed location includes assigning the generic resources according to a resource alignment method.

16. The method of claim 15, the resource alignment method including assigning at least one resource of the generic resources to at least one pin number location, the ten pin number locations comprising the at least one pin number location.

17. The method of claim 16, the resource alignment method including grouping resources of the generic resources on a common peripheral header, the grouping providing the common peripheral header with one or more functions.

18. The method of claim 17, the one or more functions including motion control and data acquisition.

19. The method of claim 17, the one or more functions including general purpose control and sensing.

20. The method of claim 17, the one or more functions including support of SPI based integrated circuits.

21. The method of claim 17, the one or more functions including support of I2C based integrated circuits.

22. The method of claim 17, the one or more functions including support of SCI devices and CAN bus devices.

23. The method of claim 17, the resource alignment method including assigning resources of the generic resources to peripheral header locations.

24. The method of claim 23, the resource alignment method including locating adjacent resource groups for sharing by peripherals of the plurality of peripherals, the generic resources including the adjacent resource groups.

25. The method of claim 1, comprising identifying for each resource of the generic resources a processor pin location of the second microcontroller providing the resource, routing the processor pin location providing the resource to the assigned interface pin, wherein interface pin provides the resource to the fixed location on the motherboard.

26. The method of claim 25, wherein the second microcontroller is located on a second processor card.

27. The method of claim 25, wherein the second microcontroller comprises the Atmel SAM3X9E processor.

28. A system comprising,
a generic map file including generic resources;
the generic map file assigning each resource of the generic resources to a fixed location on a motherboard, the generic resources including resources common to a plurality of microcontrollers, the assigning including assigning the fixed location to an interface pin, the plurality of the microcontrollers including a first microcontroller and a second microcontroller;
the first microcontroller of the plurality of microcontrollers providing the generic resources to corresponding processor pin locations according to a first architecture, wherein the second microcontroller of the plurality of microcontrollers provides the generic resources to corresponding processor pin locations according to a second architecture, wherein the first architecture is different than the second architecture;
a first processor card comprising the first microcontroller routing each resource of the generic resources from the corresponding processor pin location providing the resource to the assigned interface pin, wherein the interface pin provides the resource to the fixed location on the motherboard.

29. The system of claim 28, wherein the interface pin comprises a corresponding interface pin of a motherboard interface header.

30. The method of claim 29, wherein the motherboard interface header is located on the motherboard.

31. The method of claim 30, wherein the interface pin comprises a corresponding interface pin of a first processor interface header.

32. The method of claim 31, wherein the first processor interface header is located on the first processor board.

33. The method of claim 32, wherein the first processor interface header mates with the motherboard interface header.

* * * * *